(12) United States Patent
Chou et al.

(10) Patent No.: US 11,674,883 B2
(45) Date of Patent: Jun. 13, 2023

(54) IMAGE-BASED ASSAY PERFORMANCE IMPROVEMENT

(71) Applicant: Essenlix Corporation, Monmouth Junction, NJ (US)

(72) Inventors: Stephen Y. Chou, Princeton, NJ (US); Wei Ding, Princeton, NJ (US); Wu Chou, Basking Ridge, NJ (US); Jun Tian, Belle Mead, NJ (US); Yuecheng Zhang, Yardley, PA (US); Mingquan Wu, Princeton Junction, NJ (US); Xing Li, Metuchen, NJ (US)

(73) Assignee: Essenlix Corporation, Monmouth Junction, NJ (US)

( * ) Notice: Subject to any disclaimer, the term of this patent is extended or adjusted under 35 U.S.C. 154(b) by 0 days.

(21) Appl. No.: 17/565,115

(22) Filed: Dec. 29, 2021

(65) Prior Publication Data
US 2022/0299422 A1   Sep. 22, 2022

Related U.S. Application Data

(63) Continuation of application No. 17/268,663, filed as application No. PCT/US2019/046971 on Aug. 16, 2019, now Pat. No. 11,346,764.

(60) Provisional application No. 62/719,129, filed on Aug. 16, 2018, provisional application No. 62/764,886, filed on Aug. 16, 2018.

(51) Int. Cl.
| G06T 1/00 | (2006.01) |
| G01N 15/14 | (2006.01) |
| G06N 20/00 | (2019.01) |
| G01N 1/28 | (2006.01) |
| G06N 3/08 | (2023.01) |

(52) U.S. Cl.
CPC ....... G01N 15/1484 (2013.01); G01N 1/2813 (2013.01); G06N 3/08 (2013.01); G06N 20/00 (2019.01); G06T 1/0014 (2013.01); *G01N 2001/282* (2013.01)

(58) Field of Classification Search
CPC ............. G01N 15/1484; G01N 1/2813; G01N 2001/282; G01N 15/1468; G06N 20/00; G06N 3/08; G06T 1/0014; G06T 7/0004
See application file for complete search history.

(56) References Cited

U.S. PATENT DOCUMENTS

| 9,756,324 | B1 | 9/2017 | Flanagan et al. |
| 2008/0205783 | A1 | 8/2008 | Sandrew |
| 2012/0107829 | A1* | 5/2012 | Margraf ................. G06N 20/00 530/391.1 |
| 2012/0269436 | A1 | 10/2012 | Mensink et al. |
| 2013/0315465 | A1 | 11/2013 | Cosatto et al. |
| 2014/0154789 | A1* | 6/2014 | Polwart .............. G01N 21/8483 422/403 |

(Continued)

FOREIGN PATENT DOCUMENTS

| WO | 2018107105 A1 | 6/2018 |

OTHER PUBLICATIONS

Written Opinion of the International Searching Authority for PCT/US2019/046971 established by the ISA/US completed on Feb. 19, 2020.

*Primary Examiner* — Ping Y Hsieh

(57) ABSTRACT

The present invention is related to correct the errors in instruments, operation, and others using intelligent monitoring structures and machine learning, and others.

38 Claims, 21 Drawing Sheets

(56) References Cited

U.S. PATENT DOCUMENTS

| | | |
|---|---|---|
| 2018/0202903 A1 | 7/2018 | Chou et al. |
| 2020/0016594 A1* | 1/2020 | Wheeler ........... B01L 3/502715 |
| 2020/0232891 A1* | 7/2020 | Sawaguchi ........ G01N 23/2202 |

* cited by examiner

IMAGE-BASED ASSAY PERFORMANCE IMPROVEMENT

CROSS-REFERENCE TO RELATED APPLICATIONS

This application is a Continuation of U.S. patent application Ser. No. 17/268,663, filed on Feb. 16, 2021, which is a National Stage entry (§ 371) application of International Application No. PCT/US2019/046971, filed on Aug. 16, 2019, which claims the benefit of priority of U.S. Provisional Patent Application No. 62/719,129, filed on Aug. 16, 2018, and U.S. Provisional Patent Application No. 62/764,886, filed on Aug. 16, 2018, the contents of which are relied upon and incorporated herein by reference in their entirety. The entire disclosure of any publication or patent document mentioned herein is entirely incorporated by reference.

FIELD

Among other things, the present invention is related to devices and methods of performing biological and chemical assays, computational imaging, artificial intelligence and machine learning.

BACKGROUND

In biological and chemical assays (including complete blood cell counting), accuracy is essential. However, the errors are unavoidable in instrumentation and operation, particularly, when using low-cost instruments and under resource-limited conditions. The present invention provides, among other things, devices and methods for improving the accuracy of the image-based biological/chemical assay of a sample.

SUMMARY

The following brief summary is not intended to include all features and aspects of the present invention.

One aspect of the present invention is a method of improving the imaging-based assays using a sample holding device with specially designed monitoring structures for assaying accuracy, efficiency, error detection, monitoring or any combination thereof.

Another aspect of the present invention is a method of micro-selective-image-assaying (MSIA) that can perform multiple assaying applications on a single image of the sample taken by the imager.

Another aspect of the present invention is a method to detect monitoring structures and locate their centers from the image of the sample for assaying, wherein the method combines machine learning with the error correction using the predetermined structural properties associated with plurality of the monitoring structures.

Another aspect of the present invention is a method to estimate the true-lateral-dimension (TLD) in the image-based assaying, from which the actual dimension or morphological features of the analytes in the image of the sample can be determined.

Another aspect of the present invention is a method to determine the actual area and associated sample volume for the area-of-interest in the image of the sample, by which the image-based assaying can be conducted on any selected sub-area for flexibility and granularity.

Another aspect of the present invention is a method of monitoring the quality of the sample holding device and the quality of the sample preparation in the image-based assaying from the image of monitoring structures in the sample holding device.

Another aspect of the present invention is a method of using the predesigned monitoring structures in the sample holding device to adjust the operation of the imager in the image-based assaying.

Another aspect of the present invention is a method of removing defects or foreign objects, such as air bubbles, dusts, and so forth, in the image-based assaying from the image of the sample taken by the imager.

Another aspect of the present invention is a method of building machine learning models for image-based assay using intelligent monitoring structures, wherein two approaches based on the original image of the sample and on the transformed sample images are described.

Another aspect of the present invention is an actual use case of image-based assaying for red blood cells in complete-blood-count (CBC), using the methods and algorithms described herein.

A method of using an apparatus to improve imaging-based assays, comprising:
  (a) having a sample holder, comprising the first plate and second plates that face each other and a plurality of monitoring structures on a sample contact surface of one or both plates, wherein the monitoring structures have at least one predesigned and predetermined parameter of geometry and/or an optical property, wherein the sample contact surface contacts a sample;
  (b) sandwiching a sample that contains or is suspected of containing an analyte between the respective sample contact surfaces of the two plates to form a thin layer of 200 µm thick or less, wherein the sample on the sample contact surface is mixed and reacts with a reagent), and wherein the sandwiching, mixing, or reacting is susceptible an error;
  (c) imaging, using an imager, the sample and the monitoring structures on the sample contact area together, wherein the imager is susceptible to a defect in imaging, and wherein the imaging operation is susceptible an error; and
  (d) analyzing the images taken in step (c), using an algorithm, to detect a parameter related to the analyte, wherein the analysis comprises comparing the images with the at least one predesigned and predetermined parameter and detecting and/or correcting the defect and errors using the at least one predesigned and predetermined parameter.

BRIEF DESCRIPTION OF THE DRAWINGS

The skilled artisan will understand that the drawings, described below, are for illustration purposes only. The drawings are not intended to limit the scope of the present teachings in any way. The drawings are not entirely in scale. In the figures that present experimental data points, the lines that connect the data points are for guiding a viewing of the data only and have no other means.

FIG. 1A illustrates a solid-phase surface with protrusion-type monitoring marks. FIG. 1B illustrates a solid-phase surface with trench-type monitoring marks. Characteristics corresponding to the monitoring marks, e.g., pitch and distance, can be used, in an algorithm, to determine a property of an analyte in a sample.

FIG. 2A illustrates how the monitoring marks (e.g., protrusion-type) can be separate structures from the spacers. FIG. 2B illustrates how the monitoring marks can be the same structures as the spacers. Characteristics corresponding to the monitoring marks can be used, in an algorithm, to determine a property of an analyte in the sample.

FIG. 2C illustrates how the monitoring marks (e.g., trench-type) can be separate structures from the spacers. Characteristics corresponding to the monitoring marks can be used, in an algorithm, to determine a property of an analyte in a sample.

FIGS. 2D and 2E illustrate how the monitoring marks can be separate structures from the spacers and disposed on both sample contact areas of the device. Characteristics corresponding to the monitoring marks can be used, in an algorithm, to determine a property of an analyte in a sample.

DETAILED DESCRIPTION OF EXEMPLARY EMBODIMENTS

Figure 1A:
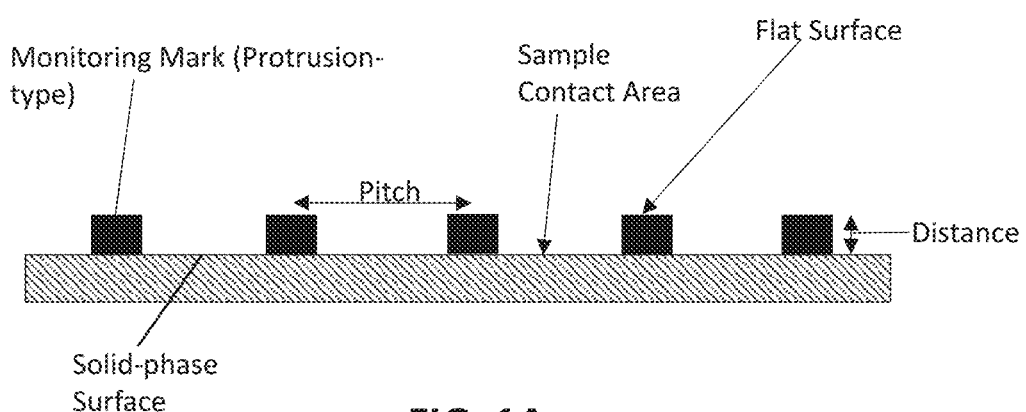
FIGS. 1A and 1B show side views of the device for use in an imaged-based assay, in accordance with one or more embodiments.
Figure 1B:
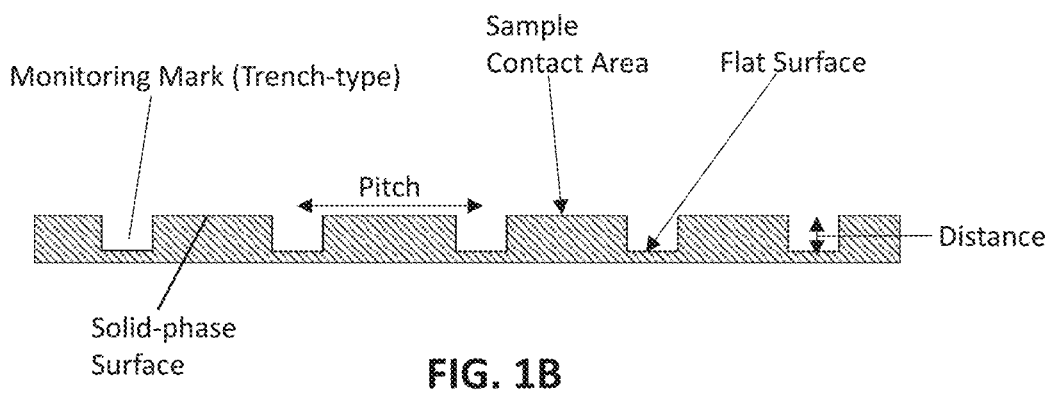
Figure 2A:
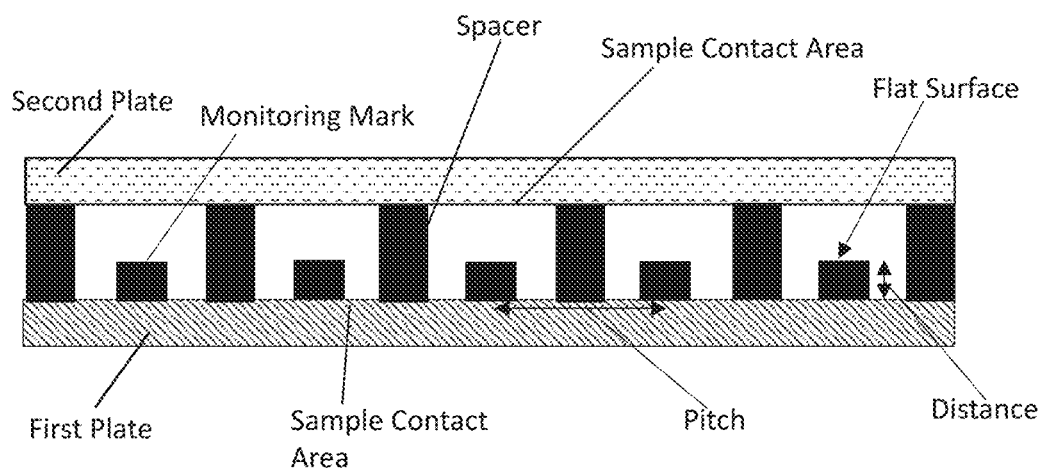
FIGS. 2A and 2B show side views of the device for use in an imaged-based assay, in accordance with one or more embodiments.
Figure 2B:
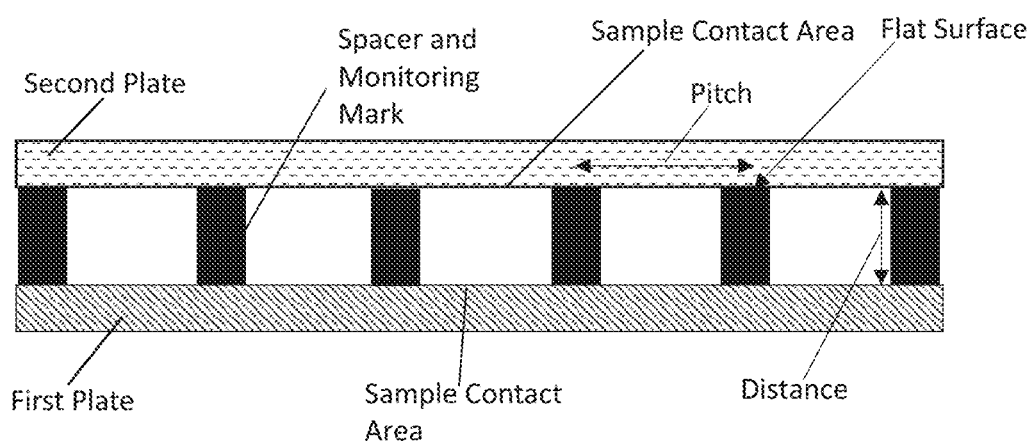
Figure 2C:
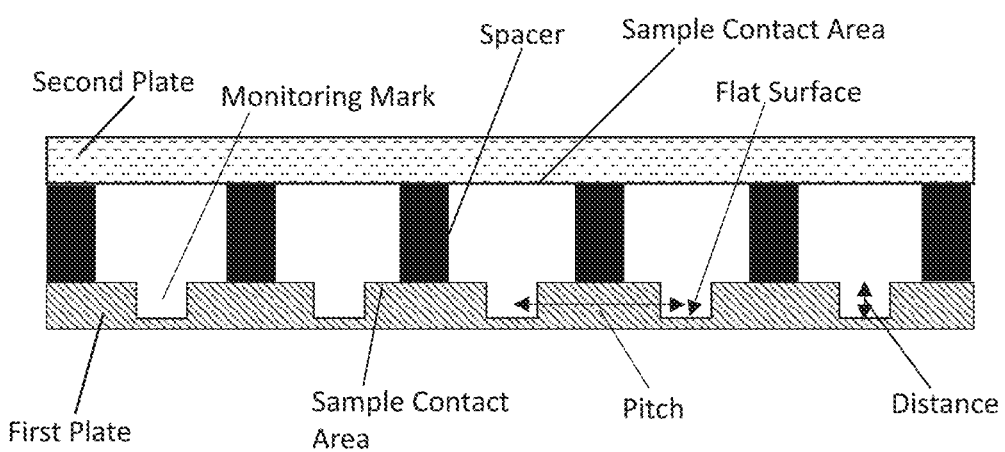
FIG. 2C shows a side view of the device for use in an image-based assay, in accordance with one or more embodiments.
Figure 2D:
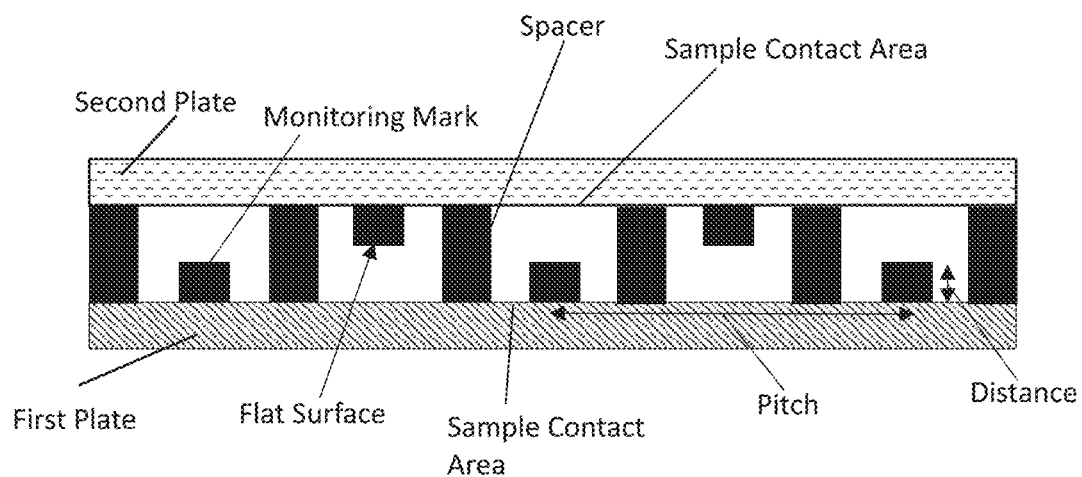
FIGS. 2D and 2E show side views of the device for use in an image-based assay, in accordance with one or more embodiments.
Figure 2E:
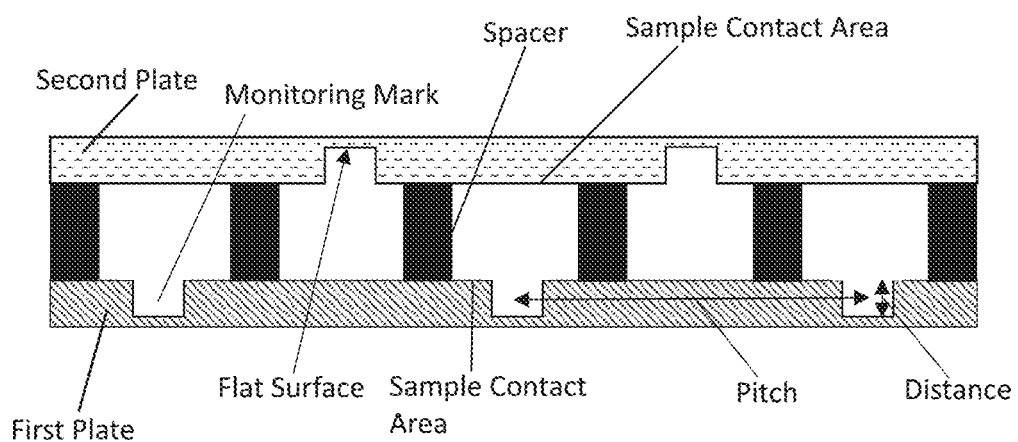
Figure 3:
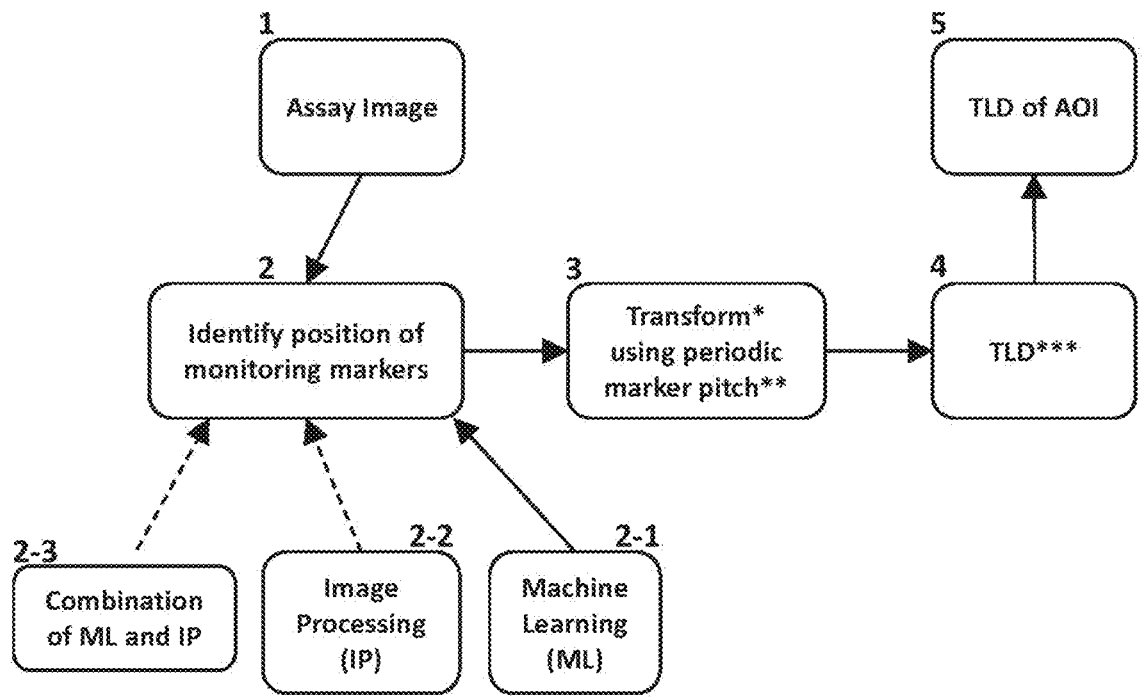
FIG. 3 is exemplary diagram and workflow of an algorithm for using monitoring marks e.g., pillars, together with imaging process and/or machine learning, in accordance with one or more embodiments.

The following detailed description illustrates some embodiments of the present invention by way of example and not by way of limitation. The section headings and subtitles used herein are for organizational purposes only and are not to be construed as limiting the subject matter described in any way. The contents under a section heading and/or subtitle are not limited to the section heading and/or subtitle, but apply to the entire description of the present invention.

The citation of any publication is for its disclosure prior to the filing date and should not be construed as an admission that the present claims are not entitled to antedate such publication by virtue of prior invention. Further, the dates of publication provided can be different from the actual publication dates which can need to be independently confirmed.

In an image-based assay for assaying an analyte in a sample, an imager is used to create an image of the sample which is in a sample holder, and the image is used in a determination of a property of the analyte or the sample for assaying.

However, many factors can make the image distorted (i.e., different from a real sample or an image in a non-perfect condition). The image distortion can lead to inaccuracy in a determination of a property of the analyte. For example, one fact is poor focusing, since a biological sample itself does not have a sharp edge that is preferred in a focusing. When the focusing is poor, the object dimension will be different from the real one, and other object (e.g., blood cells) can become unidentifiable. Another example is that a lens might be not perfect, causing different locations of the sample having different degrees of distortion. And another example is the sample holder is not in the same plane of the optical imaging system, causing a good focus in one area and poor focusing in another.

The present invention is related to the devices and methods that can get a "true" image from a distorted image in the image-based assaying, hence improving the accuracy of an assay.

One aspect of the present invention is the devices and methods that use monitoring marks that has an optical observable flat surface that is parallel to neighboring surface Another aspect of the present invention is the devices and methods that use a QMAX card to make at least a part of the sample forming a uniform layer of thickness in the sample holding area of the QMAX card and use monitoring marks on the card to improve the assay accuracy Another aspect of the present invention is the devices and methods that use monitoring marks together with computational imaging, artificial intelligence, and/or machine learning in the image-based assay.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present teachings, some exemplary methods and materials are now described.

The term "lateral dimension" refers to the linear dimension in the plane of a thin sample layer that is being imaged.

The term "true lateral dimension (TLD)" and "Field of view (FoV)" are interchangeable.

The term "micro-feature in a sample" can refer to analytes, microstructures, and/or micro-variations of a matter in a sample. Analytes refer to particles, cells, macromolecules, such as proteins, nucleic acids and other moieties. Microstructures can refer to microscale difference in different materials. Micro-variation refers to microscale variation of a local property of the sample. Example of micro-variation is a variation of local optical index and/or local mass. Examples of cells are blood cells, such as white blood cells, red blood cells, and platelets.

The term "sample" as used herein relates to a material or mixture of materials containing one or more analytes or entity of interest. In certain embodiments, the samples are a bodily fluid sample from the subject. In some instances, solid or semi-solid samples can be provided. The sample can include tissues and/or cells collected from the subject. The sample can be a biological sample. Examples of biological samples can include but are not limited to, blood, serum, plasma, a nasal swab, a nasopharyngeal wash, saliva, urine, gastric fluid, spinal fluid, tears, stool, mucus, sweat, earwax, oil, a glandular secretion, cerebral spinal fluid, tissue, semen, vaginal fluid, interstitial fluids derived from tumorous tissue, ocular fluids, spinal fluid, a throat swab, exhaled condensates (e.g. breath), hair, finger nails, skin, biopsy, placental fluid, amniotic fluid, cord blood, lymphatic fluids, cavity fluids, sputum, pus, microbiota, meconium, breast milk and/or other excretions. The samples may include nasopharyngeal wash. Nasal swabs, throat swabs, stool samples, hair, fingernail, ear wax, breath, and other solid, semi-solid, or gaseous samples may be processed in an extraction buffer, e.g., for a fixed or variable amount of time, prior to their analysis. The extraction buffer or an aliquot thereof may then be processed similarly to other fluid samples if desired. Examples of tissue samples of the subject may include but are not limited to, connective tissue, muscle tissue, nervous tissue, epithelial tissue, cartilage, cancerous sample, or bone. In particular embodiments, a sample may be obtained from a subject, e.g., a human, and it may be processed prior to use in the subject assay. For example, prior to analysis, the protein/nucleic acid may be extracted from a tissue sample prior to use, methods for which are known. In particular embodiments, the sample may be a clinical sample, e.g., a sample collected from a patient. The samples also can be the sample of food, environments, and others. Some of the samples have a shape deformable but not free-flowable (e.g., sputum).

The term "analyte" refers to any substance that is suitable for testing in the present invention. An analyte includes, but limited to, atoms, molecules (e.g., a protein, peptides, DNA, RNA, nucleic acid, or other molecule), cells, tissues, viruses, bacteria, and nanoparticles with different shapes. A biomarker is an analyte.

As used herein, the terms "determining," "measuring," and "assessing," and "assaying" are used interchangeably and include both quantitative and qualitative determinations.

As used herein, the term "light-emitting label" refers to a label that can emit light when under an external excitation. This can be luminescence. Fluorescent labels (which include dye molecules or quantum dots), and luminescent labels (e.g., electro- or chemi-luminescent labels) are types of light-emitting label. The external excitation is light (photons) for fluorescence, electrical current for electroluminescence and chemical reaction for chemi-luminescence. An external excitation can be a combination of the above.

The phrase "labeled analyte" refers to an analyte that is detectably labeled with a light emitting label such that the analyte can be detected by assessing the presence of the label. A labeled analyte may be labeled directly (i.e., the analyte itself may be directly conjugated to a label, e.g., via a strong bond, e.g., a covalent or non-covalent bond), or a labeled analyte may be labeled indirectly (i.e., the analyte is bound by a secondary capture agent that is directly labeled).

The terms "hybridizing" and "binding", with respect to nucleic acids, are used interchangeably.

The term "Hybridization" refers to a reaction in which one or more polynucleotides react to form a complex that is stabilized via hydrogen bonding between the bases of the nucleotide residues. The hydrogen bonding may occur by Watson-Crick base pairing, Hoogstein binding, or in any other sequence-specific manner. The complex may comprise two strands forming a duplex structure, three or more strands forming a multi-stranded complex, a single self-hybridizing strand, or any combination of these.

As is known to one skilled in the art, hybridization can be performed under conditions of various stringency. Suitable hybridization conditions are such that the recognition interaction between a capture sequence and a target nucleic acid is both sufficiently specific and sufficiently stable. Conditions that increase the stringency of a hybridization reaction are widely known and published in the art. See, for example, Green, et al., (2012), infra.

The term "spacer" and "optical calibration marks" and "optical calibration marks" and "pillars" are interchangeable.

The term "assay" refers to an investigative (analytic) procedure in and not limited to laboratory, medicine, pharmacology, environmental biology, healthcare, and molecular biology—for and not limited to qualitatively assessing or quantitatively measuring the presence, amount, concentration, or functional activity of a target entity (i.e., the analyte). The analyte can be a drug, a biochemical substance, or a cell in an organism or organic sample such as human blood.

The term "image-based assay" refers to an assaying procedure that utilizes the imaae of the sample taken by an imager, wherein the sample can be and not limited to medical, biological and chemical sample.

The term "imager" refers to any device that can take image of the objects. It includes and not limited to cameras in the microscope, smartphone, or special device that can take image at various wavelength.

The term "sample feature" refers to some property of the sample that represents a potentially interesting condition. In certain embodiments, a sample feature is a feature that appears in an image of a sample and can be segmented and classified by a machine learning model or some other algorithms. Examples of sample features include and not limited to analyte types in the sample, e.g., red blood cells, white blood cells, and tumor cells, and it includes analyte shape, count, size, volume, concentration and the like.

The term "defects in the sample" refers to foreign objects and artifacts that should not exist in an ideal sample condition or should not be considered in the sample. They can come from and not limited to pollutants, e.g., dusts, air bobbles, etc., and from the peripheral objects, including structural objects in the sample, e.g., monitor marks (such as pillars) in the sample holding device. Defects in the sample can be of significant size and take significant amount of volume in the sample for assaying, e.g., air bubbles, wherein they can appear in different shapes, sizes, amounts, and concentrations in the sample, and they also sample dependent varying from sample to sample.

The term "morphological feature" of the analytes refers to the appearance (e.g., shape, color, size, etc.) and the structure of the analyte.

The term "homographic transform" refers to a class of collineation transforms induced by an isomorphism of the projective spaces. It is known in the field of image processing and it is applied in camera models to characterize the image plane and the corresponding physical plane in the real world.

The term "machine learning" refers to algorithms, systems and apparatus in the field of artificial intelligence that often use statistical techniques and artificial neural networks to give computer the ability to "learn" (i.e., progressively improve performance on a specific task) from data without being explicitly programmed.

The term "artificial neural network" refers to a layered connectionist system inspired by the biological networks that can "learn" to perform tasks by considering examples, generally without being programmed with any task-specific rules.

The term "convolutional neural network" refers to a class of multilayer feed-forward artificial neural networks most commonly applied to analyzing visual images.

The term "deep learning" refers to a broad class of machine learning methods in artificial intelligence (AI) that learn from data with some deep network structures.

The term "machine learning model" refers to a trained computational model that is built from a training process in the machine learning from the data. The trained machine learning model is applied during the inference stage by the computer that gives computer the capability to perform certain tasks (e.g., detect and classify the objects) on its own. Examples of machine learning models include ResNet, DenseNet, etc. which are also named as "deep learning models" because of the depth in their layered network structure.

The term "image segmentation" refers to an image analysis process that partitions a digital image into multiple image patch segments (sets of pixels, often with a set of bit-map masks that cover the image segments enclosed by their segment boundary contours). Image segmentation can be achieved through the image segmentation algorithms in image processing, such as watershed, grabcuts, mean-shift, etc., and it can also be achieved through dedicated machine learning algorithms, such as MaskRCNN, etc.

A. Monitoring Marks on A Solid-Phase Surface

A1-1. A device for assaying a micro-feature in a sample using an imager, the device comprising:
(a) a solid-phase surface comprising a sample contact area for contacting a sample which contains a micro-feature; and
(b) one or more monitoring marks, wherein the monitoring marks:
 i. are made of a different material from the sample;
 ii. are inside the sample during an assaying the microstructure, wherein the sample forms, on the sample contact area, a thin layer of a thickness less than 200 μm;
 iii. have their lateral linear dimension of about 1 μm (micron) or larger, and
 iv. have at least one lateral linear dimension of 300 μm or less; and wherein during the assaying at least one monitoring mark is imaged by the imager wherein used during assaying the analyte; and a geometric parameter (e.g., shape and size) of the monitoring mark, and/or a pitch between monitoring marks are (a) predetermined and known prior to assaying of the analyte, and (b) used as a parameter in an algorithm that determines a property related to the micro-feature.

A1-2. A device for assaying a micro-feature in a sample using an imager, the device comprising:
a solid-phase surface comprising a sample contact area for contacting a sample which contains a micro-feature; and
one or more monitoring marks, wherein each monitoring mark comprises either a protrusion or a trench from the solid-phase surface, wherein:
 i. the protrusion or the trench comprises a flat surface that is substantially parallel to a neighbor surface that is a portion of the solid-phase surface adjacent the protrusion or the trench;
 ii. a distance between the flat surface and the neighboring surface is about 200 micron (μm) or less;
 iii. the flat surface is an area that has (a) a linear dimension is at least about 1 μm or larger, and (b) at least one linear dimension 150 μm or less;
 iv. the flat surface of at least one monitoring mark is imaged by an imager used during assaying the micro-feature; and
 v. a shape of the flat surface, a dimension of the flat surface, a distance between the flat surface and the neighboring surface, and/or a pitch between monitoring marks are (a) predetermined and known prior to assaying of the micro-feature, and (b) used as a parameter in an algorithm that determines a property related to the micro-feature.

B. Monitoring Marks on QMAX Card

A2-1. A device for assaying a micro-feature in a sample using an imager, the device comprising:
a first plate, a second plate, spacers, and one or more monitoring marks, wherein:
 i. the first plate and the second plate are movable relative to each other into different configurations;
 ii. each of the first plate and the second plate comprises an inner surface comprising a sample contact area for contacting a sample that contains a micro-feature;
 iii. one or both of the first plate and the second plate comprises the spacers that are permanently fixed on the inner surface of a respective plate,
 iv. the spacers have a substantially uniform height that is equal to or less than 200 microns, and a fixed inter-spacer-distance (ISD);
 v. the monitoring marks are made of a different material from the sample;
 vi. the monitoring marks are inside the sample during an assaying the microstructure, wherein the sample forms, on the sample contact area, a thin layer of a thickness less than 200 μm; and
 vii. the monitoring marks have their lateral linear dimension of about 1 μm (micron) or larger, and have at least one lateral linear dimension of 300 μm or less;
wherein during the assaying at least one monitoring mark is imaged by the imager wherein used during assaying the micro-feature; and a shape of the flat surface, a dimension of the flat surface, a distance between the flat surface and the neighboring surface, and/or a pitch between monitoring marks are (a) predetermined and known prior to assaying of the micro-feature, and (b) used as a parameter in an algorithm that determines a property related to the micro-feature;

wherein one of the configurations is an open configuration, in which: the two plates are partially or completely separated apart, the spacing between the plates is not regulated by the spacers, and the sample is deposited on one or both plates;

wherein another of the configurations is a closed configuration which is configured after the sample is deposited in the open configuration and the plates are forced to the closed configuration by applying the pressing force on the force area; and in the closed configuration: at least part of the sample is compressed by the two plates into a layer of highly uniform thickness and is substantially stagnant relative to the plates, wherein the uniform thickness of the layer is confined by the sample contact areas of the two plates and is regulated by the plates and the spacers; and wherein a monitoring mark is (i) a different structure from the spacers, or (ii) the same structure that is used as a spacer.

A2-2. A device for assaying a micro-feature in a sample using an imager, the device comprising:

a first plate, a second plate, spacers, and one or more monitoring marks, wherein:
  i. the first plate and the second plate are movable relative to each other into different configurations;
  ii. each of the first plate and the second plate comprises an inner surface comprising a sample contact area for contacting a sample that contains a micro-feature;
  iii. one or both the first plate and the second plate comprises the spacers that are permanently fixed on the inner surface of a respective plate;
  iv. the spacers have a substantially uniform height that is equal to or less than 200 microns, and a fixed inter-spacer-distance (ISD);
  v. each monitoring mark comprises either a protrusion or a trench on one or both sample contact areas;
  vi. the protrusion or the trench comprises a flat surface that is substantially parallel to a neighbor surface that is a portion of the solid-phase surface adjacent the protrusion or the trench;
  vii. a distance between the flat surface and the neighboring surface is about 200 micron ($\mu m$) or less;
  viii. the flat surface is an area that has (a) a linear dimension is at least about 1 $\mu m$ or larger, and (b) at least one linear dimension 150 $\mu m$ or less;
  ix. the flat surface of at least one monitoring mark is imaged by an imager used during assaying the micro-feature; and
  x. a shape of the flat surface, a dimension of the flat surface, a distance between the flat surface and the neighboring surface, and/or a pitch between monitoring marks are (a) predetermined and known prior to assaying the micro-feature, and (b) used as a parameter in an algorithm that determines a property related to the micro-feature.

wherein one of the configurations is an open configuration, in which: the two plates are partially or completely separated apart, the spacing between the plates is not regulated by the spacers, and the sample is deposited on one or both plates;

wherein another of the configurations is a closed configuration which is configured after the sample is deposited in the open configuration and the plates are forced to the closed configuration by applying a pressing force on the force area; and in the closed configuration: at least part of the sample is compressed by the two plates into a layer of highly uniform thickness and is substantially stagnant relative to the plates, wherein the uniform thickness of the layer is confined by the sample contact areas of the two plates and is regulated by the plates and the spacers; and wherein a monitoring mark is (i) a different structure from the spacers, or (ii) the same structure that is used as a spacer.

A3. A device for image-based assay, comprising:
  a device of any prior device embodiment, wherein the device has at least five monitoring marks wherein at least three of the monitoring marks are not aligned on a linear line.

A4. An apparatus for assaying an analyte in a sample using an imager, the system comprising:
  (a) a device of any prior device embodiment; and
  (b) an imager that is used in assaying a sample suspected of containing an analyte.

A5. A system for performing an imaging-based assay, the system comprising:
  (a) a device of any prior device embodiment;
  (b) an imager that is used in assaying a sample of containing an analyte; and
  (c) An algorithm that utilizes the monitoring marks of the device to determine a property related to the analyte.

In some embodiments, the thickness of the thin layer is configured, so that analytes form a monolayer in the sample holder. The term "monolayer" means that in the thin sample layer inside the sample holder, there is no substantial overlap between two neighboring analytes in the direction normal to the plane of the sample layer.

C. Monitoring Marks with Computation Imaging, Artificial Intelligence and/or Machine Learning Another aspect of the present invention is to utilize the pillars or monitoring marks of the sample holding device with computational imaging, artificial intelligence and/or machine learning. It has a process of forming the images from measurements, using algorithms to process the image and map the objects in the image to their actual dimensions in real world. Machine learning (ML) is applied in the present invention to learn the salient features of the objects in the sample, captured by the ML models, built and trained from the images of the sample taken by the imager. Intelligent decision logic is built into and applied in the inference process of the present invention to detect and classify the target objects in the sample according to the knowledge embedded in the ML models.

Figure 7A:
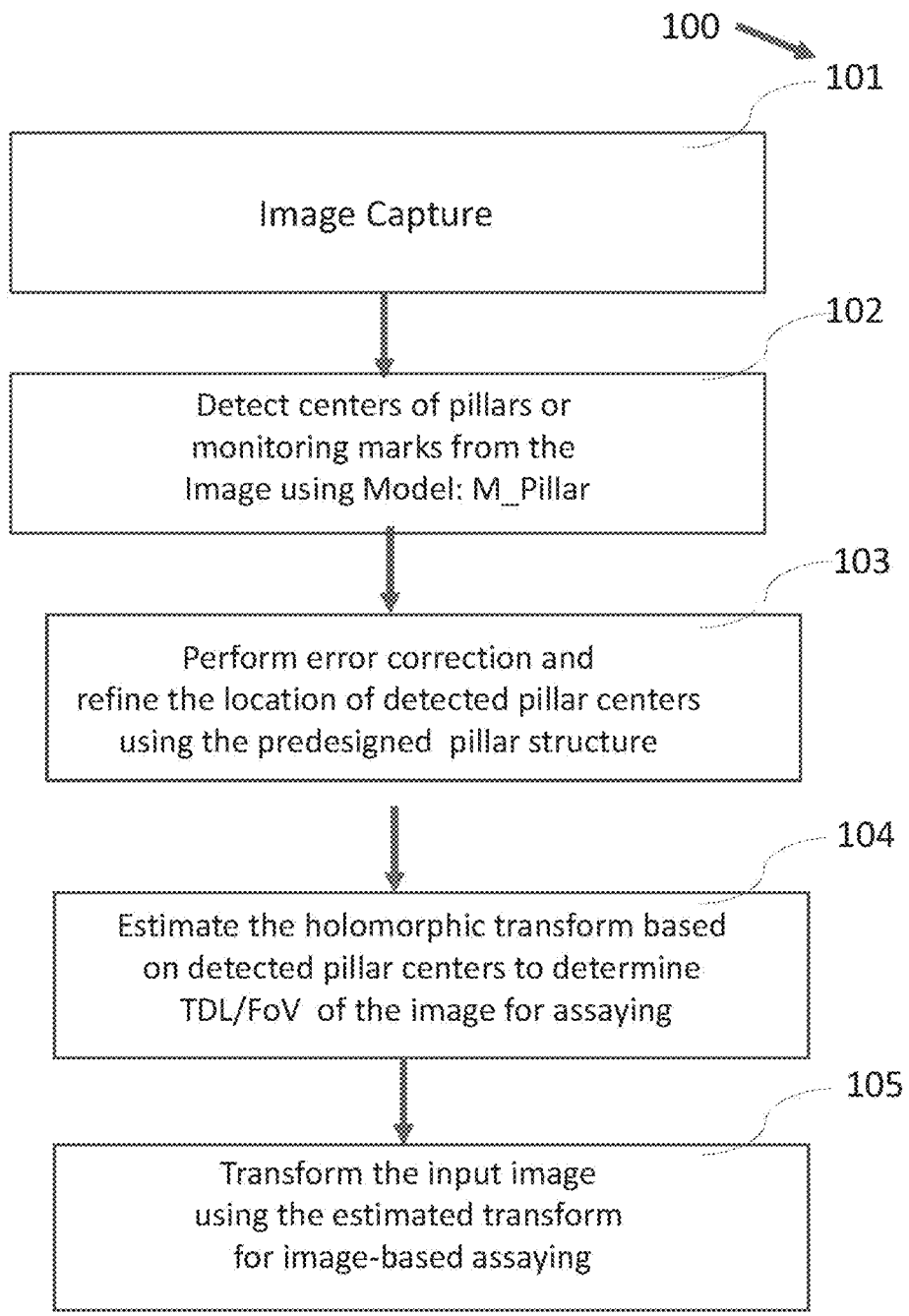
FIG. 7A shows the flow diagram of TLD/FoV estimation based on pillars or monitoring marks in the image-based assay, in accordance with one or more embodiments.

FIG. 7A shows a block diagram of process 100 for TLD (true-literal-dimension)/FoV (field-of-view) estimation in the present invention. In various implementations of the process 100, actions may be removed, combined, or broken up into sub-actions. The process begins at the action module 101, where the process captures an image of the sample for assaying, wherein the image is taken by an imager over the sample holding device, e.g., QMAX card, that has pillars or monitoring marks and a structure described in the previous section of monitoring marks on QMAX card. The captured image from action module 101 is fed to the action module 102 as input and in the action module 102, the image for assaying is processed and searched to detect and locate the centers of pillars or monitoring marks. In a typical implementation, the process 102 has a pre-trained machine learning model, M_Pillar, to detect pillar or monitoring mark in the image for assaying.

As described before, pillars or monitoring marks in the present invention have a known shape and dimension, fabricated by high precision nano-imprint fabrication process. Moreover, these pillars or monitoring marks are distributed in a pre-defined periodic pattern in the sample holding device and have a known pitch distance between them. These features in the present invention become critical for the process 100, because pillars or monitoring marks are small, around ~30 microns, surrounded by samples in the sample holding device, and subjected to strong light scattering and diffractions among particles in the sample. In addition, they are often not in the focus of the imager as the imager is focused on the analytes in the sample for the image-based assay, not on the structures of the sample holder. Consequently, errors do occur even with detection using machine learning models, in which some of the pillars are not detected, falsely detected, or detected with a wrong or inaccurate center position, making the direct use of the detected pillars and center positions becoming unreliable and introducing errors for TLD/FoV estimation.

As illustrated in FIG. 7A, the action module 103 takes the detected pillars and their centers from the action module 102 in the process 100, and it performs post error correction and estimation refinement based on the properties of pillars or monitoring marks described in the present invention. In particular, the detected pillars should be aligned in a pre-defined known periodic pattern and the distance between two adjacent pillar centers should subject to a known pitch distance, etc. The action taken by the action module 103 is to eliminate false detections, align the detected pillars in the design pattern known from fabrication, using the periodicity of their distribution to find others, and adjust the position of the pillar centers according to the known periodicity and pitch distance between them. The combination of the actions taken by the action module 102 and 103 in present invention, makes pillar or monitoring mark detection robust with precision for TLD/FoV estimation.

Figure 7B:
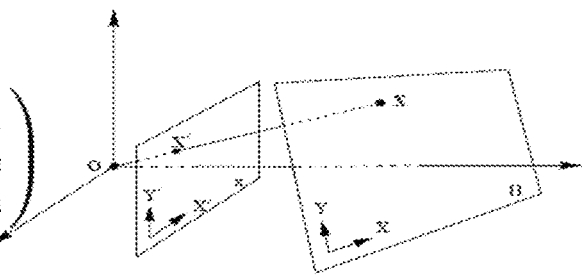
FIG. 7B illustrates modeling an object by a perspective projection between the object in an image being taken and the actual object in real world being imaged upon, in accordance with one or more embodiments.

In the action module 103 of the process 100, it estimates a homographic transform based on the detected pillar centers from action module 102 and 103. The homographic transform is known in the art of image processing where the image taken by the imager on the sample is modeled by a perspective projection between the objects in the image being taken and the actual objects in real world being imaged upon. FIG. 7B illustrates a perspective projection can be characterized by a homographic transform (a.k.a. perspective transform) described by a transformation matrix H, in accordance with an embodiment.

In an embodiment, the perspective projection shown in FIG. 7B can be represented by x'=Hx, where H is a 3×3 non-singular homogenous matrix that maps objects in the image taken by the imager to the objects in the actual sample plan which is being imaged upon, from which the length or the area of the objects in the image taken by the imager is mapped to its actual size in real world, and by which the TLD/FoV of the objects and their actual size in the image can be determined.

However, to determine the transformation matrix H, it requires to know at least 4 pairs of points corresponding to the mapping of H from the image taken by the imager to the actual sample plan being imaged upon. And these 4 pairs of points are used as anchors that bind the image taken by the imager and the actual sample plan being imaged upon through a homographic transform between them, and it needs at least 4 non-colinear pillar centers to make the H matrix non-singular. By the actions in the action module 102, and by applying the structural features of pillars or monitoring marks in the action module 103, more than 4 non-colinear pillar center points can be detected and their corresponding positions in the actual image plan can be determined based on the structural features of pillars or monitoring marks in the sample holding device. As such, the action module 104 of the process 100 estimates the homographic transform matrix H for TLD/FoV estimation based on the detected pillar centers from the action module 103. Moreover, in action module 104, it uses the estimated transformation matrix H to do TLD/FoV estimation in the subsequent image-based assaying process.

Figure 8:
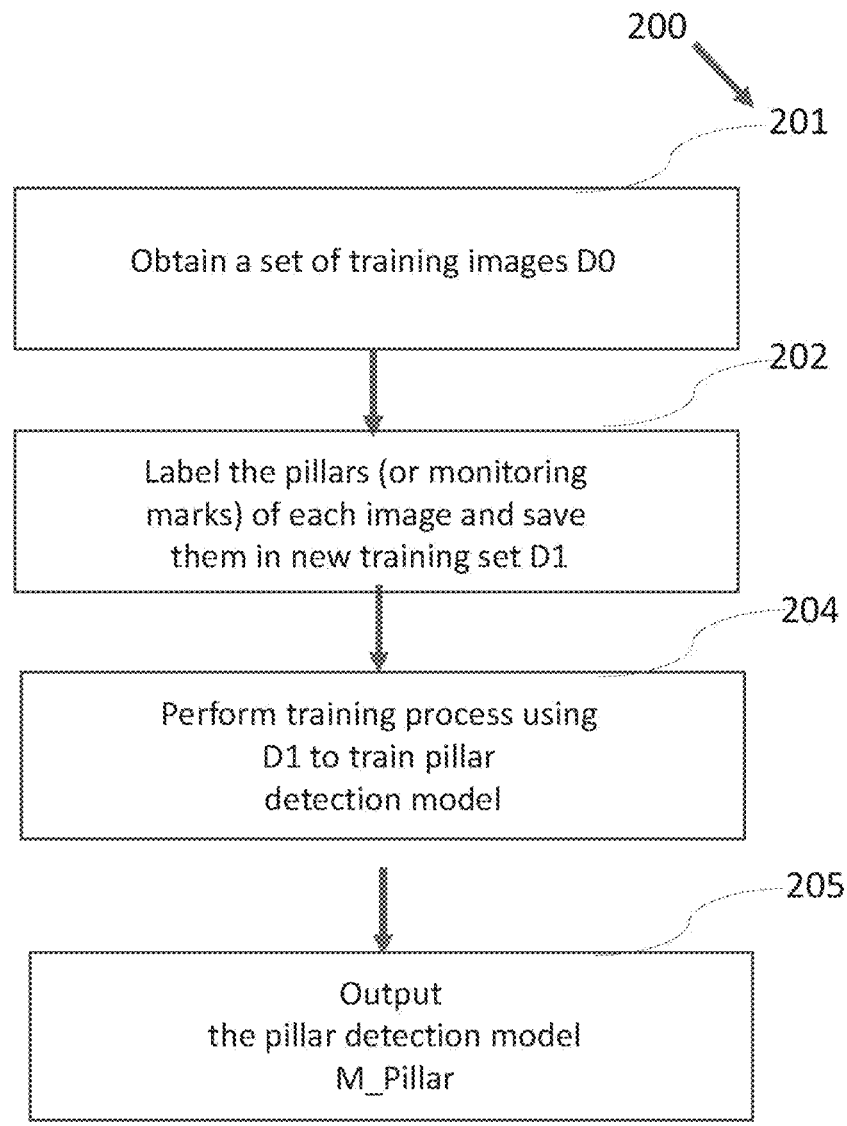
FIG. 8 shows flow diagram of training the machine learning model for pillar or monitoring mark detection, in accordance with one or more embodiments.

In the present invention, dedicated machine learning model for pillar or monitoring mark detection is built from the training data. In some embodiment of the present invention, the pillar and monitoring mark detection is performed directly on the image for assaying. FIG. 8 shows a block diagram of process 200 for building a machine learning model for pillar or monitoring mark detection on the original input image for assaying. The process begins at the action module 201, where the process obtains a set of images for assaying from the imager in a training database DB0. These images are collected by taking image on the samples in the sample holding device, e.g., QMAX card. In the action module 202, it takes each training image from DB0 and label the pillars or monitoring marks in each image. The labeled images are saved in a second training database DB1 for machine learning model training. This training dataset DB1 is dedicated for training machine leaning model to detect pillars or monitoring marks, which is different from the typical training database for detecting analytes in the sample.

In the action module 203, it takes the new training database DB1 from the action module 202, and select a machine learning model structure, in a form of deep neural network, to train the model against the training database DB1. In some embodiment of the present invention, a machine learning model of RetinaNet is used, and in some other embodiments, a machine learning model of Fast-RCNN is selected. Tensorflow and PyTourch are used to train the machine learning model using the training database DB1 for pillar or monitoring mark detection. The process 200 ends with the action module 205, in which the machine learning model obtained from the action module 204 are verified and saved for assaying applications.

Figure 9:
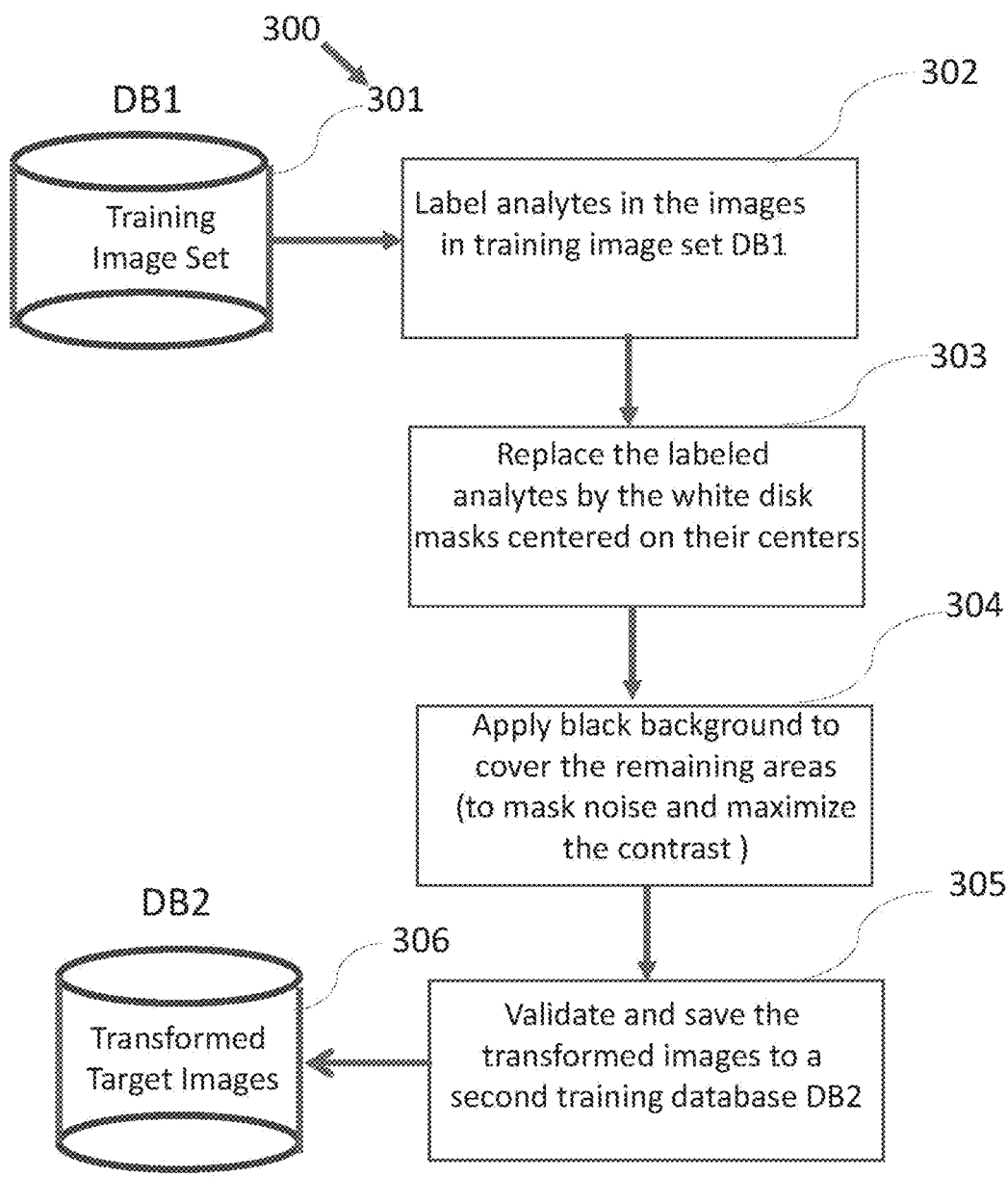
FIG. 9 shows the flow diagram of generating training database for Image transform based machine learning model, in accordance with one or more embodiments.

FIG. 9 is a block diagram of creating a special training database for the image transform-based machine learning approach for pillar and monitoring mark detection. The process 300 starts with the action module 301 that takes a training image database DB1A consisting of images for assaying taken by the imager. In the action module 302, the images from DB1A are labeled for pillars or monitoring marks. The labeled images in DB1A are the input to the action module 303, where they are transformed by covering the labeled pillar or monitoring mark with a white mask along its contour. The transformed images from the action module 303 are inputs to the action module 304, where they are further transformed by applying the black mask on areas in the image not covered by the white masks from the action module 303. Using white masks for pillars and black masks for areas not covered by white masks in the present invention has two advantages. One it maximizes the contrast between the pillars and other areas, and second, it suppresses the noise in the background, making the subsequent detection of the pillars or monitoring marks and their centers more robust. In action module 304, the transformed image by 302 and 303 are verified and saved in a new target image training database DB2A for training the image transformation model in pillar or monitoring mark detection.

Figure 10:
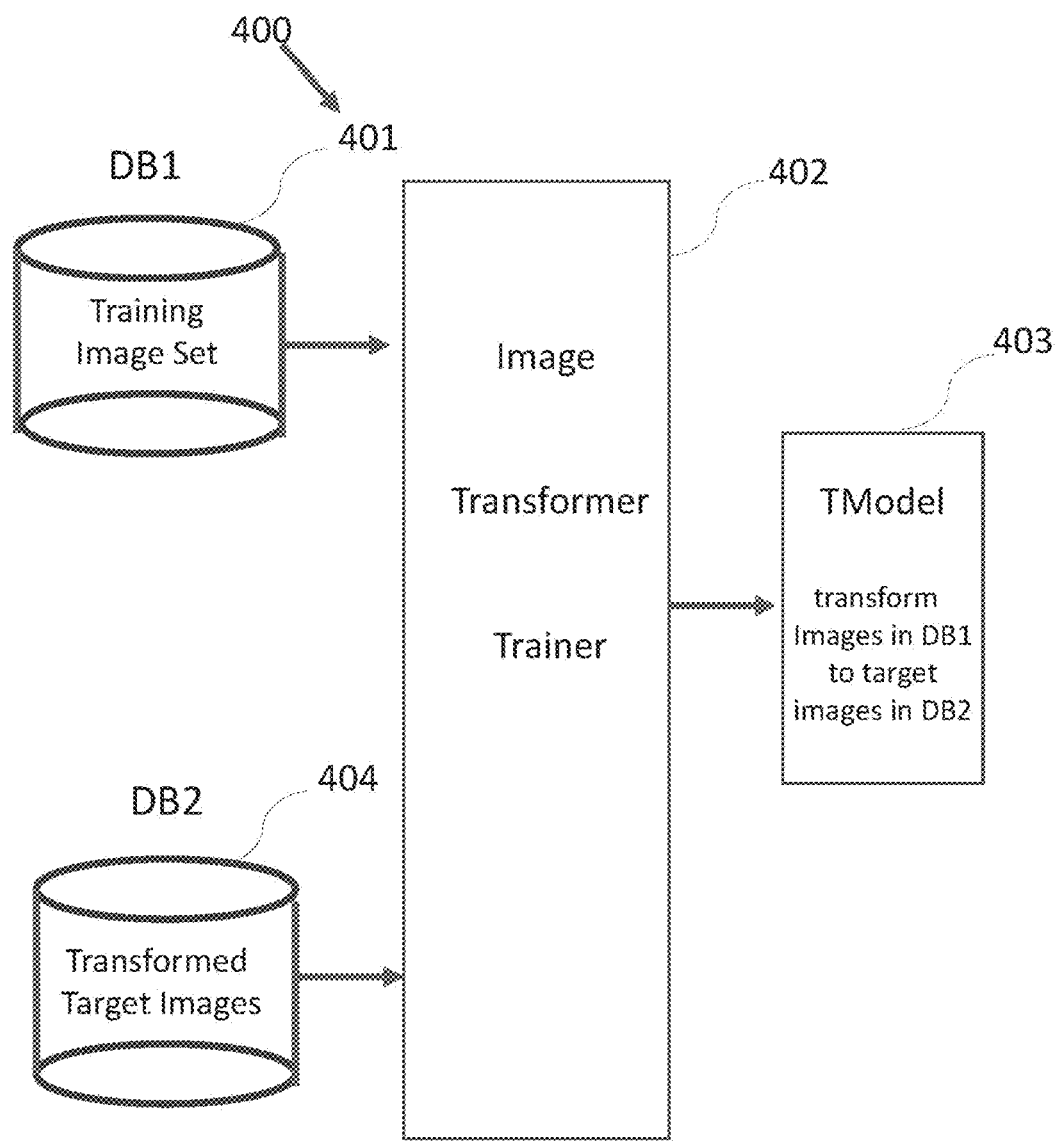
FIG. 10 shows a flow diagram of training the image transform model for image transform based pillar or monitoring mark detection, in accordance with one or more embodiments.
Figure 11:
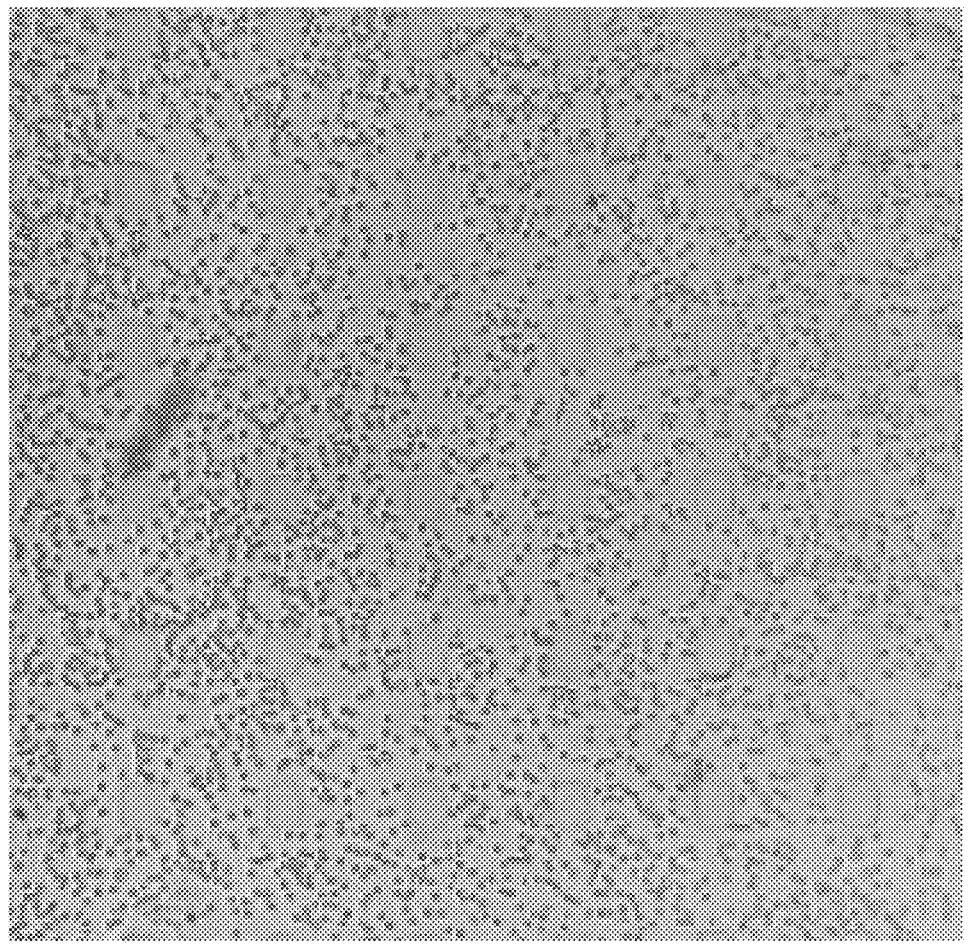
FIG. 11 is a sample image for image-based assay with pillars in the sample holding device, in accordance with one or more embodiments.
Figure 12:
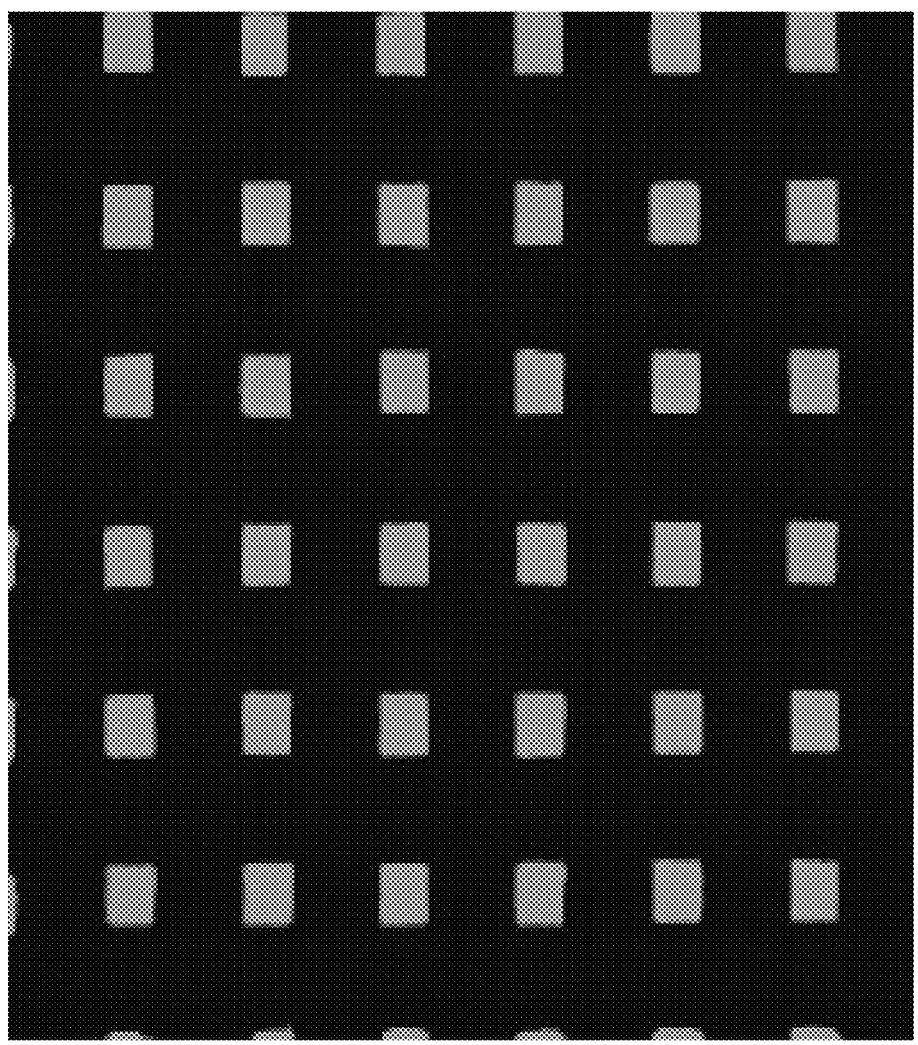
FIG. 12 shows the detected pillars in the transformed image used in pillar or monitoring mark detection, in accordance with one or more embodiments.

FIG. 10 shows a block diagram of building an image transform based machine learning model for pillar and monitor mark detection. The process 400 starts with the action module 401. The action module 401 load a training image database DB1A consisting of the images taken by the imager for assaying. The action module 402 load the target image training database DB2A obtained by transforming the images in DB1A using process 300 described previously. In the action module 403, it takes DB1A the training image database and the paired target image training database DB2A from the action module 402 as training target. It selects a machine learning framework to train a machine learning model that transforms the original images taken by the imager for assaying to new images of white pillar or monitoring masks and black background in the target image training database. In some embodiment of the present invention, the machine learning framework of Pixel-to-Pixel (P2P) transform is selected, and in some other embodiment of the present invention, the machine learning framework of CycleGAN is used. The action module 403 trains a machine learning model TModel using the training image database DB1A and the paired target image transform database DB2A from the process 300. In an embodiment of the present invention, the pillar and monitoring mark detection comprises the following actions:

1. taking the image for assaying as input;
2. applying the image transform model TModel to transform the input image for assaying to image with white color masks covering the pillars or monitoring marks and covering the rest of the area by black color masks described herein;
3. detecting the pillar or monitoring marks in the transformed image;
4. re-mapping the detected pillar or monitoring mark centers back to the original input image;
5. performing error correction on the location of the detected pillar or monitoring marks against original input image using the constraints from the predesigned pillar or monitoring mark structure in the sample holding device;
6. determining the centers of the detected pillar or monitoring marks and refining their locations in the image of the sample according to the constraints of the known distribution structure of them in the sample holding device; and
7. estimating the holomorphic transform on the image of the sample based on the detected pillar or monitoring mark centers to determine TLD/FoV for the subsequent image-based assaying.

Figure 15:
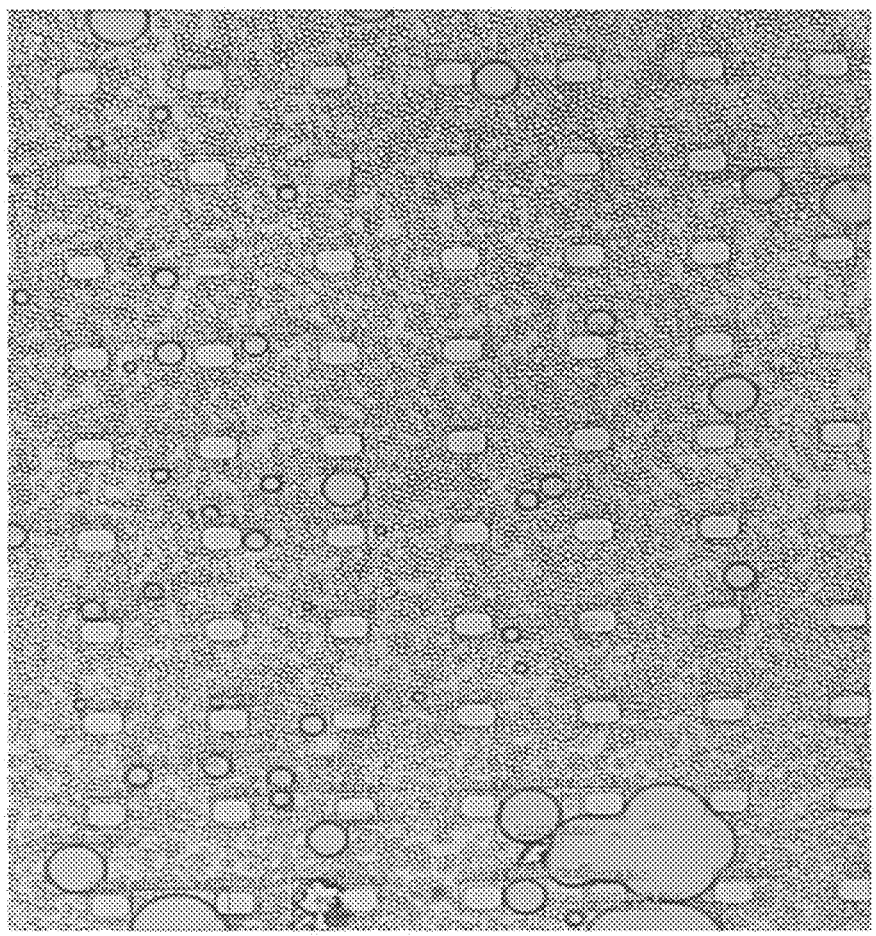
FIG. 15 is an Image of the sample with large air bubbles.
Figure 16:
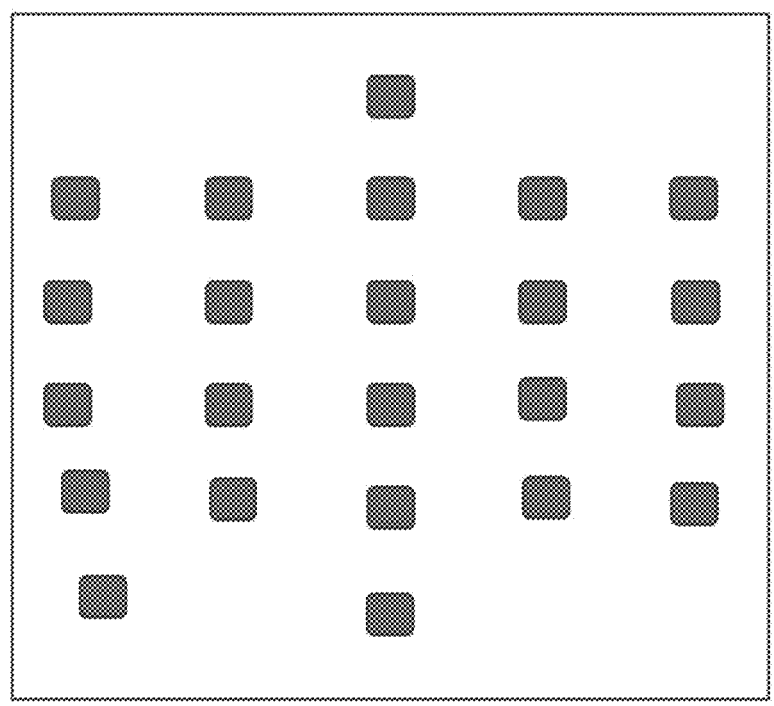
FIG. 16 illustrates the detected pillars in the image of the sample, in accordance with one or more embodiments.

FIG. 15 is an actual image of the sample taken by an imager for assaying the red blood cell. It is apparent that the noise level in the image of the sample is quite high, and in the image of the sample, the focus on the monitoring structures, e.g., pillars or monitoring marks in the sample holder, is poor, because in the image-based assaying, the focus is on the analytes not on the prereferals. This makes the detection and location of the pillars or monitoring marks in the image of the sample challenging. FIG. 16 shows the detection results of the pillars of monitoring marks from the image of the sample in assaying red blood cell based on the transformed image using the system and methods described herein.

In some embodiment of the present invention, the image for assaying are partitioned into disjoint patches, and patch dependent holomorphic transform is estimated for each image patch if there are at least 4 detected non-collinear pillar centers in that patch. Otherwise, it uses the holomorphic transform estimated from all detected pillar centers in the image to determine the TLD/FoV in the image-based assaying.

Micro-Selective-Image-Assaying with Area-of-Interest Selection, Volume Estimation and Defects Removal The method of TLD/FoV estimation described herein opens the possibility for other applications in image-based assaying. In some embodiment of the present invention, it is applied to remove the defects, e.g., air bubbles, dusts, etc. in the image-based assaying. Air bubbles and dusts can occur in samples, depending on the environment, assaying operation, and the type of the sample being used for assaying. These defects in the sample for assaying should be taken away from the sample for better assaying accuracy. However, this can be extremely difficult once these defects occur and are trapped in the closed space of the sample holding device. And moreover, in many cases, the device is press sealed and should not be opened again.

Figure 13:
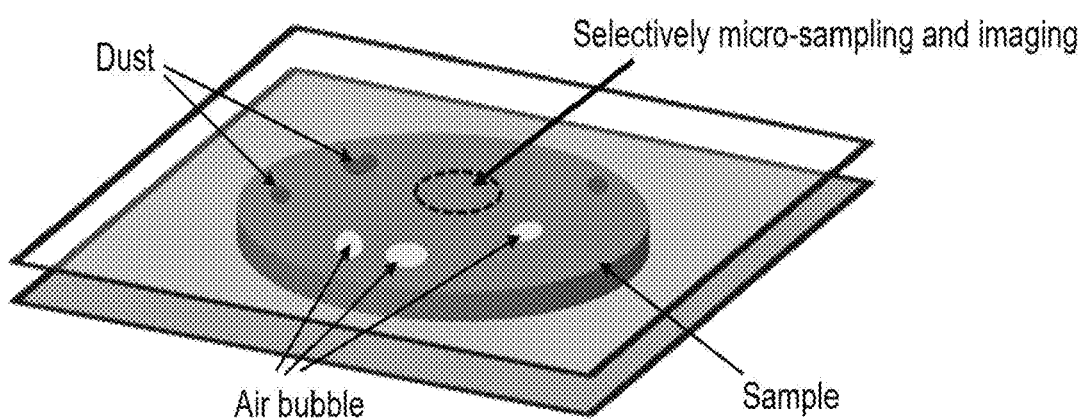
FIG. 13 illustrates the defects of air bubbles and dusts in a sample for assaying, in accordance with one or more embodiments.
Figure 14:
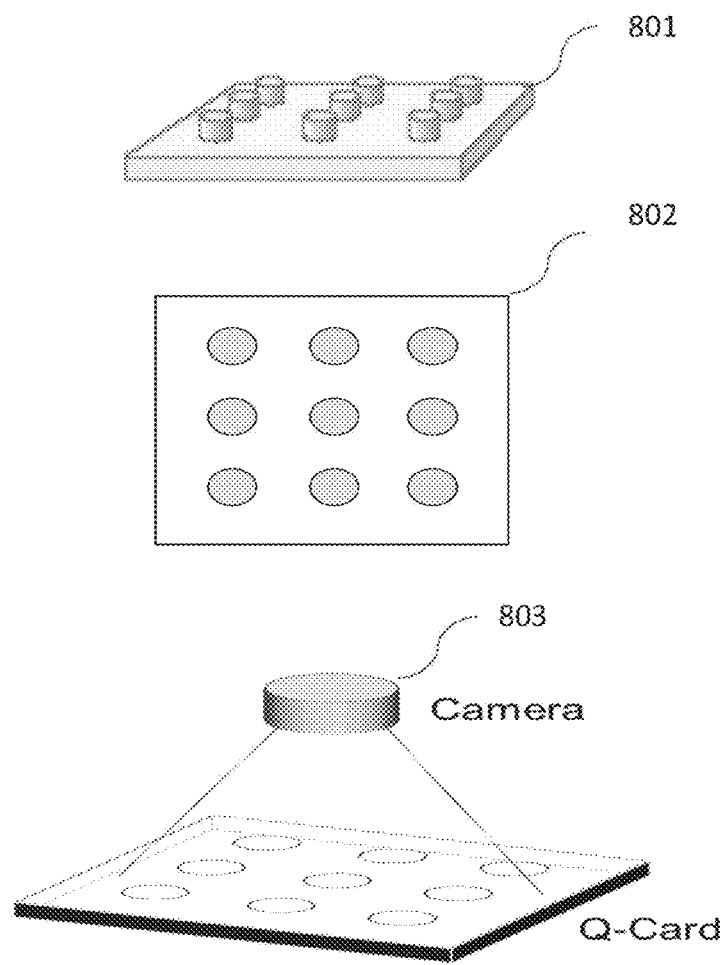
FIG. 14 is a three-side view of the sample holding device, QMAX card with pillars or monitoring marks in the image-based assay using an imager, in accordance with one or more embodiments.

FIG. 13 depicts the situation that both air bubbles and dusts occur in the sample. In some embodiment of the present invention, it performs the micro-selective-image-assaying, comprising:

1. taking the image of the sample for assaying as input;
2. estimating the TLD/FoV of the image of the sample from (1) for area, size and consequent sample volume estimation;
3. detecting the defects, e.g., air bubbles, dusts, etc., in the image of the sample for assaying and segmenting these defects in the image of the sample by a trained machine learning model;
4. estimating the total areas of segmented defects in the image of the sample and calculating their actual area size by using the estimated TLD/FoV from (2) that utilizing the pillars and monitoring marks of the sample holding device;
5. estimating the actual volume of the sample corresponding to the total surface area of the detected defects in the image of the sample for assaying, according to the area estimate from (4) and the known height of the sample in the sample holding device;
6. removing the surface areas of the detected defects in the image of the sample for assaying and updating the total volume of the sample by subtracting the defect volume estimate from (5) which corresponds to the total volume under the surface area of the detected defects in the image of the sample; and
7. performing the image-based assaying on the selected area in the updated sample image with the updated sample volume from (6).

In some embodiment of the present invention, the area removed from the image of the sample is larger than the area of the detected defects with a margin 4, and consequently, a larger volume is virtually removed in the image-based assaying according to the enlarged defects area. One benefit of this operation is to further reduce the negative impact of the defects on the assaying results, because analytes can attach to the defects and the local uniformity of the analytes distribution can be influenced.

As described herein, the present invention makes a critical use of the structure of the sample holding device, e.g., QMAX card, and the pillars or monitoring marks therein. In particular, the image of the sample taken by the imager on the sample holding device, e.g., QMAX card, is a pseudo-3D image, because the height of the sample in the sample holding device is known priori and uniform. As such, the sample volume corresponding to the surface area of the objects in the image of the sample can be determined, once its actual area size in the original sample plan can be obtained.

To obtain an estimate of the actual area in the original sample plan, the structure of the pillars or monitoring marks in the sample holding device are utilized for more reliable TLD/FoV estimation. This leads to a paradigm of micro-selective-image-assaying in the image-based assay, by which the assaying process can select certain area/volume from the image of the sample taken by the imager for assaying.

For example, in some embodiment of the present invention, it selects certain area where analytes are not forming clusters with the sample volume of the selected area determined from the image of the sample and the uniform height of the sample in the sample holding device.

In some embodiment, it selects the area in the image of the sample based on less defects, better signal-to-noise ratio, focus condition, etc. for better assaying accuracy. The combination of machine learning based pillar and monitoring mark detection for FoV estimation and the machine learning based defects detection and segmentation to reduce the variations in the sample, makes the described approach in the present invention flexible and resilient in the image-based assaying.

Monitoring Assay Operations Using Monitoring Marks

In some embodiments, the thickness of the sample is configured to a thin thickness, so that the objects (e.g., cells) of interests forming a monolayer (i.e., there is no significant overlap between the object in the direction normal to the sample layer).

As such, a method for determining a fabrication quality of a QMAX card using an imager, comprising:
(a) obtaining a device of any prior embodiment, wherein the device comprises two movable plates, spacers, and one or more monitoring marks where the monitoring marks are in the sample contact area;
(b) obtaining an imager;
(c) depositing a sample in the sample contact area of the device of (a), and forcing the two plates into a closed configuration;
(d) taking, using the imager, one or more images of the thin sample layer; and
(e) using the image of the monitoring marks to determine the fabrication quality of the QMAX card.

In addition, a method for determining a fabrication quality of a QMAX card using an imager, the method comprising:
(a) obtaining a device in prior embodiments, wherein the device has two movable plates, spacers, and one or more monitoring marks where the monitoring marks are in the sample contact area;
(b) obtaining an imager;
(c) depositing a sample in the sample contact area of the device of (a), and forcing the two plates into a closed configuration;
(d) taking, using the imager, one or more images of the thin sample layer together with the monitoring marks; and
(e) using the image of the monitoring marks to determine the fabrication quality of the QMAX card.

The method of any prior embodiment, wherein determining the fabrication quality comprises measuring a characteristic (e.g., a length, width, pitch, webbing) of one or more monitoring marks, and comparing the measured characteristic with a reference value to determine a fabrication quality of the QMAX card.

The method of any prior embodiment, wherein determining the fabrication quality comprises measuring a first characteristic (e.g., an amount, a length, width, pitch, webbing) of one or more first monitoring marks, and comparing the measured first characteristic with a second characteristic (e.g., a number, a length, width, pitch, webbing) of one or more second monitoring marks to determine a fabrication quality of the QMAX card.

The method of any prior embodiments, wherein assaying is performed during the use of the device of any prior embodiment to analyze a sample.

One aspect of the present invention is that for assaying with a QMAX card that have two moveable plates, monitoring marks placed inside a thin sample can be used to monitor the operation conditions for the QMAX card. The operation conditions can include whether the sample is loaded properly, whether the two plates are closed properly, whether the gap between the two plates is the same or approximately the same as a predetermined value.

In some embodiments, for a QMAX card that comprises two movable plates and has, in a closed configuration, a predetermined gap between the two plates, the operation conditions of the QMAX card based assay are monitored by taking the images of the monitoring mark in a closed configuration. For example, if the two plates are not closed properly, the monitoring marks will appear differently in an image from the situation that the two plates are closed properly. A monitoring mark surrounded by a sample (properly closed) will have a different appearance than a monitoring mark not surrounded (not properly closed) by the sample. Hence, it can provide information on the sample loading conditions. A device for using a monitoring mark to monitor an operation condition of the device comprises a first plate, a second plate, spacers, and one or more monitoring marks, wherein:
i. the first plate and the second plate are movable relative to each other into different configurations;
ii. each of the first plate and the second plate comprises an inner surface comprising a sample contact area for contacting a sample being analyzed;
iii. one or both the first plate and the second plate comprises the spacers that are permanently fixed on the inner surface of a respective plate;
iv. the monitoring mark has at least one of its dimensions that (a) is predetermined and known, and (b) is observable by an imager;
v. the monitoring mark is a microstructure that has at least one lateral linear dimension of 300 μm or less; and
vi. the monitoring mark is inside the sample;
wherein one of the configurations is an open configuration, in which: the two plates are partially or completely separated apart, the spacing between the plates is not regulated by the spacers, and the sample is deposited on one or both plates;
wherein another configuration is a closed configuration, which is configured after the sample is deposited in the open configuration and the plates are forced to the closed configuration by applying the imprecise pressing force on the force area; and in the closed configuration: at least part of the sample is compressed by the two plates into a layer of highly uniform thickness and is substantially stagnant relative to the plates, wherein the uniform thickness of the layer is confined by the sample contact areas of the two plates and is regulated by the plates and the spacers; and
wherein, after a force is used in making the two plates reach a close configuration, the monitoring mark is imaged to determine (i) whether the two plates have reached the intended closed configuration thereby regulating the sample thickness to be approximately a predetermined thickness, and/or (ii) to determine whether a sample has been loaded as desired.

In some embodiments, the image of the monitoring mark is used to determine whether the two plates have reached the intended closed configuration, wherein the sample is regulated to have a thickness of approximately a predetermined thickness.

In some embodiments, the image of the monitoring mark is used to determine whether a sample has been loaded as desired.

In some embodiments, the monitoring mark is imaged to determine whether the two plates have reached the intended closed configuration wherein the sample thickness is regulated to be a predetermined thickness, and to determine whether a sample has been loaded as desired.

In some embodiments, the spacers serve as the monitoring marks.

In some embodiments, the system comprises the device and a computational device and a non-transitory computer readable medium having instructions that, when executed, it performs the determination process in assaying.

In some embodiments, a non-transitory computer readable medium has instructions that, when executed, perform a method comprising using one or more images of a thin sample layer together with monitoring marks to determine (i) whether the two plates have reached the intended closed configuration thereby regulating the sample thickness to be approximately a predetermined thickness, or (ii) whether a sample has been loaded as desired.

In some embodiments, the system comprises a non-transitory computer readable medium having instructions that, when executed, perform any method of the present disclosure.

W-1. A method for using a monitoring mark to monitor an operating condition of the device, the method comprising:
 a) obtaining a device of any prior embodiment, wherein the device comprises two movable plates, spacers, and one or more monitoring marks where the monitoring marks are in the sample contact area;
 b) obtaining an imager;
 c) depositing a sample in the sample contact area of the device of (a), and forcing the two plates into a closed configuration;
 d) taking, using the imager, one or more images of the thin sample layer together with the monitoring marks; and
 e) using the image of the monitoring marks to determine (i) whether the two plates have reached the intended closed configuration thereby regulating the sample thickness to be approximately a predetermined thickness, or (ii) whether a sample has been loaded as desired.

SOME EXAMPLES

Single Plate
AA-1.1 A device for assaying a micro-feature in a thin sample using an imager, the device comprising:
 (a) a solid-phase surface comprising a sample contact area for contacting a thin sample having a thickness of 200 μm or less, and comprising or is suspected to comprise a micro-feature; and
 (b) one or more marks, wherein the mark:
  I. has a sharp edge that (i) has predetermined and known shape and dimension, and (ii) is observable by an imager that images the micro-feature;
  II. is a microstructure that at least one lateral linear dimension of 300 μm or less; and
  III. is inside the sample;
 wherein at least one of the marks is imaged by the imager during the assaying.

AA-1.2 A device for assaying a micro-feature in a thin sample using an imager, the device comprising:
 (a) a solid-phase surface comprising a sample contact area for contacting a thin sample having a thickness of 200 μm or less, and comprises or is suspected to comprise a micro-feature; and
 (b) one or more marks, wherein the mark:
  i. comprises either a protrusion or a trench from the solid-phase surface
  ii. has a sharp edge that (i) has predetermined and known shape and dimension, and (ii) is observable by an imager that images the micro-feature;
  iii. is a microstructure that at least one lateral linear dimension of 300 μm or less; and
  iv. is inside the sample;
 wherein at least one of the marks is imaged by the imager during the assaying.

Two Plates with a Constant Spacing
AA-2.1 A device for assaying a micro-feature in a thin sample using an imager, the device comprising:
 a first plate, a second plate, and one or more monitoring marks, wherein:
  i. each of the first plate and the second plate comprises an inner surface comprising a sample contact area for contacting a sample that comprises or is suspected to comprise a micro-feature;
  ii. at least a portion of the sample is confined by the first and second plates into a thin layer of substantial constant thickness that 200 μm or less;
  iii. the monitoring mark has a sharp edge that (a) has predetermined and known shape and dimension, and (b) is observable by an imager that images the micro-feature;
  iv. the monitoring mark is a microstructure that at least one lateral linear dimension of 300 μm or less; and
  v. the monitoring mark is inside the sample;
 wherein at least one of the marks is imaged by the imager during the assaying.

Two Movable Plates
AA-3 A device for assaying a micro-feature in a thin sample using an imager, the device comprising:
 a. a first plate, a second plate, spacers, and one or more monitoring marks, wherein:
 ii. the first plate and the second plate are movable relative to each other into different configurations;
 iii. each of the first plate and the second plate comprises an inner surface comprising a sample contact area for contacting a sample that comprises or is suspected to comprise a micro-feature;
 iv. one or both of the first plate and the second plate comprises the spacers that are permanently fixed on the inner surface of a respective plate,
 v. the monitoring mark has a sharp edge that (a) has predetermined and known shape and dimension, and (b) is observable by an imager that images the micro-feature;
 vi. the monitoring mark is a microstructure that at least one lateral linear dimension of 300 μm or less; and
 vii. the monitoring mark is inside the sample;
 wherein at least one of the marks is imaged by the imager during the assaying;
 wherein one of the configurations is an open configuration, in which the two plates are partially or completely separated apart, the spacing between the plates is not regulated by the spacers, and the sample is deposited on one or both plates;

wherein another of the configurations is a closed configuration which is configured after the sample is deposited in the open configuration and the plates are forced to the closed configuration by applying the imprecise pressing force on the force area; and in the closed configuration: at least part of the sample is compressed by the two plates into a layer of highly uniform thickness and is substantially stagnant relative to the plates, wherein the uniform thickness of the layer is confined by the sample contact areas of the two plates and is regulated by the plates and the spacers; and wherein a monitoring mark is (i) a different structure from the spacers, or (ii) the same structure that is used as a spacer.

Image taking Improvement Using Sample Holder Having Micro-Marks

BB-1. An apparatus for improving image-taking of a micro-feature in a sample, the apparatus comprising:
  (c) a device of any prior device embodiment; and
  (d) an imager being used in assaying a sample that comprises or is suspected to comprise a micro-feature; wherein the imager takes images, and wherein at least one image comprises both a portion of sample and the monitoring.

CB-2. A system for improving image-taking of a micro-feature in a sample, the system comprising:
  (a) a device of any prior device embodiment;
  (b) an imager being used in assaying a sample of comprises or is suspected to comprise a micro-feature; and
  (c) An algorithm that utilizes the mark as a parameter together with an imaging processing method to adjust the setting of the imager for the next image.

C. Imaging Analysis Using Sample Holder Having Micro-Marks

CC-1 An apparatus for improving analysis of an image of a micro-feature in a sample, the apparatus comprising:
  (a) a device of any prior device embodiment;
  (b) a computation device being used in receiving an image of a mark and a sample that comprises or is suspected to comprise a micro-feature; and
  wherein the computation device runs an algorithm that utilizes the mark as a parameter together with an imaging processing method to improve the image quality in the image. CC-2. A system for improving analysis of images of a micro-feature in a sample, the system comprising:
  (a) a device of any prior device embodiment;
  (b) an imager being used in assaying a sample of comprises or is suspected to comprise a micro-feature by taking one or multiple images of the sample and the mark; and
  (c) An algorithm that utilizes the mark as a parameter together with an imaging processing method to improve the image quality in at least one image taken in (c).

CC-3 A computer program product for assaying a micro-feature in a sample, the program comprising computer program code applied and adapted for, in at least one image:
  (a) receiving an image of a sample and the monitoring mark(s), wherein the sample is loaded into device of any prior device claim, wherein the image is taken by an imager; and
  (b) processing and analyzing the image to calculate the amount of the micro-feature, wherein the analyzing uses a detection model that is based on machine learning and the information provided by the image of the monitoring mark(s).

CC-4 A computing devices for assaying a micro-feature in a sample, the computation device comprising computing devices that operate the algorithms in any of embodiments of the present invention.

CC-5 The method, device, computer program product, or system of any prior embodiment, wherein the improvement of the image quality comprises at least one selected from the group consisting of denoising, image normalization, image sharpening, image scaling, alignment, super resolution, deblurring, and any combination of thereof.

CC-6 The method, device, computer program product, or system of any prior embodiment, wherein the imaging processing method comprises at least one selected from the group consisting of a histogram-based operation, a mathematics-based operation, a convolution-based operation, a smoothing operation, derivative-based operation, a morphology-based operation, shading correction, image enhancement and/or restoration, segmentation, feature extraction and/or matching, object detection and/or classification and/or localization, image understanding, and any combination of thereof.

CC-6.1 The method, device, computer program product, or system of any prior embodiment, wherein the histogram-based operation comprises at least one selected from the group consisting of contrast stretching, equalization, minimum filtering, median filtering, maximum filtering, and any combination thereof.

CC-6.2 The method, device, computer program product, or system of any prior embodiment, wherein the mathematics-based operation comprises at least one selected from the group consisting of binary operation (e.g., NOT, OR, AND, XOR, and SUB) arithmetic-based operations (e.g., ADD, SUB, MUL, DIV, LOG, EXP, SQRT, TRIG, and INVERT), and any combination thereof.

CC-6.3 The method, device, computer program product, or system of any prior embodiment, wherein the convolution-based operation comprises at least one selected from the group consisting of an operation in the spatial domain, Fourier transform, DCT, integer transform, an operation in the frequency domain, and any combination thereof.

CC-6.4 The method, device, computer program product, or system of any prior embodiment, wherein the smoothing operation comprises at least one selected from the group consisting of a linear filter, a uniform filter, a triangular filter, a Gaussian filter, a non-linear filter, a medial filter a kuwahara filter, and any combination thereof.

CC-6.5 The method, device, computer program product, or system of any prior embodiment, wherein the derivative-based operation comprises at least one selected from the group consisting of a first-derivative operation, a gradient filter, a basic derivative filter, a Prewitt gradient filters, a Sobel gradient filter, an alternative gradient filter, a Gaussian gradient filter, a second derivative filter, a basic second derivative filter, a frequency domain Laplacian, a Gaussian second derivative filter, an Alternative Laplacian filter, a Second-Derivative-in-the-Gradient-Direction (SDGD) filter, a third derivative filter, a higher derivative filter (e.g., a greater than third derivative filter), and any combination thereof.

CC-6.6 The method, device, computer program product, or system of any prior embodiment, wherein the morphology-based operation comprises at least one selected from the group consisting of dilation, erosion, Boolean convolution, opening and/or closing, hit-and-miss operation, contour, skeleton, propagation, gray-value morphological processing, Gray-level dilation, gray-level erosion, gray-level opening, gray-level closing, morphological smoothing, morphological gradient, morphological Laplacian, and any combination thereof.

CC-6.7 The method, device, computer program product, or system of any prior embodiment, wherein the image enhancement and/or restoration comprises at least one selected from the group consisting of sharpening, unsharpening, noise suppression, distortion suppression, and any combination thereof.

CC-6.8 The method, device, computer program product, or system of any prior embodiment, wherein the segmentation comprises at least one selected from the group consisting of thresholding, fixed thresholding, Histogram-derived thresholding, Isodata algorithm, background-symmetry algorithm, Triangle algorithm, Edge finding, Gradient-based procedure, zero-crossing based procedure, PLUS-based procedure, Binary mathematical morphology, salt-or-pepper filtering, Isolate objects with holes, filling holes in objects, removing border-touching objects, Exo-skeleton, Touching objects, Gray-value mathematical morphology, Top-hat transform, thresholding, Local contrast stretching, and any combination thereof.

CC-6.9 The method, device, computer program product, or system of any prior embodiment, wherein the feature extraction and/or matching comprises at least one selected from the group consisting of Independent component analysis, ISO map, Kernel Principal Component Analysis, Latent semantic analysis, partial least squares, principal component analysis, multifactor dimensionality reduction, nonlinear dimensionality reduction, multilinear principal component Analysis, Multilinear subspace learning, Semidefinite embedding, Autoencoder, and any combination thereof.

A. Sample Holder Having Micro-Marks

Single Plate

AA-1.1 A device for assaying a micro-feature in a thin sample using an imager, the device comprising:
  (a) a solid-phase surface comprising a sample contact area for contacting a thin sample having a thickness of 200 µm or less, and comprising or is suspected to comprise a micro-feature; and
  (b) one or more marks, wherein the mark:
    i. has a sharp edge that (i) has predetermined and known shape and dimension, and (ii) is observable by an imager that images the micro-feature;
    ii. is a microstructure that at least one lateral linear dimension of 300 µm or less; and
    iii. is inside the sample; and
  wherein at least one of the marks is imaged by the imager during the assaying.

AA-1.2 A device for assaying a micro-feature in a thin sample using an imager, the device comprising:
  (a) a solid-phase surface comprising a sample contact area for contacting a thin sample having a thickness of 200 µm or less, and comprises or is suspected to comprise a micro-feature; and
  (b) one or more marks, wherein the mark:
    i. comprises either a protrusion or a trench from the solid-phase surface
    ii. has a sharp edge that (i) has predetermined and known shape and dimension, and (ii) is observable by an imager that images the micro-feature;
    iii. is a microstructure that at least one lateral linear dimension of 300 µm or less; and
    iv. is inside the sample;
  wherein at least one of the marks is imaged by the imager during the assaying.

Two Plates with a Constant Spacing

AA-2.1 A device for assaying a micro-feature in a thin sample using an imager, the device comprising:
  a first plate, a second plate, and one or more monitoring marks, wherein:
    i. each of the first plate and the second plate comprises an inner surface comprising a sample contact area for contacting a sample that comprises or is suspected to comprise a micro-feature;
    ii. at least a portion of the sample is confined by the first and second plates into a thin layer of substantial constant thickness that 200 µm or less;
    iii. the monitoring mark has a sharp edge that (a) has predetermined and known shape and dimension, and (b) is observable by an imager that images the micro-feature;
    iv. the monitoring mark is a microstructure that at least one lateral linear dimension of 300 µm or less; and
    v. the monitoring mark is inside the sample;
  wherein at least one of the marks is imaged by the imager during the assaying.

Two Movable Plates

AA-3 A device for assaying a micro-feature in a thin sample using an imager, the device comprising:
  a first plate, a second plate, spacers, and one or more monitoring marks, wherein:
    I. the first plate and the second plate are movable relative to each other into different configurations;
    i. each of the first plate and the second plate comprises an inner surface comprising a sample contact area for contacting a sample that comprises or is suspected to comprise a micro-feature;
    ii. one or both of the first plate and the second plate comprises the spacers that are permanently fixed on the inner surface of a respective plate,
    iii. the monitoring mark has a sharp edge that (a) has predetermined and known shape and dimension, and (b) is observable by an imager that images the micro-feature;
    iv. the monitoring mark is a microstructure that at least one lateral linear dimension of 300 µm or less; and
    v. the monitoring mark is inside the sample;
  wherein at least one of the marks is imaged by the imager during the assaying.

wherein one of the configurations is an open configuration, in which: the two plates are partially or completely separated apart, the spacing between the plates is not regulated by the spacers, and the sample is deposited on one or both of the plates;

wherein another of the configurations is a closed configuration which is configured after the sample is deposited in the open configuration and the plates are forced to the closed configuration by applying the imprecise pressing force on the force area; and in the closed configuration: at least part of the sample is compressed by the two plates into a layer of highly uniform thickness and is substantially stagnant relative to the plates, wherein the uniform thickness of the layer is confined by the sample contact areas of the two plates and is regulated by the plates and the spacers; and wherein a monitoring mark is (a) a different structure from the spacers, or (b) the same structure that is used as a spacer.

B. Image taking Improvement Using Sample Holder Having Micro-Marks

BB-1. An apparatus for improving image-taking of a micro-feature in a sample, the apparatus comprising:
- (e) a device of any prior device embodiment; and
- (f) an imager being used in assaying a sample that comprises or is suspected to comprise a micro-feature; and wherein the imager takes images, wherein at least one image comprises both a portion of sample and the monitoring.

CB-2. A system for improving image-taking of a micro-feature in a sample, the system comprising:
- i. a device of any prior device embodiment;
- ii. an imager being used in assaying a sample of comprises or is suspected to comprise a micro-feature; and
- iii. a non-transitory computer readable medium having instructions that, when executed, utilize the mark as a parameter together with an imaging processing method to adjust the setting of the imager for the next image.

C. Imaging Analysis Using Sample Holder Having Micro-Marks

CC-1 An apparatus for improving analysis of an image of a micro-feature in a sample, the apparatus comprising:
- a) a device of any prior device embodiment; and
- b) a computation device being used in receiving an image of a mark and a sample that comprises or is suspected to comprise a micro-feature;

wherein the computation device runs an algorithm that utilizes the mark as a parameter together with an imaging processing method to improve the image quality in the image.

CC-2. A system for improving analysis of images of a micro-feature in a sample, the system comprising:
- (a) a device of any prior device embodiment;
- (b) an imager being used in assaying a sample of comprises or is suspected to comprise a micro-feature by taking one or multiple images of the sample and the mark; and
- (c) a non-transitory computer readable medium having instructions that, when executed, utilize the mark as a parameter together with an imaging processing method to improve the image quality in at least one image taken in (c).

CC-3 A computer program product for assaying a micro-feature in a sample, the program comprising computer program code means applied and adapted for, in at least one image:
- (a) receiving an image of a sample and the monitoring mark(s), wherein the sample is loaded into device of any prior device claim, and wherein the image is taken by an imager; and
- (b) processing and analyzing the image to calculate the amount of the micro-feature, wherein the analyzing uses a detection model that is based on machine learning and the information provided by the image of the monitoring mark(s).

CC-4 A computing devices for assaying a micro-feature in a sample, the computation device comprising a computing device that operate the algorithms in any of embodiments of the present invention.

CC-5 The method, device, computer program product, or system of any prior embodiment, wherein the improvement of the image quality comprises at least one selected from the group consisting of denoising, image normalization, image sharpening, image scaling, alignment (e.g., for face detection), super resolution, deblurring, and any combination of thereof.

CC-6 The method, device, computer program product, or system of any prior embodiment, wherein the imaging processing method comprises at least one selected from the group consisting of a histogram-based operation, a mathematics-based operation, a convolution-based operation, a smoothing operation, derivative-based operation, a morphology-based operation, shading correction, image enhancement and/or restoration, segmentation, feature extraction and/or matching, object detection and/or classification and/or localization, image understanding, and any combination of thereof.

CC-6.1 The method, device, computer program product, or system of any prior embodiment, wherein the histogram-based operation comprises at least one selected from the group consisting of contrast stretching, equalization, minimum filtering, median filtering, maximum filtering, and any combination thereof.

CC-6.2 The method, device, computer program product, or system of any prior embodiment, wherein the mathematics-based operation comprises at least one selected from the group consisting of binary operation (e.g., NOT, OR, AND, XOR, and SUB) arithmetic-based operations (e.g., ADD, SUB, MUL, DIV, LOG, EXP, SQRT, TRIG, and INVERT), and any combination thereof.

CC-6.3 The method, device, computer program product, or system of any prior embodiment, wherein the convolution-based operation comprises at least one selected from the group consisting of an operation in the spatial domain, Fourier transform, DCT, integer transform, an operation in the frequency domain, and any combination thereof.

CC-6.4 The method, device, computer program product, or system of any prior embodiment, wherein the smoothing operation comprises at least one selected from the group consisting of a linear filter, a uniform filter, a triangular filter, a Gaussian filter, a non-linear filter, a medial filter a kuwahara filter, and any combination thereof.

CC-6.5 The method, device, computer program product, or system of any prior embodiment, wherein the derivative-based operation comprises at least one selected from the group consisting of a first-derivative operation, a gradient filter, a basic derivative filter, a Prewitt gradient filters, a Sobel gradient filter, an alternative gradient filter, a Gaussian gradient filter, a second derivative filter, a basic second derivative filter, a frequency domain Laplacian, a Gaussian second derivative filter, an Alternative Laplacian filter, a Second-Derivative-in-the-Gradient-Direction (SDGD) filter, a third derivative filter, a higher derivative filter (e.g., a greater than third derivative filter), and any combination thereof.

CC-6.6 The method, device, computer program product, or system of any prior embodiment, wherein the morphology-based operation comprises at least one selected from the group consisting of dilation, erosion, Boolean convolution, opening and/or closing, hit-and-miss operation, contour, skeleton, propagation, gray-value morphological processing, Gray-level dilation, gray-level erosion, gray-level opening, gray-level closing, morphological smoothing, morphological gradient, morphological Laplacian, and any combination thereof.

CC-6.7 The method, device, computer program product, or system of any prior embodiment, wherein the image enhancement and/or restoration comprises at least one selected from the group consisting of sharpening, noise suppression, distortion suppression, and any combination thereof.

CC-6.8 The method, device, computer program product, or system of any prior embodiment, wherein the segmentation comprises at least one selected from the group consisting of thresholding, fixed thresholding, Histogram-derived thresholding, ISO data algorithm, background-symmetry algorithm, Triangle algorithm, Edge finding, Gradient-based procedure, zero-crossing based procedure, PLUS-based procedure, Binary mathematical morphology, salt-or-pepper filtering, Isolate objects with holes, filling holes in objects, removing border-touching objects, Exo-skeleton, Touching objects, Gray-value mathematical morphology, Top-hat transform, thresholding, Local contrast stretching, and any combination thereof.

CC-6.9 The method, device, computer program product, or system of any prior embodiment, wherein the feature extraction and/or matching comprises at least one selected from the group consisting of Independent component analysis, Isomap, Kernel Principal Component Analysis, Latent semantic analysis, Partial least squares, Principal component analysis, Multifactor dimensionality reduction, Nonlinear dimensionality reduction, Multilinear principal component Analysis, Multilinear subspace learning, Semidefinite embedding, Autoencoder, and any combination thereof.

T1. A method for determining, from a distorted image, a true-lateral-dimension (TLD) of a sample on a sample holder, the method comprising:
  (a) obtaining a device of any prior embodiment, wherein the device comprises one or more monitoring marks in the sample contact area;
  (b) obtaining an imager, a computation hardware, and a non-transitory computer readable medium comprising an algorithm;
  (c) depositing, in the sample contact area of the device of (a), a thin sample layer comprising a micro-feature;
  (d) taking, using the imager, one or more images of the thin sample layer together with the monitoring marks, wherein the imager is positioned above the thin sample layer; and
  (e) determining the true-lateral-dimension of the sample using the algorithm; wherein
    (i) the algorithm is a computer code that is executed on a computer system; and
    (ii) the algorithm uses an image of the monitoring marks as parameters.

T2. The method, device, computer program product, or system of any prior embodiment, wherein each monitoring mark comprises either a protrusion or a trench from the solid-phase surface.

T3. The method, device, computer program product, or system of any prior embodiment, wherein the microstructure does not have a sharp edge.

T4. The method, device, computer program product, or system of any prior embodiment, wherein the sample is selected from the group consisting of a biological sample, a chemical sample, and a sample that does not have a sharp edge.

T5. The method, device, computer program product, or system of any prior embodiment, wherein the monitoring mark is used as a parameter together with an imaging processing method in an algorithm that (i) adjusting the imagine, (ii) processing an image of the sample, (iii) determining a property related to the micro-feature, or (iv) any combination of the above.

T6. The method, device, computer program product, or system of any prior embodiment, wherein the spacers have a substantially uniform height that is equal to or less than 200 microns, and a fixed inter-spacer-distance (ISD);

AA. Method and Device for improving an imaging of a thin layer of sample.

AA1. A method for improving an imaging of a thin layer of sample, the method comprising:
  (a) obtaining a marked sample holder, wherein the sample comprises one or more monitoring marks in the sample contact area;
  (b) obtaining an imager, a computation hardware, and a non-transitory computer readable medium comprising an algorithm;
  (c) depositing, in the sample contact area of the device of (a), a thin sample layer comprising a micro-feature;
  (d) taking, using the imager, one or more images of the thin sample layer together with the monitoring marks, wherein the imager is positioned above the thin sample layer; and
  (e) determining the true-lateral-dimension of the sample using the algorithm; wherein
    (i) the algorithm is a computer code that is executed on a computer system; and
    (ii) the algorithm uses an image of the monitoring marks as parameters.

A-1

T1. A method for determining, from a distorted image, a true-lateral-dimension (TLD) of a sample on a sample holder, the method comprising:
  i. obtaining a device of any prior embodiment, wherein the device comprises one or more monitoring marks in the sample contact area;
  ii. obtaining an imager, a computation hardware, and a non-transitory computer readable medium comprising an algorithm;
  iii. depositing, in the sample contact area of the device of (a), a thin sample layer comprising a micro-feature;
  iv. taking, using the imager, one or more images of the thin sample layer together with the monitoring marks, wherein the imager is positioned above the thin sample layer; and
  v. determining the true-lateral-dimension of the sample using the algorithm; wherein
    (a) the algorithm is a computer code that is executed on a computer system; and
    (b) the algorithm uses an image of the monitoring marks as parameters.

NN1. A device for assaying a micro-feature in a sample using an imager, the device comprising:
  (a) a solid-phase surface comprising a sample contact area for contacting a sample which comprises a micro-feature; and
  (b) one or more monitoring marks, wherein the monitoring marks:
    i. are made of a different material from the sample;
    ii. are inside the sample during an assaying the microstructure, wherein the sample forms, on the sample contact area, a thin layer of a thickness less than 200 µm;
    iii. have their lateral linear dimension of about 1 µm (micron) or larger, and
    iv. have at least one lateral linear dimension of 300 µm or less; and wherein during the assaying at least one monitoring mark is imaged by the imager wherein used during assaying the analyte; and a geometric parameter (e.g., shape and size) of the monitoring mark, and/or a pitch between monitoring marks are (a) predetermined and known prior to assaying of the analyte, and (b) used as a parameter in an algorithm that determines a property related to the micro-feature.

NN2. A device for assaying a micro-feature in a sample using an imager, the device comprising:

a solid-phase surface comprising a sample contact area for contacting a sample which comprises a micro-feature; and one or more monitoring marks, wherein each monitoring mark comprises either a protrusion or a trench from the solid-phase surface, wherein:
  (a) the protrusion or the trench comprises a flat surface that is substantially parallel to a neighbor surface that is a portion of the solid-phase surface adjacent the protrusion or the trench;
  (b) a distance between the flat surface and the neighboring surface is about 200 micron (μm) or less;
  (c) the flat surface an area that has (a) a linear dimension is at least about 1 μm or larger, and (b) at least one linear dimension 150 μm or less;
  (d) the flat surface of at least one monitoring mark is imaged by an imager used during assaying the micro-feature; and
  (e) a shape of the flat surface, a dimension of the flat surface, a distance between the flat surface and the neighboring surface, and/or a pitch between monitoring marks are (a) predetermined and known prior to assaying of the micro-feature, and (b) used as a parameter in an algorithm that determines a property related to the micro-feature.

NN3. A device for assaying a micro-feature in a sample using an imager, the device comprising:

a first plate, a second plate, spacers, and one or more monitoring marks, wherein:
  (a) the first plate and the second plate are movable relative to each other into different configurations;
  (b) each of the first plate and the second plate comprises an inner surface comprising a sample contact area for contacting a sample that comprises a micro-feature;
  (c) one or both of the first plate and the second plate comprises the spacers that are permanently fixed on the inner surface of a respective plate,
  (d) the spacers have a substantially uniform height that is equal to or less than 200 microns, and a fixed inter-spacer-distance (ISD);
  (e) the monitoring marks are made of a different material from the sample;
  (f) the monitoring marks are inside the sample during an assaying the microstructure, wherein the sample forms, on the sample contact area, a thin layer of a thickness less than 200 μm; and
  (g) the monitoring marks have their lateral linear dimension of about 1 μm (micron) or larger, and have at least one lateral linear dimension of 300 μm or less;

wherein during the assaying at least one monitoring mark is imaged by the imager wherein used during assaying the micro-feature; and a shape of the flat surface, a dimension of the flat surface, a distance between the flat surface and the neighboring surface, and/or a pitch between monitoring marks are (a) predetermined and known prior to assaying of the micro-feature, and (b) used as a parameter in an algorithm that determines a property related to the micro-feature;

wherein one of the configurations is an open configuration, in which: the two plates are partially or completely separated apart, the spacing between the plates is not regulated by the spacers, and the sample is deposited on one or both of the plates;

wherein another of the configurations is a closed configuration which is configured after the sample is deposited in the open configuration and the plates are forced to the closed configuration by applying the imprecise pressing force on the force area; and in the closed configuration: at least part of the sample is compressed by the two plates into a layer of highly uniform thickness and is substantially stagnant relative to the plates, wherein the uniform thickness of the layer is confined by the sample contact areas of the two plates and is regulated by the plates and the spacers; and wherein a monitoring mark is (i) a different structure from the spacers, or (ii) the same structure that is used as a spacer.

NN4. A device for assaying a micro-feature in a sample using an imager, the device comprising:

a first plate, a second plate, spacers, and one or more monitoring marks, wherein:
  (a) the first plate and the second plate are movable relative to each other into different configurations;
  (b) each of the first plate and the second plate comprises an inner surface comprising a sample contact area for contacting a sample that comprises a micro-feature;
  (c) one or both of the first plate and the second plate comprises the spacers that are permanently fixed on the inner surface of a respective plate,
  (d) the spacers have a substantially uniform height that is equal to or less than 200 microns, and a fixed inter-spacer-distance (ISD);
  (e) each monitoring mark comprises either a protrusion or a trench on one or both of the sample contact areas;
  (f) the protrusion or the trench comprises a flat surface that is substantially parallel to a neighbor surface that is a portion of the solid-phase surface adjacent the protrusion or the trench;
  (g) a distance between the flat surface and the neighboring surface is about 200 micron (μm) or less;
  (h) the flat surface an area that has (a) a linear dimension is at least about 1 μm or larger, and (b) at least one linear dimension 150 μm or less;
  (i) the flat surface of at least one monitoring mark is imaged by an imager used during assaying the micro-feature; and
  (j) a shape of the flat surface, a dimension of the flat surface, a distance between the flat surface and the neighboring surface, and/or a pitch between monitoring marks are (a) predetermined and known prior to assaying the micro-feature, and (b) used as a parameter in an algorithm that determines a property related to the micro-feature.
    a. wherein one of the configurations is an open configuration, in which: the two plates are partially or completely separated apart, the spacing between the plates is not regulated by the spacers, and the sample is deposited on one or both of the plates;

wherein another of the configurations is a closed configuration which is configured after the sample is deposited in the open configuration and the plates are forced to the closed configuration by applying the imprecise pressing force on the force area; and in the closed configuration: at least part of the sample is compressed by the two plates into a layer of highly uniform thickness and is substantially stagnant relative to the plates, wherein the uniform thickness of the layer is confined by the sample contact areas of the two plates and is regulated by the plates and the spacers; and wherein a monitoring mark is (i) a different structure from the spacers, or (ii) the same structure that is used as a spacer.

NN5. A device for imaging based assay, comprising:
a device of any prior device embodiment, wherein the device has at least four monitoring marks not aligned on a linear line.

NN6. An apparatus for assaying a micro-feature in a sample using an imager, the system comprising:
(a) a device of any prior device embodiment; and
(b) an imager that is used in assaying a sample of comprising a micro-feature.

NN7. A system for performing an imaging-based assay, the system comprising:
(a) a device of any prior device embodiment;
(b) an imager that is used in assaying a sample of comprising a micro-feature; and
(c) a non-transitory computer readable medium comprising instructions that, when executed, utilize the monitoring marks of the device to determine a property related to the micro-feature.

NN8. A system for assaying a micro-feature in a sample using an imager, the system comprising:
(a) a device of any prior device embodiment;
(b) an imager that is used in assaying a sample of comprising a micro-feature; and
(c) a non-transitory computer readable medium comprising instructions that, when executed, utilize monitoring marks of the device to assay a property related to the micro-feature, wherein the instructions comprise machine learning.

NN9. A method for assaying a micro-feature in a sample using an imager, comprising:
(a) obtaining a device, apparatus, or a system of any prior embodiment;
(b) obtaining a sample and depositing the sample on a sample contact area in the device, apparatus, or system in (a), wherein the sample comprises a micro-feature; and
(c) assaying the micro-feature.

NN10. A method for assaying a micro-feature in a sample using an imager, comprising:
(a) obtaining a device, apparatus, or a system of any prior embodiment;
(b) obtaining a sample and depositing the sample on a sample contact area in the device, apparatus, or system in (a), wherein the sample comprises a micro-feature;
(c) assaying the micro-feature, wherein the assaying comprises a step of using machine learning.

T1. A method for determining, from a distorted image, a true-lateral-dimension (TLD) of a sample on a sample holder, the method comprising:
(a) obtaining a device of any prior embodiment, wherein the device comprises one or more monitoring marks in the sample contact area;
(b) obtaining an imager, a computation hardware, and a non-transitory computer readable medium comprising an algorithm;
(c) depositing, in the sample contact area of the device of (a), a thin sample layer comprising a micro-feature;
(d) taking, using the imager, one or more images of the thin sample layer together with the monitoring marks, wherein the imager is positioned above the thin sample layer; and
(e) determining the true-lateral-dimension of the sample using the algorithm; wherein
(i) the algorithm is a computer code that is executed on a computer system; and
(ii) the algorithm uses an image of the monitoring marks as parameters.

T2. A method for determining, from a distorted image, the true-lateral-dimension (TLD) of a sample on a sample holder, the method comprising:
(a) obtaining a device of any prior embodiment, wherein the device comprises the one or more monitoring marks in the sample contact area;
(b) obtaining an imager, a computation hardware, and a non-transitory computer readable medium comprising an algorithm;
(c) depositing, in the sample contact area of the device in (a), a thin sample layer comprising a micro-feature;
(d) taking, using the imager, one or more images of the thin sample layer together with the monitoring marks, wherein the imager is positioned above the thin sample layer; and
(e) determining the true-lateral-dimension and the coordinates of the imaged sample in real world by physical metrics (e.g., micrometers) using the algorithm; wherein
(i) the algorithm is a computer code that is executed on a computer system; and
(ii) the algorithm uses an image of the monitoring marks as parameters.

T3. The device, method, or system of any prior embodiment, wherein micro-features from the sample and monitoring marks are disposed within the sample holding device.

T4. The device, method, or system of any prior embodiment, wherein the determining comprises detecting and locating the monitoring marks in the image of the sample taken by the imager.

T5. The device, method, or system of any prior embodiment, wherein the determining comprises generating a monitoring mark grid based on the monitoring marks detected from the image of the sample taken by the imager.

T6. The device, method, or system of any prior embodiment, wherein the determining comprises calculating a homographic transform from the generated monitoring mark grid.

T7. The device, method, or system of any prior embodiment, wherein the determining comprises estimating the TLD from the homographic transform, and determining the area, size, and concentration of the detected micro-features in the image-based assay.

T8. The method, device or system of any prior embodiment, wherein the TLD estimation is based on regions in a sample image taken by the imager, comprising:
(a) obtaining a sample;
(b) loading the sample into a sample holding device, e.g., QMAX device, wherein there are monitoring marks, wherein the monitoring marks are not submerged in the sample and reside in the device that can be imaged from the top by an imager in the image-based assay;
(c) taking an image of the sample in the sample loading device including micro-features and monitoring marks;
(d) detecting the monitoring marks in the sample image taken by the imager;
(e) partitioning the sample image into non-overlapping regions;
(f) generating a region-based mark grid for each of the non-overlapping regions with more than 4 non-colinear monitoring marks detected in the local region;
(g) generating a mark grid for all other regions not in (f) based on the monitoring marks detected from the sample image taken by the imager;

(h) calculating a region-specific homographic transform for each region in (f) based on its own region-based mark grid generated from (f);
(i) calculating a homographic transform for all other regions not in (f) based on the mark grid generated in (g);
(j) estimating the region-based TLD for each region in (f) based on the region-based homographic transform of (g);
(k) estimating the TLD for other regions not in (f) based on the homographic transform of (i); and
(l) applying the estimated TLDs from (j) and (k) to determine the area and concentration of the imaged micro-features in each image partition in the image-based assay.

T9. The method, device or system of any prior embodiment, wherein the monitoring marks in the sample holding device are distributed according to a periodic pattern with a defined pitch period.

T10. The method, device or system of any prior embodiment, wherein the said monitoring marks are detected and applied as detectable anchors for calibration and improving the measurement accuracy in the image-based assay.

T11. The method, device or system of any prior embodiment, wherein the detection of the monitoring marks in the sample image taken by the imager utilizes the periodicity of the monitoring mark distribution in the sample holding device for error correction and/or the reliability of the detection.

T12. The method, device or system of any prior embodiment, wherein the detection, identification, area and/or shape contour estimation of the said monitoring marks in image-based assay are through machine learning (ML) with ML based monitoring mark detection models and apparatus built or trained from the image taken by the imager on the said device in the image-based assay.

T13. The method, device or system of any prior embodiment, wherein the detection, identification, area and/or shape contour estimation of the said monitoring marks in image-based assay are through image processing or image processing combined with machine learning.

T14. The method, device or system of any prior embodiment, wherein the detected monitoring marks are applied to TLD estimation in the image-based assay to calibrate the system and/or improve the measurement accuracy in the imaged-based assay.

T15. The method, device or system of any prior embodiment, wherein the detected monitoring marks are applied and not limited to micro-feature size, volume and/or concentration estimation in image-based assay to calibrate the system and/or improve the measurement accuracy.

T16. The method, device or system of any prior embodiment, wherein the detection of the monitoring marks and/or TLD estimation are applied to the fault detection in image-based assay, including and not limited to detecting defects in the sample holding device, mis-placement of the sample holding device in the imager, and/or the focusing fault of the imager.

T17. The method, device or system of any prior embodiment, wherein the said monitoring marks are detected as anchors to apply in a system to estimate the area of an object in image-based assay, comprising:
i. loading the sample to a sample holding device having monitoring marks residing in said device in image-based assay;
ii. taking the image of the sample in the sample holding device including the micro-features and the monitoring marks; and
iii. detecting the monitoring marks in the image of the sample taken by the imager on the sample holding device, determine the TLD and calculate the area estimation in the image-based assay to determine the size of the imaged object from pixels in the image to its physical size of micrometers in the real world.

T18. The method, device or system of any prior embodiment, wherein the system comprises:
i. detecting the monitoring mark in a digital image;
ii. generating a monitoring mark grid;
iii. calculating the image transform based on the monitoring mark grid; and
iv. estimating the area of the object in image of the sample and its physical size in the real world in image-based assay.

T19. The method, device or system of any prior embodiment, wherein the generated monitoring mark grid from the detected monitoring marks is used to calculate a homographic transform to estimate TLD, the area of the object in the image of the sample taken by the imager, and the physical size of the object in the real world.

T20. The method, device or system of any prior embodiment, wherein the method comprises:
i. partitioning the image of the sample taken by the imager in image-based assay into nonoverlapping regions;
ii. detecting and local monitoring marks in the image;
iii. generating a region-based mark grid for that region if more than 4 non-colinear monitoring marks are detected in the region;
iv. generating a mark grid for all other regions based on the monitoring marks detected in the image of the sample taken by the imager;
v. calculating a region-based homographic transform from the generated region-based mark grid for each region in (iii);
vi. calculating a homographic transform for all other regions not in (iii) based on the mark grid generated in (iv); and
vii. estimating the TLDs for each region based on the homographic transforms generated from (v) and (vi), determine the area of the objects in the image of the sample at each region and their size in the real world in the image-based assay.

T21. The method, device or system of any prior embodiment, wherein the assay is a medical, a diagnostic, a chemical or a biological test.

T22. The method, device or system of any prior embodiment, wherein said micro-feature is a cell.

T23. The method, device or system of any prior embodiment wherein said micro-features is a blood cell.

T24. The method, device or system of any prior embodiment wherein said micro-feature is a protein, peptide, DNA, RNA, nucleic acid, small molecule, cell, or nanoparticle.

T25. The method, device or system of any prior embodiment wherein said micro-feature comprises a label.

T26. The method, device or system of any prior embodiment, wherein said algorithm comprises a computer program product comprising computer program code means adapted for, in at least one image:
(a) receiving an image of a sample, wherein the sample is loaded into a QMAX device and the image is taken by an imager connected to the QMAX device, wherein the image includes both the sample and monitoring marks;

(b) analyzing the image with a detection model and generating a 2-D data array of the image, wherein the 2-D data array includes probability data of the micro-feature for each location in the image, and the detection model is established through a training process that comprises:
  i. feeding an annotated data set to a convolutional neural network, wherein the annotated data set is from samples that are the same type as the test sample and for the same micro-feature; and
  ii. training and establishing the detection model by convolution; and
(c) analyzing the 2-D data array to detect local signal peaks with:
  i. signal list process, or
  ii. local searching process; and
(d) calculating the amount of the micro-feature based on local signal peak information.

T27. The method, device or system of any prior embodiment, wherein said algorithm comprises a computer program product comprising computer program code means applied and adapted for, in at least one image:
(a) representing a pattern of inference between an object in the sample and a pixel contour map of the said object in the image of the sample taken by the imager on the sample holding device,
(b) numerically reconstructing an image of at least one object detected from the inference pattern in the image of the sample and generate the contour masks enclosing the object identified by inference module where the object is in focus,
(c) identifying at least one portion of the image of the sample for at least one object in the selected portion of the image of the sample, and
(d) calculating, from said at least one portion, at least one feature of the object to identify the objects in the selected portion of the image of the sample taken by the imager,
(e) calculating, from the selected portion of the image of the sample, the count of the detected objects in the selected portion and its concentration,
when said program is run on a computing device, or in a computing Cloud by means of network connection.

T28. The method, device or system of any prior embodiment, wherein said algorithm comprises a computer program product comprising computer program code means adapted for, in at least one image:
(a) receiving an image of a sample, wherein the sample is loaded into a QMAX device and the image is taken by an imager connected to the QMAX device, wherein the image includes both the sample and monitoring marks; and
(b) analyzing the image to calculate the amount of the micro-feature, wherein the analyzing uses a detection model that is based on machine learning and the information provided by the image of the monitoring marks.

The method, device or system of any prior embodiment further comprises computer readable storage medium or memory storage unit comprising a computer program of any prior embodiment.

The method, device or system of any prior embodiment further comprises a computing arrangement or mobile apparatus comprising the calculation device of any prior embodiment.

The method, device or system of any prior embodiment further comprises a computing arrangement or mobile apparatus comprising the computer program product of any prior embodiment.

The method, device or system of any prior embodiment further comprises a computing arrangement or mobile apparatus comprising the computer readable storage medium or storage unit of any prior embodiment.

A device for analyzing a sample comprising:
a first plate, a second plate, a surface amplification layer, and a capture agent, wherein
  (a) the first and second plats are movable relative to each other into different configurations, and have, on its respective surface, a sample contact area for contacting a sample that comprises a target analyte,
  (b) the surface amplification layer is on one of the sample contact areas,
  (c) the capture agent is immobilized on the surface amplification layer, wherein the capture agent specifically binds the target analyte,
wherein the surface amplification layer amplifies an optical signal from the target analyte or a label attached to the target analyte when they are is in proximity of the surface amplification layer much stronger than that when they are micron or more away,
wherein one of the configurations is an open configuration, in which the average spacing between the inner surfaces of the two plates is at least 200 μm; and
wherein another of the configurations is a close configuration, in which, at least part of the sample is between the two plates and the average spacing between the inner surfaces of the plates is less than 200 μm.

A device for analyzing a sample comprising:
a first plate, a second plate, a surface amplification layer, and a capture agent, wherein
  (a) the first and second plats are movable relative to each other into different configurations, and have, on its respective surface, a sample contact area for contacting a sample that comprises a target analyte,
  (b) the surface amplification layer is on one of the sample contact areas,
  (c) the capture agent is immobilized on the surface amplification layer, wherein the capture agent specifically binds the target analyte,
wherein the surface amplification layer amplifies an optical signal from a label attached to the target analyte when it is in proximity of the surface amplification layer much stronger than that when it is micron or more away,
wherein one of the configurations is an open configuration, in which the average spacing between the inner surfaces of the two plates is at least 200 μm;
wherein another of the configurations is a close configuration, in which, at least part of the sample is between the two plates and the average spacing between the inner surfaces of the plates is less than 200 μm;
wherein the thickness of the sample in the closed configuration, the concentration of the labels dissolved in the sample in the closed configuration, and the amplification factor of the surface amplification layer are configured such that any the labels that are bound directly or indirectly to the capture agents are visible in the closed configuration without washing away of the unbound labels.

An apparatus comprising a device of any prior embodiment and a reader for reading the device.

A homogeneous assay method using a device of any prior embodiment, wherein the thickness of the sample in a closed configuration, the concentration of labels, and amplification factor of the amplification surface are configured to make the label(s) bound on the amplification surface visible without washing away of the unbound labels.

The method of any prior embodiment, wherein the method is performed by:
obtaining a device of any of any prior embodiment
depositing a sample on one or both plates when the plates are in an open configuration;
closing the plates to the closed configuration; and
reading the sample contact area with a reading device to produce an image of signals.

The device or method of any prior embodiment, wherein the labels bound to the amplification surface are visible in less than 60 seconds.

The device or method of any prior embodiment, wherein the method is a homogeneous assay in which the signal is read without using a wash step to remove any biological materials or labels that are not bound to the amplification surface.

The device or method of any prior embodiment, wherein the labels bound to the amplification surface are read by a pixelated reading method.

The device or method of any prior embodiment, wherein the labels bound to the amplification surface are read by a lump-sum reading method.

The device or method of any prior embodiment, wherein the assay has a detection sensitivity of 0.1 nM or less.

The device or method of any prior embodiment, wherein the method biological materials or labels that are not bound to the amplification surface are removed by a sponge prior to reading.

The device or method of any prior embodiment, wherein the signal amplification layer comprises a D2PA.

The device or method of any prior embodiment, wherein the signal amplification layer comprises a layer of metallic material.

The device or method of any prior embodiment, wherein the signal amplification layer comprises a continuous metallic film that is made of a material selected from the group consisting of gold, silver, copper, aluminum, alloys thereof, and combinations thereof.

The device or method of any prior embodiment, wherein the different metals layers either locally enhance or act as a reflector, or both, to enhance an optical signal.

The device or method of any prior embodiment, wherein the signal amplification layer comprises a layer of metallic material and a dielectric material on top of the metallic material layer, wherein the capture agent is on the dielectric material.

The device or method of any prior embodiment, wherein the metallic material layer is a uniform metallic layer, nanostructured metallic layer, or a combination.

The device or method of any prior embodiment, wherein the amplifies signals by plasmonic enhancement.

The device or method of any prior embodiment, wherein assay comprises detecting the labels by Raman scattering.

The device or method of any prior embodiment, wherein the capture agent is an antibody.

The device or method of any prior embodiment, wherein the capture agent is a polynucleotide.

The device or method of any prior embodiment, wherein the device further comprise spacers fixed on one of the plates, wherein the spacers regulate the spacing between the first plate and the second plate in the closed configuration.

The device or method of any prior embodiment, wherein the amplification factor of the surface amplification layer is adjusted to make the optical signal from a single label that is bound directly or indirectly to the capture agents visible.

The device or method of any prior embodiment, wherein the amplification factor of the surface amplification layer is adjusted to make the optical signal from a single label that is bound directly or indirectly to the capture agents visible, wherein the visible single labels bound to the capture agents are counted individually.

The device or method of any prior embodiment, wherein the spacing between the first plate and the second plate in the closed configuration is configured to make saturation binding time of the target analyte to the capture agents 300 sec or less.

The device or method of any prior embodiment, wherein the spacing between the first plate and the second plate in the closed configuration is configured to make saturation binding time of the target analyte to the capture agents 60 sec or less.

The device or method of any prior embodiment, wherein the amplification factor of the surface amplification layer is adjusted to make the optical signal from a single label visible.

The device or method of any prior embodiment, wherein the capture agent is a nucleic acid.

The device or method of any prior embodiment, wherein the capture agent is a protein.

The device or method of any prior embodiment, wherein the capture agent is an antibody.

The device or method of any prior embodiment, wherein the sample contact area of the second plate has a reagent storage site, and the storage site is approximately above the binding site on the first plate in the closed configuration.

The device or method of any prior embodiment, wherein the reagent storage site comprises a detection agent that binds to the target analyte.

The device or method of any prior embodiment, wherein the detection agent comprises the label.

The device or method of any prior embodiment, wherein the capture agent and detection agent both bind to the target analyte to form a sandwich that comprises the label.

The device or method of any prior embodiment, wherein the signal amplification layer comprises a layer of metallic material.

The device or method of any prior embodiment, wherein the signal amplification layer comprises a layer of metallic material and a dielectric material on top of the metallic material layer, wherein the capture agent is on the dielectric material.

The device or method of any prior embodiment, wherein the metallic material layer is a uniform metallic layer, nanostructured metallic layer, or a combination.

The device or method of any prior embodiment, wherein the amplification layer comprises a layer of metallic material and a dielectric material on top of the metallic material layer, wherein the capture agent is on the dielectric material, and the dielectric material layer has a thickness of 0.5 nm, 1 nm, 5 nm, 10 nm, 20 nm, 50 nm, 00 nm, 200 nm, 500 nm, 1000 nm, 2 µm, 3 µm, 5 µm, 10 µm, 20 µm, 30 µm, 50 µm, 100 µm, 200 µm, 500 µm, or in a range of any two values.

The device or method of any prior embodiment, wherein the method further comprises quantifying a signal in an area of the image to providing an estimate of the amount of one or more analytes in the sample.

The device or method of any prior embodiment, wherein the method comprises identifying and counting individual binding events between an analyte with the capture agent in an area of the image, thereby providing an estimate of the amount of one or more analytes in the sample.

The device or method of any prior embodiment, wherein the identifying and counting steps comprise: (1) determining the local intensity of background signal, (2) determining local signal intensity for one label, two labels, three labels, and four or more labels; and (3) determining the total number of labels in the imaged area.

The device or method of any prior embodiment, wherein the identifying and counting steps comprises: (1) determining the local spectrum of background signal, (2) determining local signal spectrum for one label, two labels, three labels, and four or more labels; and (3) determining the total number of labels in the imaged area.

The device or method of any prior embodiment, wherein the identifying and counting steps comprise: (1) determining the local Raman signature of background signal, (2) determining local signal Raman signature for one label, two labels, three labels, and four or more labels; and (3) determining the total number of labels in the imaged area.

The device or method of any prior embodiment, wherein the identifying and counting step comprises determining one or more of the local intensities, spectrum, and Raman signatures.

The device or method of any prior embodiment, wherein the method comprises quantifying a lump-sum signal in an area of the image, thereby providing an estimate of the amount of one or more analytes in the sample.

The device or method of any prior embodiment, wherein the sample contact area of the second plate has a reagent storage site, and the storage site is, in a closed configuration, approximately above the binding site on the first plate.

The device or method of any prior embodiment, wherein the method further comprises a step of labeling the target analyte with a detection agent.

The device or method of any prior embodiment, wherein the detection agent comprises a label.

The device or method of any prior embodiment, wherein the capture agent and detection agent both bind to the target analyte to form a sandwich.

The device or method of any prior embodiment, wherein the method further comprises measuring the volume of the sample in the area imaged by the reading device.

The device or method of any prior embodiment, wherein the target analyte is a protein, peptide, DNA, RNA, nucleic acid, small molecule, cell, or nanoparticle.

The device or method of any prior embodiment, wherein the image shows the position, local intensity, and local spectrum of the signals.

The device or method of any prior embodiment, wherein the signals are luminescence signals selected from the group consisting of fluorescence, electroluminescence, chemiluminescence, and electrochemiluminescence signals.

The device or method of any prior embodiment, wherein the signals are Raman scattering signals.

The device or method of any prior embodiment, wherein the signals are the forces due to local electrical, local mechanical, local biological, or local optical interaction between the plate and the reading device.

The method or device of any prior embodiment, wherein the spacers have pillar shape and nearly uniform cross-section.

The method or device of any prior embodiment, wherein the inter spacer distance (SD) is equal or less than about 120 μm (micrometer).

The method or device of any prior embodiment, wherein the inter spacer distance (SD) is equal or less than about 100 μm (micrometer).

The method or device of any prior embodiment, wherein the fourth power of the inter-spacer-distance (ISD) divided by the thickness (h) and the Young's modulus (E) of the flexible plate (ISD$^4$/(hE)) is 5×10$^6$ um$^3$/GPa or less.

The method or device of any prior embodiment, wherein the fourth power of the inter-spacer-distance (ISD) divided by the thickness (h) and the Young's modulus (E) of the flexible plate (ISD$^4$/(hE)) is 5×10$^5$ um$^3$/GPa or less.

The method or device of any prior embodiment, wherein the spacers have pillar shape, a substantially flat top surface, a predetermined substantially uniform height, and a predetermined constant inter-spacer distance that is at least about 2 times larger than the size of the analyte, wherein the Young's modulus of the spacers times the filling factor of the spacers is equal or larger than 2 MPa, wherein the filling factor is the ratio of the spacer contact area to the total plate area, and wherein, for each spacer, the ratio of the lateral dimension of the spacer to its height is at least 1 (one).

The method or device of any prior embodiment, wherein the spacers have pillar shape, a substantially flat top surface, a predetermined substantially uniform height, and a predetermined constant inter-spacer distance that is at least about 2 times larger than the size of the analyte, wherein the Young's modulus of the spacers times the filling factor of the spacers is equal or larger than 2 MPa, wherein the filling factor is the ratio of the spacer contact area to the total plate area, and wherein, for each spacer, the ratio of the lateral dimension of the spacer to its height is at least 1 (one), wherein the fourth power of the inter-spacer-distance (ISD) divided by the thickness (h) and the Young's modulus (E) of the flexible plate (ISD$^4$/(hE)) is 5×10$^6$ um$^3$/GPa or less.

The method or device of any prior embodiment, wherein the ratio of the inter-spacing distance of the spacers to the average width of the spacer is 2 or larger, and the filling factor of the spacers multiplied by the Young's modulus of the spacers is 2 MPa or larger.

The method or device of any prior embodiment, wherein the analyte is or comprises a protein, peptide, nucleic acid, synthetic compound, or inorganic compound.

The method or device of any prior embodiment, wherein the sample is a biological sample selected from amniotic fluid, aqueous humour, vitreous humour, blood (e.g., whole blood, fractionated blood, plasma or serum), breast milk, cerebrospinal fluid (CSF), cerumen (earwax), chyle, chime, endolymph, perilymph, feces, breath, gastric acid, gastric juice, lymph, mucus (including nasal drainage and phlegm), pericardial fluid, peritoneal fluid, pleural fluid, pus, rheum, saliva, exhaled breath condensates, sebum, semen, sputum, sweat, synovial fluid, tears, vomit, and urine.

The method or device of any prior embodiment, wherein the spacers have a shape of pillars and a ratio of the width to the height of the pillar is equal or larger than one.

The method or device of any prior embodiment, wherein the sample that is deposited on one or both of the plates has an unknown volume.

The method or device of any prior embodiment, wherein the spacers have a shape of pillar, and the pillar has substantially uniform cross-section.

The method or device of any prior embodiment, wherein the sample is for the detection, purification and quantification of chemical compounds or biomolecules that correlates with the stage of certain diseases.

The method or device of any prior embodiment, wherein the sample is related to infectious and parasitic disease, injuries, cardiovascular disease, cancer, mental disorders, neuropsychiatric disorders, pulmonary diseases, renal diseases, and other and organic diseases.

The method or device of any prior embodiment, wherein the sample is related to the detection, purification and quantification of microorganism.

The method or device of any prior embodiment, wherein the sample is related to virus, fungus and bacteria from environment, e.g., water, soil, or biological samples.

The method or device of any prior embodiment, wherein the sample is related to the detection, quantification of chemical compounds or biological samples that pose hazard to food safety or national security, e.g., toxic waste, anthrax.

The method or device of any prior embodiment, wherein the sample is related to quantification of vital parameters in medical or physiological monitor.

The method or device of any prior embodiment, wherein the sample is related to glucose, blood, oxygen level, total blood count.

The method or device of any prior embodiment, wherein the sample is related to the detection and quantification of specific DNA or RNA from biosamples.

The method or device of any prior embodiment, wherein the sample is related to the sequencing and comparing of genetic sequences in DNA in the chromosomes and mitochondria for genome analysis.

The method or device of any prior embodiment, wherein the sample is related to detect reaction products, e.g., during synthesis or purification of pharmaceuticals.

The method or device of any prior embodiment, wherein the sample is a cell, tissue, bodily fluid, and stool.

The method or device of any prior embodiment, wherein the sample is the sample in the fields of human, veterinary, agriculture, foods, environments, and drug testing.

The method or device of any prior embodiment, wherein the sample is a biological sample selected from hair, finger nail, ear wax, breath, connective tissue, muscle tissue, nervous tissue, epithelial tissue, cartilage, cancerous sample, or bone.

The method or device of any prior embodiment, wherein the inter-spacer distance is in the range of 5 µm to 120 µm.

The method or device of any prior embodiment, wherein the inter-spacer distance is in the range of 120 µm to 200 µm.

The method or device of any prior embodiment, wherein the flexible plates have a thickness in the range of 20 µm to 250 µm and Young's modulus in the range 0.1 to 5 GPa.

The method or device of any prior embodiment, wherein for a flexible plate, the thickness of the flexible plate times the Young's modulus of the flexible plate is in the range 60 to 750 GPa-µm.

The method or device of any prior embodiment, wherein the layer of uniform thickness sample is uniform over a lateral area that is at least 1 mm$^2$.

The method or device of any prior embodiment, wherein the layer of uniform thickness sample is uniform over a lateral area that is at least 3 mm$^2$.

The method or device of any prior embodiment, wherein the layer of uniform thickness sample is uniform over a lateral area that is at least 5 mm$^2$.

The method or device of any prior embodiment, wherein the layer of uniform thickness sample is uniform over a lateral area that is at least 10 mm$^2$.

The method or device of any prior embodiment, wherein the layer of uniform thickness sample is uniform over a lateral area that is at least 20 mm$^2$.

The method or device of any prior embodiment, wherein the layer of uniform thickness sample is uniform over a lateral area that is in a range of 20 mm$^2$ to 100 mm$^2$.

The method or device of any prior embodiment, wherein the layer of uniform thickness sample has a thickness uniformity of up to +/−5% or better.

The method or device of any prior embodiment, wherein the layer of uniform thickness sample has a thickness uniformity of up to +1-10% or better.

The method or device of any prior embodiment, wherein the layer of uniform thickness sample has a thickness uniformity of up to +/−20% or better.

The method or device of any prior embodiment, wherein the layer of uniform thickness sample has a thickness uniformity of up to +/−30% or better.

The method, device, computer program product, or system of any prior embodiment having five or more monitoring marks, wherein at least three of the monitoring marks are not in a straight line.

The method, device, computer program product, or system of any prior embodiment, wherein each of the plates comprises, on its respective outer surface, a force area for applying an imprecise pressing force that forces the plates together;

The method, device, computer program product, or system of any prior embodiment, wherein one or both plates are flexible;

The method, device, computer program product, or system of any prior embodiment, wherein the fourth power of the inter-spacer-distance (IDS) divided by the thickness (h) and the Young's modulus (E) of the flexible plate (ISD4/(hE)) is 5×106 um3/GPa or less;

The method, device, computer program product, or system of any prior embodiment, wherein at least one of the spacers is inside the sample contact area;

The method, device, computer program product, or system of any prior embodiment, wherein fat specification of analyte The method, device, computer program product, or system of any prior embodiment, wherein fat specification of algorithms The method, device, computer program product, or system of any prior embodiment, wherein fat specification of impression force and press by hands.

The device, system, or method of any prior embodiment, wherein the algorithm is stored on a non-transitory computer-readable medium, and wherein the algorithm comprises instructions that, when executed, perform a method that utilizes monitoring marks of the device to determine a property corresponding to the analyte.

Some Examples of Marks

In the present invention, in some embodiments, the marks have the same shapes as the spacers.

In some embodiments, the marks are periodic or aperiodic.

In some embodiments, the distance between two marks is predetermined and known, but the absolution coordinates on a plate are unknown.

In some embodiments, the marks have predetermined and known shapes.

In some embodiments, the marks are configured to have a distribution in a plate, so that regardless the position of the plate, there are always the marks in the field of the view of the imaging optics.

In some embodiments, the marks are configured to have a distribution in a plate, so that regardless the position of the plate, there are always the marks in the field of the view of the imaging optics and that the number of the marks are sufficient to for local optical information.

In some embodiments, the marks are used to control the optical properties of a local area of the sample, whereas the area size is 1 µm², 5 µm², 10 µm², 20 µm², 50 µm² 100 µm², 200 µm², 500 µm², 1000 µm², 2000 µm², 5000 µm², 10000 µm², 100000 µm², 500000 µm², or a range between any of two values.

Use of "Limited Imaging Optics"

In the present invention, in some embodiments, the optical system for imaging the assay has "limited imaging optics". Some embodiments of limited imaging optics include, but not limited to:

1. The limited imaging optics system, comprising:
   imaging lenses;
   an imaging sensor;
   wherein the imaging sensor is a part of the camera of a smartphone;
   wherein at least one of the imaging lenses is a part of the camera of smartphone;
2. The limited imaging optics system of any prior embodiment, wherein: the optical resolution by physics is worse than 1 µm, 2 µm, 3 µm, 5 µm, 10 µm, 50 µm, or in a range between any of the two values.
3. The limited imaging optics system of any prior embodiment, wherein: the optical resolution per physics is worse than 1 µm, 2 µm, 3 µm, 5 µm, 10 µm, 50 µm, or in a range between any of the two values.
4. The limited imaging optics system of any prior embodiment, wherein: the preferred optical resolution per physics is between 1 µm and 3 µm;
5. The limited imaging optics system of any prior embodiment, wherein: the numerical aperture is less than 0.1, 0.15, 0.2, 0.2, 0.25, 0.3, 0.35, 0.4, 0.45, 0.5, or in a range between any of the two values.
6. The limited imaging optics system of any prior embodiment, wherein: the preferred numerical aperture is between 0.2 and 0.25.
7. The limited imaging optics system of any prior embodiment, wherein: the working distance is 0.2 mm, 0.5 mm, 1 mm, 2 mm, 5 mm, 10 mm, 20 mm, or in a range between any of the two values.
8. The limited imaging optics system of any prior embodiment, wherein: the working distance is 0.2 mm, 0.5 mm, 1 mm, 2 mm, 5 mm, 10 mm, 20 mm, or in a range between any of the two values.
9. The limited imaging optics system of any prior embodiment, wherein: the preferred working distance is between 0.5 mm to 1 mm.
10. The limited imaging optics system of any prior embodiment, wherein: the focal depth is 100nm, 500nm, 1 µm, 2 µm, 10 µm, 100 µm, 1 mm, or in a range between any of the two values.
11. The limited imaging optics system of any prior embodiment, wherein: the focal depth is 100nm, 500nm, 1 µm, 2 µm, 10 µm, 100 µm, 1 mm, or in a range between any of the two values.
12. The limited imaging optics system of any prior embodiment, wherein: the image sensor is a part of the smartphone camera module.
13. The limited imaging optics system of any prior embodiment, wherein: the diagonal length of the image sensor is less than 1 inch, 1/2 inch, 1/3 inch, 1/4 inch, or in a range between any of the two values;
14. The limited imaging optics system of any prior embodiment, wherein: the imaging lenses comprises at least two lenses, and one lens is a part of the camera module of a smartphone.
15. The limited imaging optics system of any prior embodiment, wherein: at least one external lens is paired with the internal lens of smartphone.
16. The limited imaging optics system of any prior embodiment, wherein: the optical axis of external lens is aligned with the with the internal lens of smartphone, the alignment tolerance is less than 0.1 mm, 0.2 mm, 0.5 mm, 1 mm, or in a range between any of the two values.
17. The limited imaging optics system of any prior embodiment, wherein: the height of the external lens is less than 2 mm, 5 mm, 10 mm, 15 mm, 20m, or in a range between any of the two values.
18. The limited imaging optics system of any prior embodiment, wherein: the preferred height of the external lens is between 3 mm to 8 mm.
19. The limited imaging optics system of any prior embodiment, wherein: the preferred height of the external lens is between 3 mm to 8 mm.
20. The limited imaging optics system of any prior embodiment, wherein: the diameter of the external lens is less than 2 mm, 4 mm, 8 mm, 10 mm, 15 mm, 20 mm, or in a range between any of the two values.
21. The limited imaging optics system of any prior embodiment, wherein: the optical magnification per physics is less than 0.1×, 0.5×, 1×, 2×, 4×, 5×, 10×, or in a range between any of the two values.
22. The limited imaging optics system of any prior embodiment, wherein: the preferred optical magnification per physics is less than 0.1×, 0.5×, 1×, 2×, 4×, 5×, 10×, or in a range between any of the two values.

Use of "Limited Sample Manipulation"

In the present invention, in some embodiments, the sample position system for imaging the assay has "limited sample manipulation". Some embodiments of limited sample manipulation include, but not limited to:

Description of the Limited Sample Manipulation System:

1. The limited sample manipulation system, comprising: a sample holder;
   wherein the sample holder has a receptacle for taking in the sample card.
2. The limited sample manipulation system of any prior embodiment, wherein: the accuracy of positioning a sample in the direction along the optical axis is worse than 0.1 µm, 1 µm, 10 µm, 100 µm, 1 mm, or in a range between any of the two values.
3. The limited sample manipulation system of any prior embodiment, wherein: the preferred accuracy of positioning a sample in the direction along the optical axis is between 50 µm and 200 µm.
4. The limited sample manipulation system of any prior embodiment, wherein: the accuracy of positioning a sample in the plane perpendicular to the optical axis is worse than 0.01 µm, 0.1 µm, 1 µm, 10 µm, 100 µm, 1 mm, or in a range between any of the two values.
5. The limited sample manipulation system of any prior embodiment, wherein: the preferred accuracy of positioning a sample in the plane perpendicular to the optical axis is between 100 µm and 1 mm.
6. The limited sample manipulation system of any prior embodiment, wherein, the level error of positioning a sample card is worse than 0.01 degree, 0.1 degree, 0.5 degree, 1 degree, 10 degree, or in a range between any of the two values.
7. The limited sample manipulation system of any prior embodiment, wherein, the preferred level error of positioning a sample card is between 0.5 degree to 10 degree.
8. The limited sample manipulation system of any prior embodiment, wherein, the preferred level error of positioning a sample card is between 0.5 degree to 10 degree.

Sharp Edges of a Monitoring Mark

Figure 17:
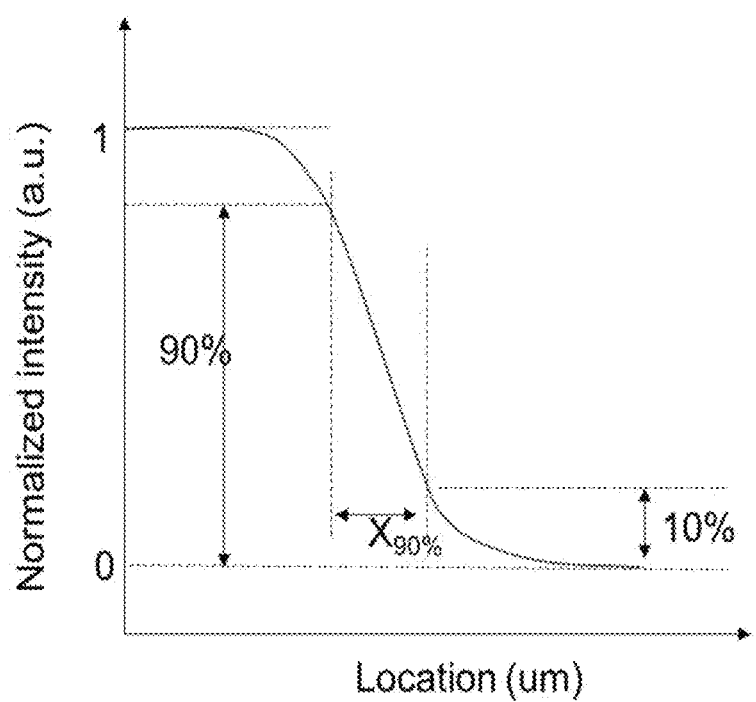
FIG. 17 is a plot of the light intensity curve versus the locations.

The term "sharp optical edge" refers to an edge or a boundary of an object in the image taken by certain optical system with the following property: at an edge or a boundary of an object in the image, the optical intensity (including but not limited to R, G, B, grey, hue, brightness) changes drastically versus the location. For example, quantitatively, as shown in FIG. 17, at the boundary, the distance ($X_{90\%}$) in which the normalized intensity decreases from 90% to 10% should be less than 5% of the length of the object in the image by such optical system. In other words, boundary gradient $=90\%/X_{90\%}>1800\%$/length of object. An example of the sharp edge is the edge of a pillar spacer that has a flat top and nearly 90-degree sidewall. An Example of the object that does not have a sharp edge is a sphere.

Examples of TLD and Volume Estimation with Monitor Marks

Figure 5:
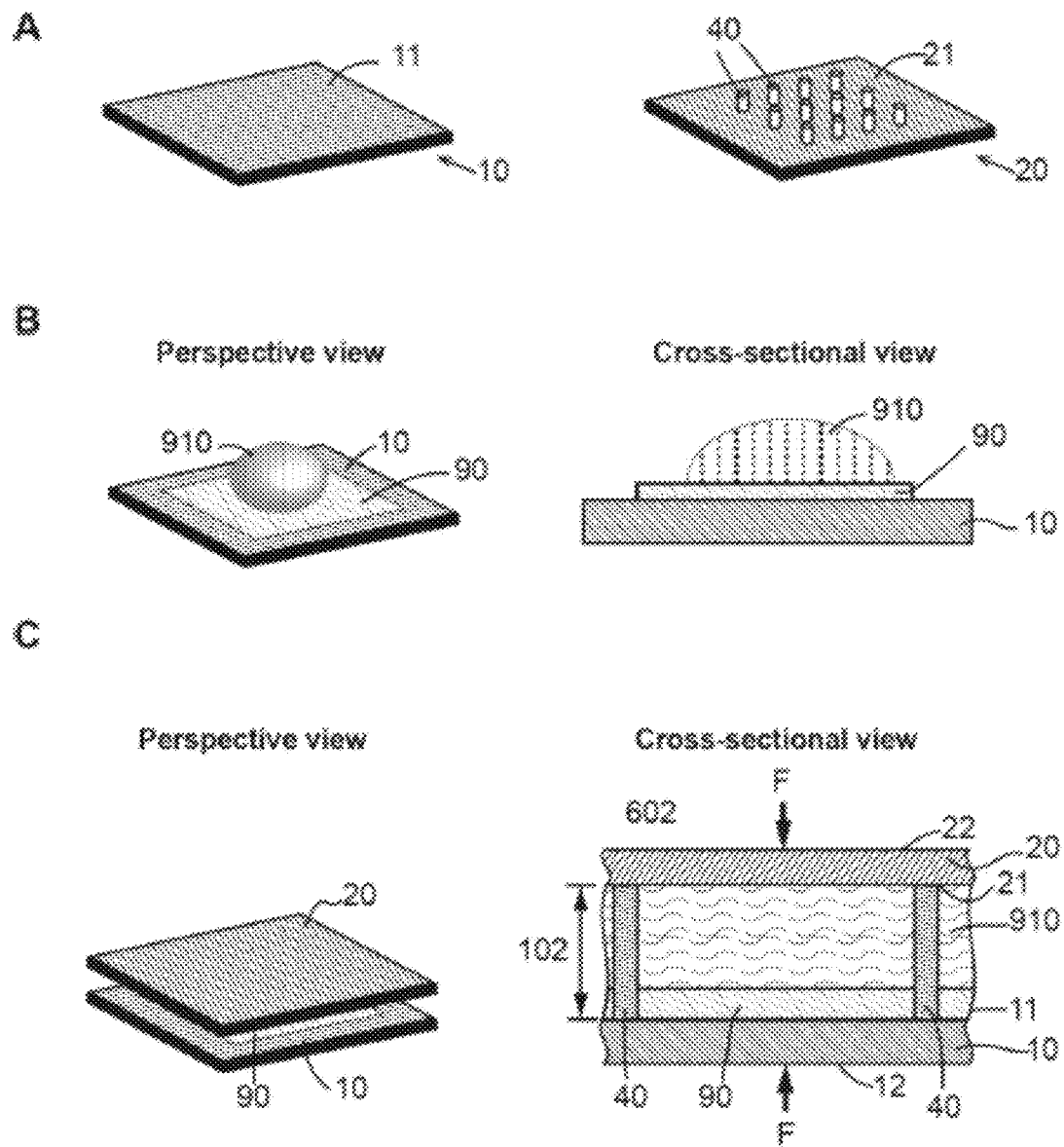
FIG. 5 shows an embodiment of a QMAX card used in image-based assaying.
Figure 6:
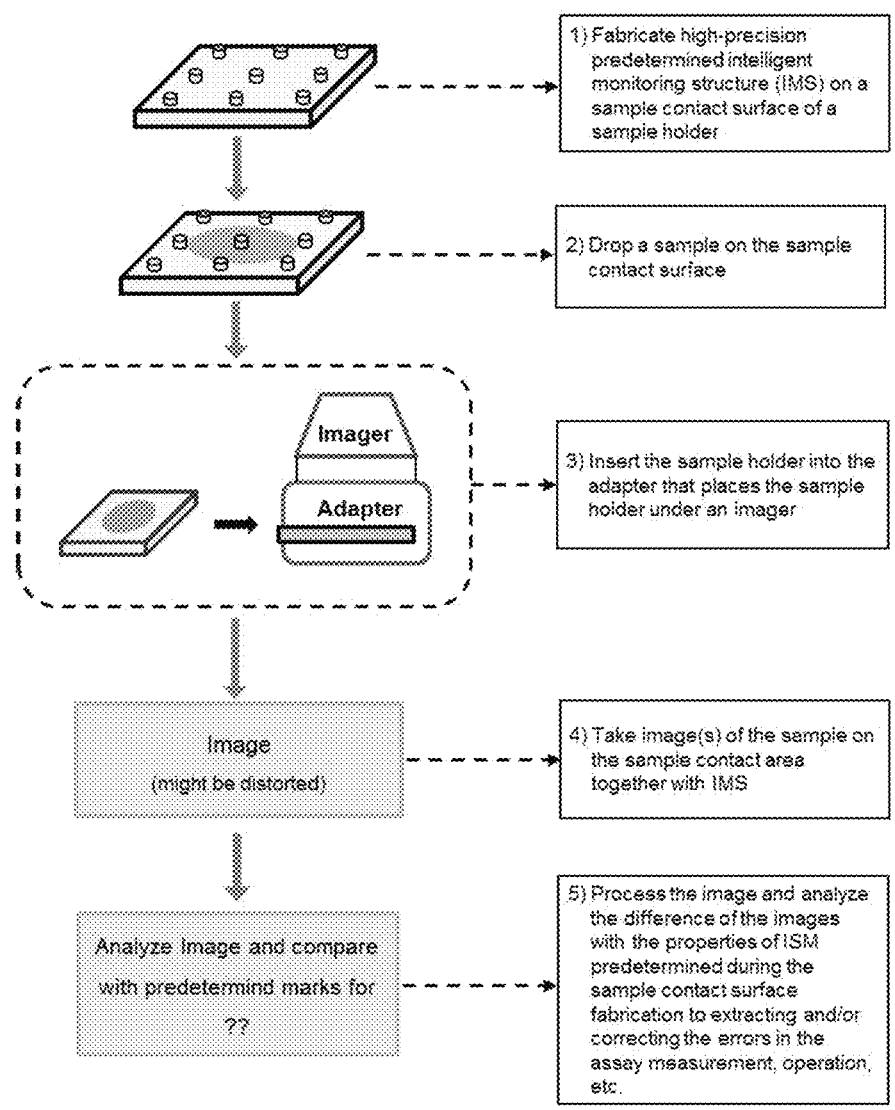
FIG. 6 shows a flow diagram of image-based assay with the sample holding device of QMAX card, in accordance with one or more embodiments.

FIG. 5 shows an embodiment of the sample holding device, QMAX device, and its monitor marks, pillars, used in some embodiments of the present invention. Pillars in QMAX device make the gap between two parallel plates of the sample holding device uniform. The gap is narrow and relevant to the size of the analytes where analytes form a monolayer in the gap. Moreover, the monitoring marks in QMAX device are in the special form of pillars, and consequently, they are not submerged by the sample and can be imaged with the sample by the imager in image based assay.

Examples of TLD (True-Lateral-Dimension) Estimation with Monitor Marks

In some embodiments of the present invention for TLD and true volume estimation. the monitor marks (pillars) are used as detectable anchors. However, detecting monitoring marks with an accuracy suitable for TLD estimation in image-based assay is difficult. This is because these monitoring marks are permeated and surrounded by the analytes inside the sample holding device. They are distorted and blurred in the image due to the distortion from the lens, light diffraction from microscopic objects in the sample, defects at microscopic level, misalignment in focusing, noise in the image of the sample, etc. And it becomes more difficult if imagers are cameras from commodity devices (e.g., cameras from smart phones), since those cameras are not calibrated by the dedicated hardware once they left the manufacture.

In the present invention, the detection and locating the monitor marks as detectable anchors for TLD estimation is formulated in a machine-learning framework and dedicated machine-learning model is built/trained to detect them in microscopic imaging. Moreover, the distribution of the monitor marks in some embodiments of the present invention is intentionally made to be periodic and distributed in a predefined pattern. This makes the approach in the present invention more robust and reliable.

An embodiment of the present invention comprises:
(1) load the sample to a sample holding device, e.g., QMAX device, wherein there are monitor marks with known configuration residing in the device that are not submerged in the sample and can be imaged by an imager;
(2) take an image of the sample in the sample holding device including analytes and monitor marks;
(3) build and train a machine learning (ML) model to detect the monitor marks in the image of the sample;
(4) detect and locate the monitor marks in the sample holding device from the image of the sample using the said ML detection model from (3);
(5) generate a mark grid from the detected monitor marks in (4);
(6) calculate a homographic transform based on the generated monitor mark grid;
(7) estimate and save the true-lateral-dimension of the image of the sample from the homographic transform from (6); and
(8) apply the estimated TLD from (7) in subsequent image-based assay to determine area, size, volume and concentration of the analytes.

In some embodiments of the present invention, region based TLD estimation and calibration are employed in image-based assay. It comprises:
(1) load the sample to a sample holding device, e.g., QMAX device, wherein there are monitor marks in the device—not submerged in the sample and can be imaged by an imager in the image-based assay;
(2) take an image of the sample in the sample holding device including analytes and monitor marks;
(3) build and train a machine learning (ML) model for detecting the monitoring marks from the image of the sample taken by the imager;
(4) partition the image of the sample taken by the imager into non-overlapping regions;
(5) detect and locate monitor marks from the image of the sample taken by the imager using the ML model of (3);
(6) generate a region-based mark grid for each of the region with more than 4 non-colinear monitor marks detected in the local region;
(7) generate a mark grid for all regions not in (6) based on detected monitor marks from the image of the sample taken by the imager;
(8) calculate a region-specific homographic transform for each region in (6) based on its own region-based mark grid generated in (6);
(9) calculate a homographic transform for all other regions based on the mark grid generated in (7);
(10) estimate the region based TLD for each region in (6) based on the region based homographic transform generated in (8);
(11) estimate the TLD for other regions based on the homographic transform from (9); and
(12) save and apply the estimated TLDs from (10) and (11) in subsequent image-based assay on partitioned regions.

When the monitor marks are distributed in a pre-defined periodic pattern, such as in QMAX device, they occur and distribute periodically with a certain pitch, and as a result, detection the monitor marks become more robust and reliable in the procedures described above. This is because with periodicity, all monitor marks can be identified and determined from just few detected ones, and detection errors can be corrected and eliminated, should the detected location and configuration do not follow the pre-defined periodic pattern.

The term "monitoring mark", "monitor mark", and "mark" are interchangeable in the description of the present invention.

The term "imager" and "camera" are interchangeable in the description of the present invention.

The term "denoise" refers to a process of removing noise from the received signal. An example is to remove the noise in the image of sample as the image from the imager/camera can pick up noise from various sources, including and not limited to white noise, salt and pepper noise, Gaussian noise, etc. Methods of denoising include and not limited to: linear and non-linear filtering, wavelet transform, statistic methods, deep learning, etc.

The term "image normalization" refers to algorithms, methods and apparatus that change the range of pixel intensity values in the processed image. For example, it includes and not limited to increasing the contrast by histogram stretching, subtract the mean pixel value from each image, etc.

In some embodiments of the current invention, methods and algorithms are devised to take advantage of the monitoring marks in the sample holding device, e.g., QMAX device. This includes and not limited to the estimation and adjustment of the following parameters in the imaging device:
1. shutter speed,
2. ISO,
3. focus (lens position),
4. exposure compensation,
5. white balance: temperature, tint, and
6. zooming (scale factor).

Examples of Image Processing/Analyzing Algorithms Used with Marks

In some embodiments of the present invention, the image processing/analyzing are applied and strengthened with the monitoring marks in the present invention. They include and not limited to the following image processing algorithms and methods:
1. Histogram-based operations include and not limited to:
   a. contrast stretching;
   b. equalization;
   c. minimum filter;
   d. median filter; and
   e. maximum filter.
2. Mathematics-based operations include and not limited to:
   a. binary operations: NOT, OR, AND, XOR, SUB, etc., and
   b. arithmetic-based operations: ADD, SUB, MUL, DIV, LOG, EXP, SQRT, TRIG, INVERT, etc.
3. Convolution-based operations in both spatial and frequency domain, include and not limited to Fourier transform, DCT, Integer transform, wavelet transform, etc.
4. Smoothing operations include and not limited to:
   a. linear filters: uniform filter, triangular filter, gaussian filter, etc., and
   b. non-linear filters: medial filter, kuwahara filter, etc.
5. Derivative-based operations include and not limited to:
   a. first derivatives: gradient filters, basic derivative filters, prewitt gradient filters, sobel gradient filters, alternative gradient filters, gaussian gradient filters, etc.;
   b. second derivatives: basic second derivative filter, frequency domain Laplacian, Gaussian second derivative filter, alternative Laplacian filter, second-derivative-in-the-gradient-direction (SDGD) filter, etc., and
   c. other filters with higher derivatives, etc.
6. Morphology-based operations include and not limited to:
   a. dilation and erosion;
   b. boolean convolution;
   c. opening and closing;
   d. hit-and-miss operation;
   e. segmentation and contour;
   f. skeleton;
   g. propagation;
   h. gray-value morphological processing: Gray-level dilation, gray-level erosion, gray-level opening, gray-level closing, etc.; and
   i. morphological smoothing, morphological gradient, morphological Laplacian, etc.

Other Examples of Image Processing/Analyzing Techniques

In some embodiments of the present invention, image processing/analyzing algorithms are used together with and enhanced by the monitoring marks. They include and not limited to the following:
1. Image enhancement and restoration include and not limited to
   a. sharpen and un-sharpen,
   b. noise suppression, and
   c. distortion suppression.
2. Image segmentation include and not limited to:
   a. thresholding—fixed thresholding, histogram-derived thresholding, Isodata algorithm, background-symmetry algorithm, triangle algorithm, etc.;
   b. edge finding—gradient-based procedure, zero-crossing based procedure, PLUS-based procedure, etc.;
   c. binary mathematical morphology- salt-or-pepper filtering, Isolate objects with holes, filling holes in objects, removing border-touching objects, exo-skeleton, touching objects, etc.; and
   d. gray-value mathematical morphology—top-hat transform, adaptive thresholding, local contrast stretching, etc.
3. Feature extraction and matching include and not limited to:
   a. independent component analysis;
   b. Isomap;
   c. principle component analysis and kernel principal component analysis;
   d. latent semantic analysis;
   e. least squares and partial least squares;
   f. multifactor dimensionality reduction and nonlinear dimensionality reduction;
   g. multilinear principal component analysis;
   h. multilinear subspace learning;
   i. semidefinite embedding; and
   j. autoencoder/decoder.
4. Object detection, classification, and localization
5. Image understanding Example E1. Improvement of Microscopic Imaging Using Monitoring Mark Using monitoring marks in the present invention is used to improve focus in microscopic imaging. In particular, monitoring marks with sharp edge will provide detectable (visible features) for the focus evaluation algorithm to analyze the focus conditions of certain focus settings, especially in low lighting environment and in microscopic imaging. In the embodiments of the image-based assay, focus evaluation algorithm is at the core part in the auto-focus implementations.

For some diagnostic applications (e.g., colorimetric, absorption-based hemoglobin test, and CBC for samples with very low cell concentrations), detectable features provided by the analyte in the image of the sample is often not enough for the focus evaluation algorithm to run accurately and smoothly. Monitoring marks with sharp edges, e.g., the monitoring marks in QMAX device, provide additional detectable features for the focus evaluation program to achieve the accuracy and reliability required in the image-based assay.

For some diagnostic applications, analytes in the sample are distributed unevenly. Purely relying on features provided by analytes tends to generate some unfair focus setting that gives high weight of focusing on some local high concentration regions and low analyte concentration regions are off target. In some embodiments of the current invention, this effect is controlled with the focusing adjustments from the information of the monitoring marks which have strong edges and are distributed evenly with an accurately processed periodic pattern.

In addition, each imager has an imaging resolution limited in part by the number of pixels in its imager sensor that varies from one million to multimillion pixels. For some microscopic imaging applications, analytes are of small or tiny size in the sample, e.g., the size of platelets in human blood has a dimeter about 1.4 μm. The limited resolution in the image sensors put a significant constraint on the capability of the device in the image-based assay, in addition to the usable size of FOV, when certain number of pixels is required by the target detection programs.

Single Image Super Resolution (SISR) is a technique to use image processing and/or machine learning techniques to up-sample the original source image to a higher resolution and remove as much blur caused by interpolation as possible, such that the object detection program can run on the newly generated images as well. This will significantly reduce the constraints mentioned above and enable some otherwise impossible applications. Monitoring marks with known shape and structure (e.g., the monitor marks in QMAX card) can serve as local references to evaluate the SISR algorithm to avoid over-sharpening effect generated with most existing state-of-the-art algorithms.

In some embodiments of the present invention, image fusion is performed to break the physical SNR (signal-to-noise) limitation in image based assay.

Signal to noise ratio measures the quality of the image of the sample taken by the imager in microscopic imaging. There is a practical limitation for an imaging device due to the cost, technology, fabrication, etc. In some situation, e.g., in mobile healthcare, the application requires higher SNR than the regular imaging device can provide. In some embodiments of the present invention, multiple images are taken and processed (with same and/or different imaging setting, e.g., an embodiment of a 3D fusion to merge multiple images focused at different focus depth into one super focused image) to generate output image(s) with higher SNR to make such applications possible.

However, images taken by an imager or multiple imagers tend to have some imperfections and defects, caused by physical limitation and implementation constraints. The situation becomes acute in the microscopic imaging of the sample in image-based assay, because the analytes in the sample are of tiny size and often without distinct edge features. In some embodiments of the present invention, monitoring marks in the sample holding device, e.g., the QMAX card, are used for enhanced solutions.

One such embodiment is to handle distortions in the image of the sample taken by the imager. The situation is relatively simple if the distortion parameter is known (most manufacture gives a curve/table for their lens to describe ratio distortion, other distortions can be measured in well-defined experiments). However, when the distortion parameters are unknown (it can change with the focus location and even the sample), with the monitoring marks, a new algorithm can iteratively estimate the distortion parameters using regularly and even periodically placed monitoring marks of the sample holding device (e.g., QMAX card) without requiring a single coordinate reference.

Additional Examples

In the present invention, in some embodiments, the sample holding device has a flat surface with some special monitoring marks for the purpose of analyzing the microscopic features in the image-based assay. Some exemplary embodiments are listed as follows:

True-lateral-dimension (TLD) estimation for the microscopic image of the sample in the image-based assay. True Lateral Dimension (TLD) determines the physical dimension of the imaged analytes in the real would, and it also determines the coordinates of image of the sample in the real world that is related to the concentration estimation in image-based assay. The monitoring marks can be used as detectable anchors to determine the TLD and improve the accuracy in the image-based assay. In an embodiment of the present invention, the monitoring marks are detected using machine-learning model, from which the TLD/FoV of the image of the sample is derived. Moreover, if the monitoring marks have a periodic distribution pattern on the flat surface of the sample holding device, the detection of monitoring marks and the per-sample based TLD/FoV estimation can become more reliable and robust in image-based assay.

Analyzing the analytes using the measured response from the analyte compound at a specific wavelength of light or at multiple wavelengths of light to predict the analyte concentration. Monitoring marks that are not submerged in the sample can be used to determine the light absorption of the background corresponding to zero concentration—to determine the analyte concentration through light absorption, and this approach is to HgB test in present invention. In addition, each monitoring mark can act as an independent detector for the background absorption to make the concentration estimation robust and reliable.

Focusing in microscopic imagine for image-based assay. Evenly distributed monitoring marks can be used to improve the focus accuracy. (a) It can be used to provide minimum amount of vision features, for samples with no/less than necessary features, to do reliable focusing. This can be performed in low light due to the edge contents of the monitoring marks. (b) It can be used to provide vision features when features in the sample are unevenly distributed to make the focus decision fair. (c) It can provide a reference for local illumination conditions that have no/less/different impacts by the content of sample to adjust the weight in focus evaluation algorithms.

Monitoring marks can be used as references to detect and/or correct image imperfection caused by but not limited to: unevenly distributed illumination, various types of image distortions, noises, and imperfect image pre-processing operations. For example, as shown in FIG. 16, positions of the marks can be used to detect and/or correct the ratio distortion when the straight line in 3D world is mapped in the image of the sample into a curve. Ratio distribution parameters of the entire image can be estimated based on the position changes of the monitoring marks of the sample holding device described herein. And the value of ratio distortion parameters can be iteratively estimated by linear testing of horizontal/vertical lines in reproduced images with distortion removal based on assumed ratio distortion parameters.

Examples of Machine Learning (ML) Calculation

One way of using machine learning is to detect the analytes in the image of the sample and calculate the bounding boxes that cover them for their locations, is performed using trained machine-learning models in the inference process of the processing. Another way of using machine learning method to detect and locate analytes in the image of the sample is to build and train a detection and segmentation model which involving the annotation of the analytes in the sample image at pixel level. In this approach, analytes in the image of the sample can be detected and located with a tight binary pixel mask covering them in image-based assay.

When testing hemoglobin in human blood, images are taken at the given narrowband wavelength, and then the average energy pass through the analytes areas and reference areas are analyzed. Based on the known rate of absorption of analytes at the given wavelength and the height of the analyte sample area, the concentration can be estimated. However, this measurement has noises. To cancel out the noise, multiple images can be taken using different wavelength of light and use machine learning regression to achieve a more accurate and robust estimation. The machine learning based inference takes multiple input images of the sample, taken at different wavelength, and output a single concentration number.

E. Algorithm of Machine Learning

E-1. QMAX Device for Assay and Imaging

According to present invention, a device for biological analyte detection and localization, comprising a QMAX device, an imager, and a computing unit, is disclosed. A biological sample is suspected on the QMAX device. The count and location of an analyte contained in the sample are obtained by the disclosure.

According to present invention, the imager captures an image of the biological sample. The image is submitted to a computing unit. The computing unit can be physically directly connected to the imager, connected through network, or in-directly through image transfer.

E-2. Workflow

The disclosed analyte detection and localization employ machine learning deep learning. A machine learning algorithm is an algorithm that is able to learn from data. A more rigorous definition of machine learning is "A computer program is said to learn from experience E with respect to some class of tasks T and performance measure P, if its performance at tasks in T, as measured by P, improves with experience E." It explores the study and construction of algorithms that can learn from and make predictions on data—such algorithms overcome following strictly static program instructions by making data driven predictions or decisions, through building a model from sample inputs.

Deep learning is a specific kind of machine learning based on a set of algorithms that attempt to model high level abstractions in data. In a simple case, there might be two sets of neurons: ones that receive an input signal and ones that send an output signal. When the input layer receives an input, it passes on a modified version of the input to the next layer. In a deep network, there are many layers between the input and output (and the layers are not made of neurons but it can help to think of it that way), allowing the algorithm to use multiple processing layers, composed of multiple linear and non-linear transformations.

Figure 4A:
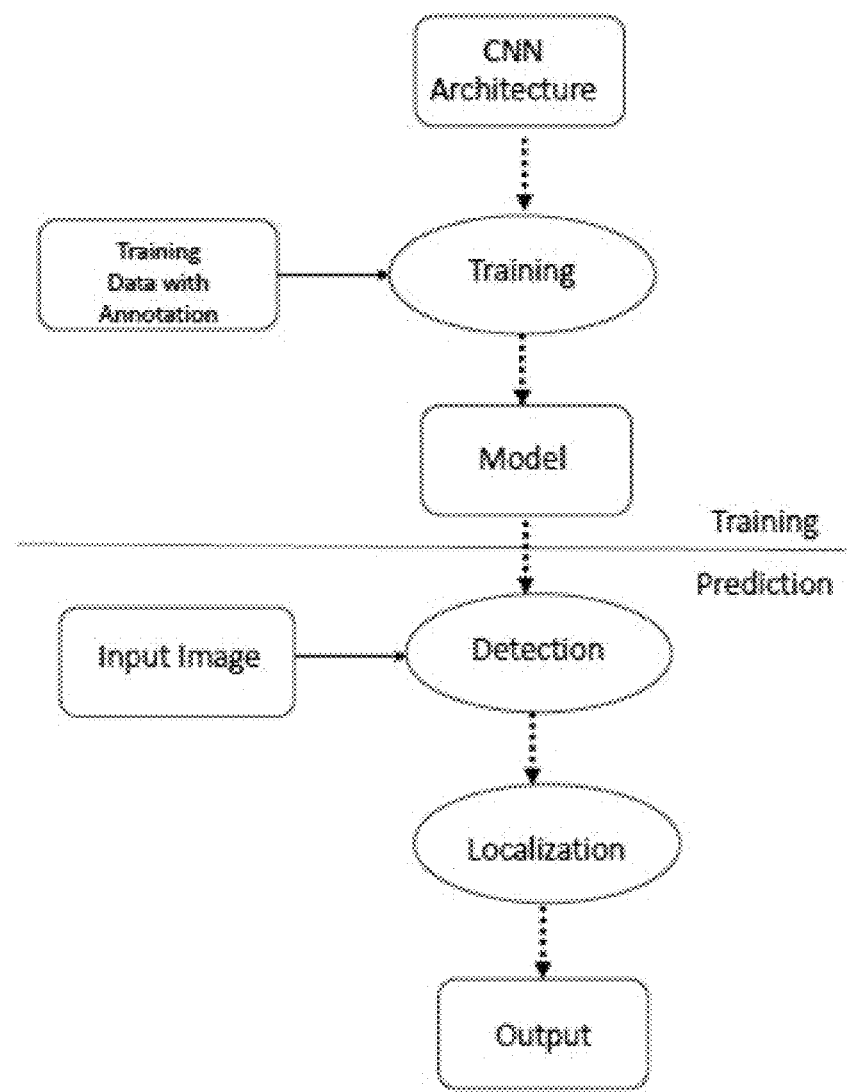
FIG. 4A shows analyte detection and localization workflow, which consists of two stages, training and prediction, according to some embodiments of the present invention.

The disclosed analyte detection and localization workflow comprises two stages, training and prediction, as in FIG. 4A. We describe training and prediction stages in the following paragraphs.

Training

In the training stage, training data with annotation is fed into a convolutional neural network. Convolutional neural network a specialized kind of neural network for processing data that has a known, grid-like topology. Examples include time-series data, which can be thought of as a 1D grid taking samples at regular time intervals, and image data, which can be thought of as a 2D grid of pixels. Convolutional networks have been tremendously successful in practical applications. The name "convolutional neural network" indicates that the network employs a mathematical operation called convolution. Convolution is a specialized kind of linear operation. Convolutional networks are simply neural networks that use convolution in place of general matrix multiplication in at least one of their layers.

Training data are annotated for the analyte to be detect. Annotation indicates whether or not an analyte presents in a training data. Annotation can be done in the form of bounding boxes which fully contains the analyte, or center locations of analytes. In the latter case, center locations are further converted into circles covering analytes.

When the size of training data is large, it presents two challenges: annotation (which is usually done by person) is time consuming, and the training is computing expensive. To overcome these challenges, one can partition the training data into patches of small size, then annotate and train on these patches, or a portion of these patches.

Annotated training data is fed into a convolutional neural network for model training. The output is a model that can be used to make pixel-level prediction on an image. We use the Caffe library with fully convolutional network (FCN). Other convolutional neural network architecture can also be used, such as TensorFlow.

The training stage generates a model that will be used in the prediction stage. The model can be repeatedly used in the prediction stage for input images. Thus, the computing unit only needs access to the generated model. It does not need access to the training data, nor the training stage has to be run on the computing unit.

Prediction

In the predication stage, a detection component is applied to the input image, which is followed by a localization component. The output of the prediction stage is the count of analytes contained in the sample, along with the location of each analyte.

In the detection component, an input image, along with the model generated from the training stage, is fed into a convolutional neural network. The output of the detection stage is a pixel-level prediction, in the form of a heatmap. The heatmap can have the same size as the input image, or it can be a scaled down version of the input image. Each pixel in the heatmap has a value from 0 to 1, which can be considered as the probability (belief) whether a pixel belongs to an analyte. The higher the value, the bigger the chance it belongs to an analyte.

The heatmap is the input of the localization component. We disclose an algorithm to localize the analyte center. The main idea is to iteratively detect local peaks from the heatmap. After we find the peak, we calculate the local area surrounding the peak but with smaller value. We remove this region from the heatmap and find the next peak from the remaining pixels. The process is repeated only all pixels are removed from the heatmap.

One embodiment of the localization algorithm is to sort the heatmap values into a one-dimensional ordered list, from the highest value to the lowest value. Then pick the pixel with the highest value, remove the pixel from the list, along with its neighbors. Iterate the process to pick the pixel with the highest value in the list, until all pixels are removed from the list.

```
Algorithm GlobalSearch (heatmap)
Input:
    heatmap
Output:
    loci
loci ←{ }
sort(heatmap)
while (heatmap is not empty) {
    s ← pop(heatmap)
    D ← {disk center as s with radius R}
    heatmap = heatmap \ D // remove D from the heatmap
    add s to loci
}
```

After sorting, heatmap is a one-dimensional ordered list, where the heatmap value is ordered from the highest to the lowest. Each heatmap value is associated with its corresponding pixel coordinates. The first item in the heatmap is the one with the highest value, which is the output of the pop(heatmap) function. One disk is created, where the center is the pixel coordinate of the one with highest heatmap value. Then all heatmap values whose pixel coordinates resides inside the disk is removed from the heatmap. The algorithm repeatedly pops up the highest value in the current heatmap, removes the disk around it, till the items are removed from the heatmap.

Figure 4B:
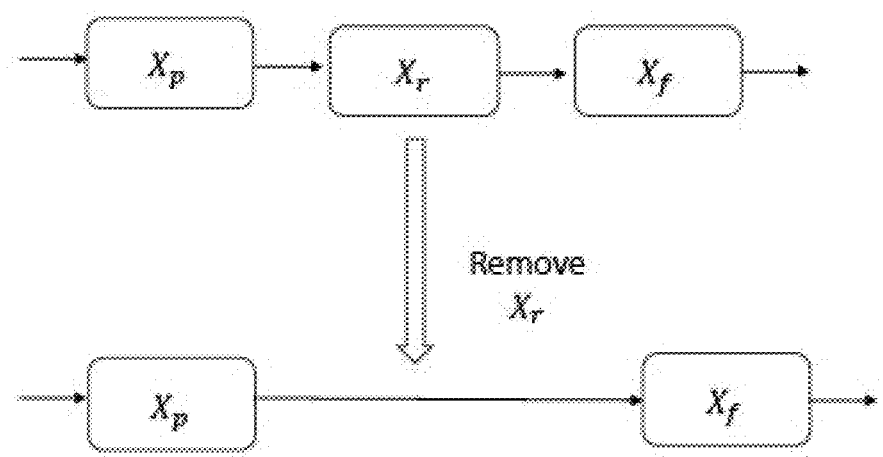
FIG. 4B shows the process to remove one item from an ordered list, according to some embodiments of the present invention.

In the ordered list heatmap, each item has the knowledge of the proceeding item, and the following item. When removing an item from the ordered list, we make the following changes, as illustrated in FIG. 4B:

Assume the removing item is $x_r$, its proceeding item is $x_p$, and its following item is $x_f$.

For the proceeding item $x_p$, re-define its following item to the following item of the removing item. Thus, the following item of $x_p$ is now $x_f$.

For the removing item $x_r$, un-define its proceeding item and following item, which removes it from the ordered list.

For the following item $x_f$, re-define its proceeding item to the proceeding item of the removed item. Thus, the proceeding item of $x_f$ is now $x_p$.

After all items are removed from the ordered list, the localization algorithm is complete. The number of elements in the set loci will be the count of analytes, and location information is the pixel coordinate for each s in the set loci.

Another embodiment searches local peak, which is not necessary the one with the highest heatmap value. To detect each local peak, we start from a random starting point, and search for the local maximal value. After we find the peak, we calculate the local area surrounding the peak but with smaller value. We remove this region from the heatmap and find the next peak from the remaining pixels. The process is repeated only all pixels are removed from the heatmap.

```
Algorithm LocalSearch (s, heatmap)
Input:
    s: starting location (x, y)
    heatmap
Output:
    s: location of local peak.
We only consider pixels of value >0.
Algorithm Cover (s, heatmap)
Input:
    s: location of local peak.
    heatmap:
Output:
    cover: a set of pixels covered by peak:
```

This is a breadth-first-search algorithm starting from s, with one altered condition of visiting points: a neighbor p of the current location q is only added to cover if heatmap[p]>0 and heatmap[p] <=heatmap[q]. Therefore, each pixel in cover has a non-descending path leading to the local peak s.

```
Algorithm Localization (heatmap)
Input:
    heatmap
Output:
    loci
loci ←{ }
pixels ←{all pixels from heatmap}
while pixels is not empty {
    s ←any pixel from pixels
    s ←LocalSearch(s, heatmap)     // s is now local peak
    probe local region of radius R surrounding s for better local peak
    r ←Cover(s, heatmap)
    pixels ← pixels \ r            // remove all pixels in cover
    add s to loci.
```

E-3. Example of present invention

EA1. A method of deep learning for data analysis, comprising:
  (f) receiving an image of a test sample, wherein the sample is loaded into a QMAX device and the image is taken by an imager connected to the QMAX device, wherein the image includes detectable signals from an analyte in the test sample;
  (g) analyzing the image with a detection model and generating a 2-D data array of the image, wherein the 2-D data array includes probability data of the analyte for each location in the image, and the detection model is established through a training process that comprises:
    iii. feeding an annotated data set to a convolutional neural network, wherein the annotated data set is from samples that are the same type as the test sample and for the same analyte; and
    iv. training and establishing the detection model by convolution; and
  (h) analyzing the 2-D data array to detect local signal peaks with:
    iii. signal list process, or
    iv. local searching process; and
  (i) calculating the amount of the analyte based on local signal peak information.

EB1. A system for data analysis, comprising:
  a QMAX device, an imager, and computing unit, wherein:
  (a) the QMAX device is configured to compress at least part of a test sample into a layer of highly uniform thickness;

(b) the imager is configured to produce an image of the sample at the layer of uniform thickness, wherein the image includes detectable signals from an analyte in the test sample;

(c) the computing unit is configured to:
  i. receive the image from the imager;
  ii. analyze the image with a detection model and generate a 2-D data array of the image, wherein the 2-D data array includes probability data of the analyte for each location in the image, and the detection model is established through a training process that comprises:
    feeding an annotated data set to a convolutional neural network, wherein the annotated data set is from samples that are the same type as the test sample and for the same analyte; and
    training and establishing the detection model by convolution; and
  iii. (c) analyzing the 2-D data array to detect local signal peaks with signal list process, or local searching process; and
  iv. calculate the amount of the analyte based on local signal peak information.

EA2. The method of embodiment EA1, wherein the signal list process comprises:
  i. establishing a signal list by iteratively detecting local peaks from the 2-D data array, calculating a local area surrounding the detected local peak, and removing the detected peak and the local area data into the signal list in order; and
  ii. sequentially and repetitively removing highest signals from the signal list and signals from around the highest signal, thus detecting local signal peaks.

EA3. The method of any embodiments EA embodiments, wherein the local search process comprises:
  i. searching for a local maximal value in the 2-D data array by starting from a random point;
  ii. calculating the local area surrounding the peak but with smaller value;
  iii. removing the local maximal value and the surrounding smaller values from the 2-D data array; and
  iv. repeating steps i-iii to detect local signal peaks.

EA4. The method of any prior EA embodiments, wherein the annotated data set is partitioned before annotation.

EB2. The system of embodiment EB1, wherein the imager comprises a camera.

EB3. The system of embodiment EB2, wherein the camera is part of a mobile communication device.

EB4. The system of any prior EB embodiments, wherein the computing unit is part of a mobile communication device.

Example of Identifying Error Risk to Improve the Measurement Reliability

In some embodiments, a method for improving the reliability of the assay, the method comprising:
  (a) imaging the sample on the QMAX card;
  (b) analyzing the error risk factor; and
  (c) rejecting the card from reporting a measurement result of the card, if the error risk factor is higher than a threshold;
  wherein the error risk factor is one of the following factors or any combination thereof. The factors are, but not limited to, (1) edge of blood, (2) air bubble in the blood, (3) too small blood volume or too much blood volume, (4) blood cells under the spacer, (5) aggregated blood cells, (6) lysed blood cells, (7) over exposure image of the sample, (8) under exposure image of the sample, (8) poor focus of the sample, (9) optical system error as wrong lever position, (10) not closed card, (11) wrong card as card without spacer, (12) dust in the card, (13) oil in the card, (14) dirty out of the focus plane one the card, (15) card not in right position inside the reader, (16) empty card, (17) manufacturing error in the card, (18) wrong card for other application, (19) dried blood, (20) expired card, (21) large variation of distribution of blood cells, (22) not blood sample or not target blood sample and others.

In some embodiments, the error risk analyzer is able to detect, distinguish, classify, revise and/or correct following cases in biological and chemical application in device: (1) at the edge of sample, (2) air bubble in the sample, (3) too small sample volume or too much sample volume, (4) sample under the spacer, (5) aggregated sample, (6) lysed sample, (7) over exposure image of the sample, (8) under exposure image of the sample, (8) poor focus of the sample, (9) optical system error as wrong lever, (10) not closed card, (11) wrong card as card without spacer, (12) dust in the card, (13) oil in the card, (14) dirty out of the focus plane one the card, (15) card not in right position inside the reader, (16) empty card, (17) manufacturing error in the card, (18) wrong card for other application, (19) dried sample, (20) expired card, (21) large variation of distribution of blood cells, (22) wrong sample and others.

wherein the threshold is determined from a group test.
wherein the threshold is determined from machine learning.
Wherein the monitoring marks are used as comparison to identify the error risk factor.
Wherein the monitoring marks are used as comparison to assess the threshold of the error risk factor.

More Examples

Example A1 is a method using an apparatus to improve imaging-based assays. The method may include receiving a sample image of a sample holder comprising a plurality of monitoring structures integrated on a contact surface of at least one plate of the sample holder, wherein the plurality of monitoring structures are placed according to a pattern, and wherein the contact surface contacts a sample that contains a plurality of analytes; detecting, using a machine learning model, the plurality of monitoring structures in the sample image; optionally performing error correction of the detected plurality of monitoring structures using predetermined structural properties associated with the plurality of monitoring structures; determining, based on the detected plurality of monitoring structures, a true-literal-dimension value associated with the sample image; determining, based on the true-literal dimension value, a homographic transform between locations of the detected plurality of monitoring structures in the sample image and a predetermined distribution pattern for the plurality of monitoring structures in an actual image plan associated with the sample holder; transforming, based on the homographic transform, the sample image containing the plurality of analytes to a corresponding perspective view in the actual image plan; and calculating at least one morphological property associated with at least one of the plurality of analytes in the sample image.

In Example A2, the method of Example A1 may further include detecting a center for each of the plurality of monitoring structures; and determining the homographic transform based on the detected centers of the plurality of monitoring structures comprising of at least 4 non-colinear points.

In Example A3, the method of Example A1 may further provide that the sample image is partitioned into non-overlapping image patches, each of the non-overlapping image patches comprising at least 4 non-colinear detected centers of the plurality of monitoring structures, wherein a patch specific homographic transform is estimated and applied to compensate the said image patch, and for other image patches, a global homographic transform is estimated and applied based on the detected centers of the plurality of monitoring structures in the whole image.

In Example A4, the method of Example A1 may further provide that the monitoring structures are pillars or monitoring marks. In some implementations, the pillars may be nanostructures substantially perpendicularly integrated to one or two contract surfaces of the at least one plate of the sample holder. In other implementations, the monitoring marks are marked regions on the one or two contact surfaces. The marked regions may have optical properties (e.g., transparency) different than unmarked regions on the one or two contact surfaces. For example, the marked regions can be surface areas that are painted or engraved a thin layer of nanomaterials while the unmarked regions are not covered by any nanomaterials.

In Example A5, the method of Example A1 may further provide that the machine learning model is trained using a labeled training image set, and wherein the machine learning model can be a RetinerNet or a convolutional neural network (CNN) whose parameters are trained using the labeled training image set.

In Example A6, the method of Example A1 may further provide that the predetermined structural properties comprise at least one of a periodicity, a shape, or a size associated with the plurality of monitoring structures. The monitoring structures can be arranged according to an organized pattern. The periodicity may refer the number of monitoring structures within a measurement unit (e.g., a linear measurement such as, for example an inch or a millimeter, or an area measurement such as, for example, a square inch or a square millimeter). The shape may refer to the geometric configuration of each monitoring structure. The monitoring structure can be a cylindrical structure with a cross-section of a triangle, a rectangle, a square, a circle, a polygon, or any suitable 2D shapes. The size may refer to the area of the cross-section of a monitoring structure. In one implementation, the monitoring structures may have substantially identical shape and size. In another implementation, the monitoring structures may have a variety of shapes and sizes while the locations of different monitoring structures are pre-determined during the manufacturing of the sample holder.

In Example A7, the method of Example A1 may further provide that the at least one morphological property comprises at least one of a size or a length of one of the plurality of analyte. The size can be an area measurement. The length can be a linear measurement along an axis. For example, for a circle, the length can be the diameter; for a rectangular, the length can be the height, the width, or the diagonal length.

Example A8 is a method micro-selective-image-assaying (MSIA) in the image-based assay. The method includes capturing an image of a sample for assaying in the sample holding device, wherein the sample holding device can be the sample holder as described in Example A1 and the sample in the sample holding device comprising a known uniform height and analytes forms a mono-layer in an area of interest; estimating the TLD or FoV of the image of the sample to determine an estimation of area, size and volume in the image-based assaying; detecting defects including air bubbles or dusts in the image of the sample for assaying and segmenting these defects in the image of the sample by a trained machine learning model; estimating total areas of segmented defects in the image of the sample and calculating their actual area size using the estimated TLD/FoV from (b); estimating the actual volume of the sample corresponding to the total surface area of the detected defects in the image of the sample for assaying, according to the area estimate from (d) and the known height of the sample in the sample holding device; removing the surface areas of the detected defects in the image of the sample for assaying and updating the total volume of the remaining sample by subtracting the defects volume estimate from (e) which corresponds to the total volume under the surface area of the detected defects; and performing the image-based assaying on the selected area of the updated sample image and the updated sample volume from (f) for micro-selective-image-assaying.

In Example A9, the method of Example A8 may further provide that the micro-selective-image-assaying (MSIA) utilizes the monitoring structures in the sample holding device of A4 to estimate the TLD/FoV of the image of the sample and map the image of the sample to its actual dimensions through an embodiment of A1.

In Example A10, the method of Example A8 may further provide that the micro-selective-image-assaying (MSIA) is based on other selective criterions including: a) distributions of defects in the sample, including air bubbles and dusts; b) locations of pillars and monitoring marks and other artifacts in the image of the sample for assaying; and c) distribution and the condition of the analytes in the image of the sample for assaying, including conditions of analytes clustering and focusing condition.

In Example A11, the method of Example A8 may further provide that the micro-selective-image-assaying (MSIA) performs multi-target assaying from the image of the sample, in which the multi-target assaying is based on area/zone selection with areas defined by different reagents or sample heights, for multiple assaying applications from one single image of the sample.

In Example A12, the method of any of Example A8 or A11 may further provide that a machine learning model is trained on the labeled training image samples captured by an imager for defects detection and segmentation in the image-based assay.

In Example A13, the method of any of Example A8 or A11 may further provide that a machine learning model is trained to detect the analytes in the image of the sample and determine the size of the detected analytes using the method of Example A1 and the structure of the sample holding device as described in Example A8.

Example A14 is a method of monitoring the image-based assaying using the pillars or monitoring marks using the image of the pillar or monitoring marks in the image of the sample for assaying to determine the quality of the image holding device and the quality of the sample preparation, the method including detecting regions corresponding to missing pillars or broken pillars in the sample holding device that affect the effective sample volume for the assaying; and detecting air bubbles and dusts in the image of the sample, indicating flaws in the assaying operation or defects of in the sample holding device.

In Example A15, the method of Example A14 may further include using the image of the pillars or monitoring marks in the image of the sample for assaying to detect and adjust the operation of the imager in the image-based assaying, including: focusing, contrast stretching, iso adjustment, and filtering.

Example BA-1 is an intelligent assay monitor method, the method including receiving, by a processing device, an image encoding first information of a biological sample deposited in a sample card and second information of a plurality of monitor marks; determining, by the processing device executing a first machine learning model on the image, a measurement of a geometric feature associated with the plurality of monitor marks; determining, by the processing device, a variation between the measurement of the geometric feature with a ground truth value of the geometric feature provided with the sample card; correcting, by the processing device based on the variation, the image encoding the first information and the second information; and determining, by the processing device using the corrected image, a biological property of the biological sample.

In Example BA-2, the method of Example BA-1 may further provide that the sample card comprises a first plate, a plurality of pillars that are substantially perpendicularly integrated to a surface of the first plate, and a second plate capable of enclosing the first plate to form a thin layer in which the biological sample is deposited.

In Example BA-3, the method of any of Example BA-1 or BA-2 may further provide that the plurality of monitor marks corresponds to the plurality of pillars.

In Example BA-4, the method of Example BA-3 may further provide that at least two of the plurality of pillars are separated by a true-lateral-dimension (TLD), and wherein determining, by the processing device executing a first machine learning model on the image, a measurement of a geometric feature associated with the plurality of monitor marks comprises determining, by the processing device executing the first machine learning model on the image, the TLD.

Example BB-1 is an image system including a sample card comprising a first plate, a plurality of pillars substantially perpendicularly integrated to a surface of the first plate, and a second plate capable of enclosing the first plate to form a thin layer in which the biological sample is deposited; and a computing device comprising: a processing device, communicatively coupled to an optical sensor, to receive, from the optical sensor, an image encoding first information of a biological sample deposited in the sample card and second information of a plurality of monitor marks, determine, using a first machine learning model on the image, a measurement of a geometric feature associated with the plurality of monitor marks, determine a variation between the measurement of the geometric feature with a ground truth value of the geometric feature provided with the sample card, correct, based on the variation, the image encoding the first information and the second information, and determine, based on the corrected image, a biological property of the biological sample.

Example DA-1 is a method for measuring a volume of a sample in a thin-layered sample card, the method including receiving, by a processing device of an image system, an image of a sample card comprising a sample and a monitor standard, wherein the monitor standard comprises a plurality of pillars perpendicularly integrated to a first plate of the sample, and each of the plurality of pillars has a substantially identical height (H); determining, by the processing device using a machine learning model, a plurality of non-sample sub-regions, wherein the plurality of non-sample sub-regions correspond to at least one of a pillar, an air bubble, or an impurity element; calculating, by the processing device, an area occupied by the sample by removing the plurality of non-sample sub-regions from the image; calculating, by the processing device, a volume of the sample based on the calculated area and the height (H); and determining, by the processing device based on the volume, a biological property of the sample.

A1: A method of using an apparatus to improve imaging-based assays, comprising:
   a) receiving a sample image of a sample holder comprising a plurality of monitoring structures integrated on a contact surface of at least one plate of the sample holder, wherein the plurality of monitoring structures are placed according to a pattern, and wherein the contact surface contacts a sample that contains a plurality of analytes;
   b) detecting, using a machine learning model, the plurality of monitoring structures in the sample image;
   c) performing error correction of the detected plurality of monitoring structures using predetermined structural properties associated with the plurality of monitoring structures;
   d) determining, based on the detected plurality of monitoring structures, a true-literal-dimension value associated with the sample image;
   e) determining, based on the true-literal dimension value, a homographic transform between locations of the detected plurality of monitoring structures in the sample image and a predetermined distribution pattern for the plurality of monitoring structures in an actual image plan associated with the sample holder;
   f) transforming, based on the homographic transform, the sample image containing the plurality of analytes to a corresponding perspective view in the actual image plan; and
   g) calculating at least one morphological property associated with at least one of the plurality of analytes in the sample image.

A2: The method of A1, further comprising:
   detecting a center for each of the plurality of monitoring structures; and
   determining the homographic transform based on the detected centers of the plurality of monitoring structures comprising of at least 4 non-colinear points.

A3: The method of A1, wherein the sample image is partitioned into non-overlapping image patches, each of the non-overlapping image patches comprising at least 4 non-colinear detected centers of the plurality of monitoring structures, wherein a patch specific homographic transform is estimated and applied to compensate the said image patch, and for other image patches, a global homographic transform is estimated and applied based on the detected centers of the plurality of monitoring structures in the whole image.

D1: The method of A1, wherein the monitoring structures are pillars or monitoring marks.

D2: The method of A1, wherein the machine learning model is trained using a labeled training image set, and wherein the machine learning model is a RetinerNet whose parameters are trained using the labeled training image set.

D3: The method of A1, wherein the predetermined structural properties comprise at least one of a periodicity, a shape, or a size associated with the plurality of monitoring structures.

D4: The method of A1, wherein the at least one morphological property comprises at least one of a size or a length of one of the plurality of analyte.

A4: A method of micro-selective-image-assaying (MSIA) in the image-based assay, comprising:
  a) capturing an image of a sample for assaying in the sample holding device, wherein the sample holding device is as in A1 (a) and the sample in the sample holding device comprising a known uniform height and analytes forms a mono-layer in an area of interest;
  b) estimating the TLD/FoV of the image of the sample from (a) for consequent estimation of area, size and volume in the image-based assaying;
  c) detecting defects including air bubbles or dusts in the image of the sample for assaying and segmenting these defects in the image of the sample by a trained machine learning model;
  d) estimating total areas of segmented defects in the image of the sample and calculating their actual area size using the estimated TLD/FoV from (b);
  e) estimating the actual volume of the sample corresponding to the total surface area of the detected defects in the image of the sample for assaying, according to the area estimate from (d) and the known height of the sample in the sample holding device;
  f) removing the surface areas of the detected defects in the image of the sample for assaying and updating the total volume of the remaining sample by subtracting the defects volume estimate from (e) which corresponds to the total volume under the surface area of the detected defects; and
  g) performing the image-based assaying on the selected area of the updated sample image and the updated sample volume from (f) for micro-selective-image-assaying.

A5: A method of A4, wherein the micro-selective-image-assaying (MSIA) utilizes the monitoring structures in the sample holding device of A4 to estimate the TLD/FoV of the image of the sample and map the image of the sample to its actual dimensions through an embodiment of A1.

A6: A method of A4, wherein the micro-selective-image-assaying (MSIA) is based on other selective criterions, including:
  a) distributions of defects in the sample, including air bubbles and dusts;
  b) locations of pillars and monitoring marks and other artifacts in the image of the sample for assaying;
  c) distribution and the condition of the analytes in the image of the sample for assaying, including conditions of analytes clustering and focusing condition.

A7: A method of A4, wherein the micro-selective-image-assaying (MSIA) performs multi-target assaying from the image of the sample, in which the multi-target assaying is based on area/zone selection with areas defined by different reagents or sample heights, for multiple assaying applications from one single image of the sample.

A8: A method of any of A4 or A7, wherein a machine learning model is trained on the labeled training image samples captured by an imager for defects detection and segmentation in the image-based assay.

A9: A method of any of A4 or A7, wherein a machine learning model is trained to detect the analytes in the image of the sample and determine the size of the detected analytes using A1 and the structure of the sample holding device described in A4.

A10: A method of monitoring the image-based assaying using the pillars or monitoring marks using the image of the pillar or monitoring marks in the image of the sample for assaying to determine the quality of the image holding device and the quality of the sample preparation, the method including:
  a) detecting missing pillars or broken pillars in the sample holding device that affect the effective sample volume for the assaying;
  b) detecting objects or analytes on pillars or monitoring marks that affect the heights of the sample in the sample holding device and consequently the effective volume of the sample for assaying; and
  c) detecting air bubbles and dusts in the image of the sample, indicating flaws in the assaying operation or defects of in the sample holding device.

A12: A method of A10, further comprising using the image of the pillars or monitoring marks in the image of the sample for assaying to detect and adjust the operation of the imager in the image-based assaying, including: focusing, contrast stretching, iso adjustment, and filtering.

Definitions

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present teachings, some exemplary methods and materials are now described.

"QMAX" (Q.: quantification; M: magnifying, A. adding reagents, X: acceleration; also termed as self-calibrated compressed open flow (SCOF)) devices, assays, methods, kits, and systems are described in: U.S. Provisional Patent Application No. 62/202,989, which was filed on Aug. 10, 2015, U.S. Provisional Patent Application No. 62/218,455, which was filed on Sep. 14, 2015, U.S. Provisional Patent Application No. 62/293,188, which was filed on Feb. 9, 2016, U.S. Provisional Patent Application No. 62/305,123, which was filed on Marc. 8, 2016, U.S. Provisional Patent Application No. 62/369,181, which was filed on Jul. 31, 2016, U.S. Provisional Patent Application No. 62/394,753, which was filed on Sep. 15, 2016, PCT Application (designating U.S.) No. PCT/US2016/045437, which was filed on Aug. 10, 2016, PCT Application (designating U.S.) No. PCT/US2016/051775, which was filed on Sep. 14, 2016, PCT Application (designating U.S.) No. PCT/US2016/051794, which was filed on Sep. 15, 2016, and PCT Application (designating U.S.) No. PCT/US2016/054025, which was filed on Sep. 27, 2016, all of these disclosures are hereby incorporated by reference for their entirety and for all purposes.

The term "sample" as used herein relates to a material or mixture of materials containing one or more analytes or entity of interest. In some embodiments, the sample may be obtained from a biological sample such as cells, tissues, bodily fluids, and stool. Bodily fluids of interest include but are not limited to, amniotic fluid, aqueous humour, vitreous humour, blood (e.g., whole blood, fractionated blood, plasma, serum, etc.), breast milk, cerebrospinal fluid (CSF), cerumen (earwax), chyle, chime, endolymph, perilymph, feces, gastric acid, gastric juice, lymph, mucus (including nasal drainage and phlegm), pericardial fluid, peritoneal fluid, pleural fluid, pus, rheum, saliva, sebum (skin oil), semen, sputum, sweat, synovial fluid, tears, vomit, urine and exhaled condensate. In particular embodiments, a sample may be obtained from a subject, e.g., a human, and it may be processed prior to use in the subject assay. For example, prior to analysis, the protein/nucleic acid may be extracted from a tissue sample prior to use, methods for which are known. In particular embodiments, the sample may be a clinical sample, e.g., a sample collected from a patient.

The term "analyte" refers to a molecule (e.g., a protein, peptides, DNA, RNA, nucleic acid, or other molecule), cells, tissues, viruses, and nanoparticles with different shapes. In some embodiments, an "analyte," as used herein is any substance that is suitable for testing in the present method.

As used herein, a "diagnostic sample" refers to any biological sample that is a bodily byproduct, such as bodily fluids, that has been derived from a subject. The diagnostic sample may be obtained directly from the subject in the form of liquid, or may be derived from the subject by first placing the bodily byproduct in a solution, such as a buffer. Exemplary diagnostic samples include, but are not limited to, saliva, serum, blood, sputum, urine, sweat, lacrima, semen, feces, breath, biopsies, mucus, etc.

As used herein, an "environmental sample" refers to any sample that is obtained from the environment. An environmental sample may include liquid samples from a river, lake, pond, ocean, glaciers, icebergs, rain, snow, sewage, reservoirs, tap water, drinking water, etc.; solid samples from soil, compost, sand, rocks, concrete, wood, brick, sewage, etc.; and gaseous samples from the air, underwater heat vents, industrial exhaust, vehicular exhaust, etc. Typically, samples that are not in liquid form are converted to liquid form before analyzing the sample with the present method.

As used herein, a "foodstuff sample" refers to any sample that is suitable for animal consumption, e.g., human consumption. A foodstuff sample may include raw ingredients, cooked food, plant and animal sources of food, preprocessed food as well as partially or fully processed food, etc. Typically, samples that are not in liquid form are converted to liquid form before analyzing the sample with the present method.

The term "diagnostic," as used herein, refers to the use of a method or an analyte for identifying, predicting the outcome of and/or predicting treatment response of a disease or condition of interest. A diagnosis may include predicting the likelihood of or a predisposition to having a disease or condition, estimating the severity of a disease or condition, determining the risk of progression in a disease or condition, assessing the clinical response to a treatment, and/or predicting the response to treatment.

A "biomarker," as used herein, is any molecule or compound that is found in a sample of interest and that is known to be diagnostic of or associated with the presence of or a predisposition to a disease or condition of interest in the subject from which the sample is derived. Biomarkers include, but are not limited to, polypeptides or a complex thereof (e.g., antigen, antibody), nucleic acids (e.g., DNA, miRNA, mRNA), drug metabolites, lipids, carbohydrates, hormones, vitamins, etc., that are known to be associated with a disease or condition of interest.

A "condition" as used herein with respect to diagnosing a health condition, refers to a physiological state of mind or body that is distinguishable from other physiological states. A health condition may not be diagnosed as a disease in some cases. Exemplary health conditions of interest include, but are not limited to, nutritional health; aging; exposure to environmental toxins, pesticides, herbicides, synthetic hormone analogs; pregnancy;

menopause; andropause; sleep; stress; prediabetes; exercise; fatigue; chemical balance; etc. It must be noted that as used herein and in the appended claims, the singular forms "a", "an", and "the" include plural referents unless the context clearly dictates otherwise, e.g., when the word "single" is used. For example, reference to "an analyte" includes a single analyte and multiple analytes, reference to "a capture agent" includes a single capture agent and multiple capture agents, reference to "a detection agent" includes a single detection agent and multiple detection agents, and reference to "an agent" includes a single agent and multiple agents.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function. Similarly, subject matter that is recited as being configured to perform a particular function may additionally or alternatively be described as being operative to perform that function.

As used herein, the phrases "at least one of" and "one or more of," in reference to a list of more than one entity, means any one or more of the entities in the list of entity, and is not limited to at least one of each and every entity specifically listed within the list of entity. For example, "at least one of A and B" (or, equivalently, "at least one of A or B," or, equivalently, "at least one of A and/or B") may refer to A alone, B alone, or the combination of A and B.

As used herein, the term "and/or" placed between a first entity and a second entity means one of (1) the first entity, (2) the second entity, and (3) the first entity and the second entity. Multiple entity listed with "and/or" should be construed in the same manner, i.e., "one or more" of the entities so conjoined. Other entity may optionally be present other than the entity specifically identified by the "and/or" clause, whether related or unrelated to those entities specifically identified.

Where numerical ranges are mentioned herein, the invention includes embodiments in which the endpoints are included, embodiments in which both endpoints are excluded, and embodiments in which one endpoint is included and the other is excluded. It should be assumed that both endpoints are included unless indicated otherwise. Furthermore, unless otherwise indicated or otherwise evident from the context and understanding of one of ordinary skill in the art.

What is claimed is:

1. An apparatus for assaying a sample using an optical system suspected of having an imperfection, comprising:
    a sample holder comprising a first plate, a second plate, and a plurality of monitoring marks, wherein
    (i) each of the first and second plates comprises a respective sample contact area contacting the sample that contains or is suspected of containing an analyte
    (ii) the plurality of monitoring marks comprise a plurality of spacers that are distributed in the sample contact areas, wherein the spacers regulate the spacing between the first and second plates, and wherein the plurality of monitoring marks have a flat surface that is parallel to the surface and the plates, have at least one predetermined parameter associated with a geometric property or an optical property of the spacers, and a lateral linear dimension of 1 μm or larger, and at least one lateral linear dimension of 300 μm or less;
    (iii) the first and second plates sandwich at least a part of the sample into a thin layer having a substantially uniform thickness of 200 μm or less and (iv) one of the first and second plates is flexible; the fourth power of the inter-spacer-distance (ISD) divided by the thickness (h) and the Young's modulus (E) of the flexible plate (ISD4/(hE)) is $5 \times 10^6$ $\mu m^3$/GPa or less, and the thickness of the flexible plate times the Young's modulus of the flexible plate is in the range 60 to 750 GPa-$\mu m$;

an optical imaging system that is suspected of having an imperfection, wherein the optical imaging system is configured to take one or more images of the at least part of the sample, wherein the imperfection is associated with an image distortion and/or an illumination variation, and wherein the imperfection of the optical system causes an image imperfection in the image; and a non-transitory computer-readable medium configured to store a correction algorithm that corrects the image imperfection using the at least one predetermined parameter and the image of the monitoring marks in the at least part of the sample.

2. The apparatus of claim 1, further comprising:

a second non-transitory computer-readable medium storing a machine learning model, wherein the machine learning model is configured to transform an image taken by the optical imaging system into a transformed image, and the training and/or the image transformation of the machine learning model are performed after the images of the at least part of the sample has been corrected by the correction algorithm.

3. A method of assaying a sample using an optical system suspected of having an imperfection, the method comprising:

providing the apparatus of claim 1 or 2, and correcting, using the correction algorithm, the image imperfection using the at least one predetermined parameter and the one or more images of the monitoring marks in the at least part of the sample.

4. The method of claim 3, further comprising:

using a machine learning model to perform an image transformation of the image of the at least part of the sample; and using the transformed image to measure the analyte wherein the training and/or the image transformation of the machine learning model are performed after the image of the at least part of the sample has been corrected by the correction algorithm.

5. The method of claim 3, wherein the analyte is a protein, peptide, DNA, RNA, nucleic acid, small molecule, cell, or nanoparticle.

6. The method of claim 3, wherein the analyte is a blood cell.

7. The method of claim 3, wherein the correction algorithm corrects an image distortion of the image of the at least part of the sample.

8. The method of claim 3, wherein the correction algorithm corrects an illumination variation of the image of the at least part of the sample.

9. The method of claim 3, wherein the correction algorithm is a machine learning model.

10. The method of claim 3, wherein the monitoring markers are periodic structures with a predetermined period, and wherein and wherein the at least one predetermined parameter is the period.

11. The method of claim 10, wherein the period is less than about 200$\mu m$.

12. The method of claim 3, wherein the monitoring marks are the spacers, wherein the spacers are the structures between the first and second plates and regulated the spacing between the plates.

13. The method of claim 3, wherein the monitoring mark further comprises either a protrusion or a trench from the sample contact area of the plate, wherein the protrusion or the trench comprises a flat surface that is substantially parallel to a neighbor surface that is a portion of the sample contact area adjacent the protrusion or the trench.

14. The method of claim 3, wherein each of the monitoring marks is a cylindrical structure with a cross-section of a triangle, a rectangle, a square, a circle, or a polygon.

15. The method of claim 3, wherein the analyte is a blood cell.

16. The method of claim 3, wherein the correction algorithm comprises a homographic transform.

17. The method of claim 3, wherein the monitoring marks comprise at least 4 non-colinear pillars.

18. The method of claim 3, wherein each of the monitoring marks is a pillar with a flat top surface of area 10,000 $\mu m^2$ or less.

19. The method of claim 3, wherein the predetermined geometric property of the monitoring marks comprises the shape and dimension of the monitoring marks and/or the center-to-center distance between the monitoring marks.

20. The apparatus of claim 1, wherein the correction algorithm corrects an image distortion of the image of the at least part of the sample.

21. The apparatus of claim 1, wherein the correction algorithm corrects an illumination variation of the image of the at least part of the sample.

22. The apparatus of claim 1, wherein the correction algorithm is a machine learning model.

23. The apparatus of claim 1, wherein the spacers are arranged periodically with a predetermined period, and wherein the at least one predetermined parameter is the period.

24. The apparatus of claim 23, wherein the correction algorithm is a machine learning model.

25. The apparatus of claim 24, wherein the image imperfection to be corrected is a lateral dimension of a distorted image.

26. The apparatus of claim 25, further comprising a second non-transitory computer-readable medium storing a machine learning model, wherein the machine learning model is configured to transform an image taken by the optical imaging system into a transformed image, and the training and/or the image transformation of the machine learning model are performed after the images of the at least part of the sample has been corrected by the correction algorithm.

27. The apparatus of claim 23, wherein the period is less than 200 $\mu m$.

28. The apparatus of claim 1, wherein the monitoring marks further comprising a protrusion or a trench from the sample contact area of the plate, wherein the protrusion or the trench comprises a flat surface that is substantially parallel to a neighbor surface that is a portion of the sample contact area adjacent the protrusion or the trench.

29. The apparatus of claim 1, wherein the monitoring mark is a cylindrical structure with a cross-section of a triangle, a rectangle, a square, a circle, or a polygon.

30. The apparatus of claim 1, wherein the correction algorithm comprises a homographic transform.

31. The apparatus of claim 1, wherein the monitoring marks comprise at least 4 non-colinear pillars.

32. The apparatus of claim 1, wherein each of the monitoring marks is a pillar with a flat top surface of area 10,000 µm² or less.

33. The apparatus of claim 1, wherein the predetermined geometric property of the monitoring marks comprises the shape and dimension of the monitoring marks and/or the center-to-center distance between the monitoring marks.

34. The apparatus of claim 1, wherein the two plates are movable relative to each other into different configurations, including an open configuration and a closed configuration;
   wherein in the open configuration, the two plates are separated apart, and the sample is deposited on one or both plate;
   wherein in the closed configuration, which is configured after a sample is deposited in the open configuration; a relevant volume of the sample is compressed by the two plates into a layer of substantially uniform thickness and is substantially stagnant relative to the plates, and the uniform thickness of the layer is confined by the plates and is regulated by the plates and the spacers; and
   wherein the sample is imaged in the closed configuration.

35. The apparatus of claim 1, further comprising a non-transitory computer-readable medium configured to store an algorithm that estimates the area, size and sample volume using the TLD of the image of the sample.

36. The apparatus of claim 1, wherein the flexible plate has a thickness in the range of 20 µm to 250 µm and Young's modulus in the range 0.1 to 5 GPa.

37. The apparatus of claim 1, wherein the analyte is selected from the group consisting of white blood cells, red blood cells, and platelets.

38. The apparatus of claim 1, further comprising a non-transitory computer-readable medium configured to store an algorithm that measures the concentration of an analyte using the imaging and the known rate of absorption of analyte at a given wavelength and the height of the sample area.

* * * * *